United States Patent [19]
Hara et al.

[11] Patent Number: 5,950,023
[45] Date of Patent: *Sep. 7, 1999

[54] CONTROL DEVICE FOR PREVENTING RED-EYE EFFECT ON CAMERA

[75] Inventors: Masaharu Hara, Kawasaki; Norikazu Yokonuma, Tokyo; Hidenori Miyamoto, Kawasaki; Hideya Inoue, Yokohama; Toshio Sosa, Narashino, all of Japan

[73] Assignee: Nikon Corporation, Tokyo, Japan

[ * ] Notice: This patent is subject to a terminal disclaimer.

[21] Appl. No.: 08/889,874

[22] Filed: Jul. 8, 1997

Related U.S. Application Data

[60] Continuation of application No. 08/475,571, Jun. 7, 1995, Pat. No. 5,682,560, which is a division of application No. 08/071,613, Jun. 4, 1993, which is a continuation of application No. 07/974,512, Nov. 12, 1992, abandoned, which is a division of application No. 07/930,466, Aug. 20, 1992, abandoned, which is a continuation of application No. 07/785,210, Oct. 15, 1991, abandoned, which is a continuation of application No. 07/632,648, Dec. 26, 1990, abandoned, which is a continuation of application No. 07/445,996, Dec. 4, 1989, abandoned, which is a continuation-in-part of application No. 07/323,386, Mar. 14, 1989, abandoned.

[30] Foreign Application Priority Data

Apr. 12, 1988 [JP] Japan .................................. 63-49820

[51] Int. Cl.$^6$ ...................................................... G03B 15/05
[52] U.S. Cl. ............................................................ 396/158
[58] Field of Search ..................................... 396/157, 158; 348/64

[56] References Cited

U.S. PATENT DOCUMENTS

| 4,285,588 | 8/1981 | Mir . |
| 4,953,029 | 8/1990 | Morimoto et al. ......................... 348/64 |
| 4,999,663 | 3/1991 | Nakamura ............................... 396/158 |
| 5,063,402 | 11/1991 | Shimada et al. . |
| 5,682,560 | 10/1997 | Hara et al. ............................... 396/158 |

Primary Examiner—W. B. Perkey
Attorney, Agent, or Firm—Shapiro and Shapiro

[57] ABSTRACT

A camera capable of operating in a red-eye prevention mode. The camera has an electronic flash device which is activated by a drive circuit in synchronization with the exposure. The electronic flash device also serve as a pre-light-emission device capable of performing pre-light-emission for the purpose of preventing red-eye effect. When it is judged from the photographing condition that red-eye effect may occur, a controller activates the electronic flash device to effect a pre-light-emission for reducing the size of pupils of eyes of a person to be photographed, before the main flashing which is executed in synchronization with the exposure.

9 Claims, 36 Drawing Sheets

INTERRUPT ROUTINE

INTERRUPT ROUTINE

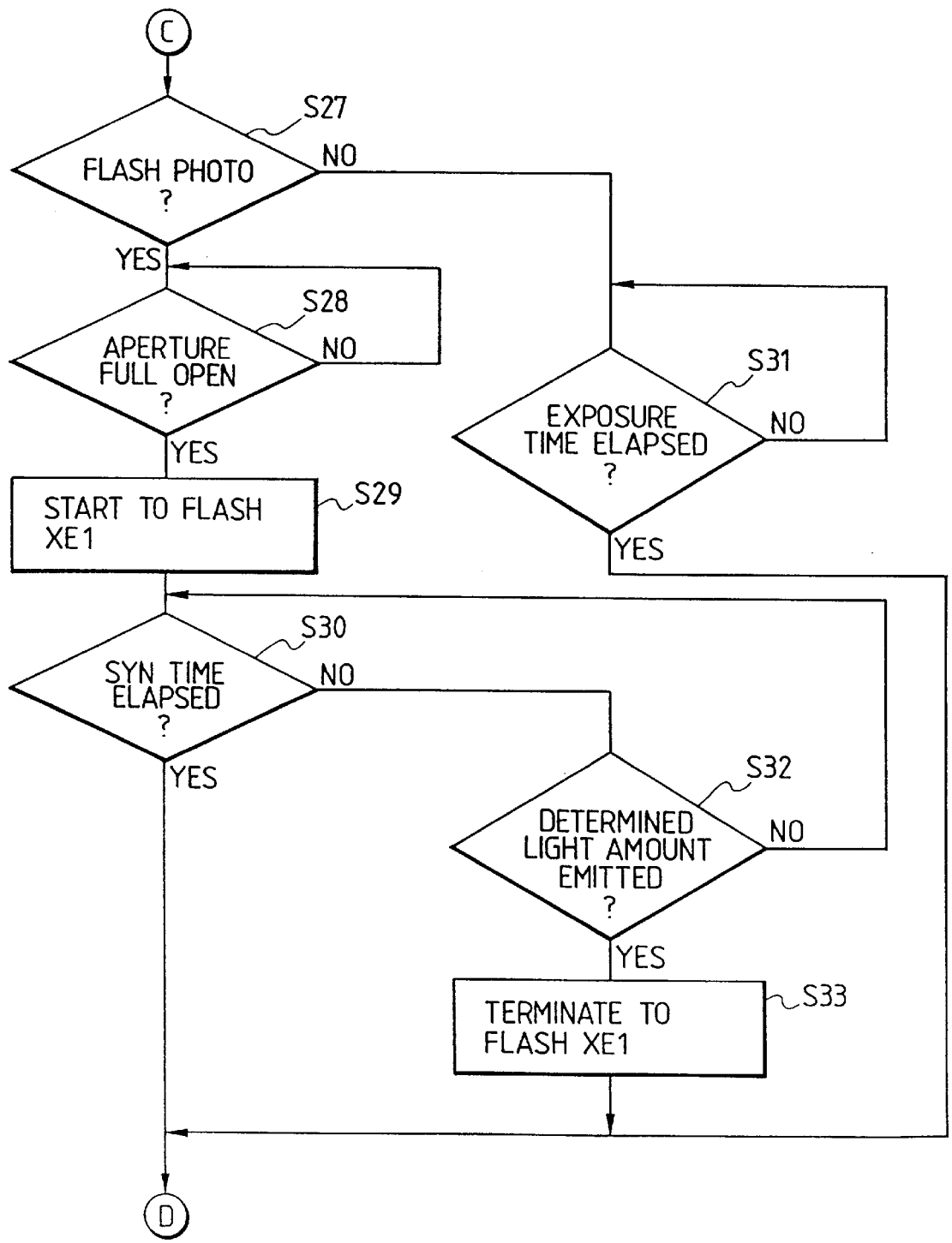

INTERRUPT ROUTINE

INTERRUPT ROUTINE

INTERRUPT ROUTINE

INTERRUPT ROUTINE

INTERRUPT ROUTINE

INTERRUPT ROUTINE

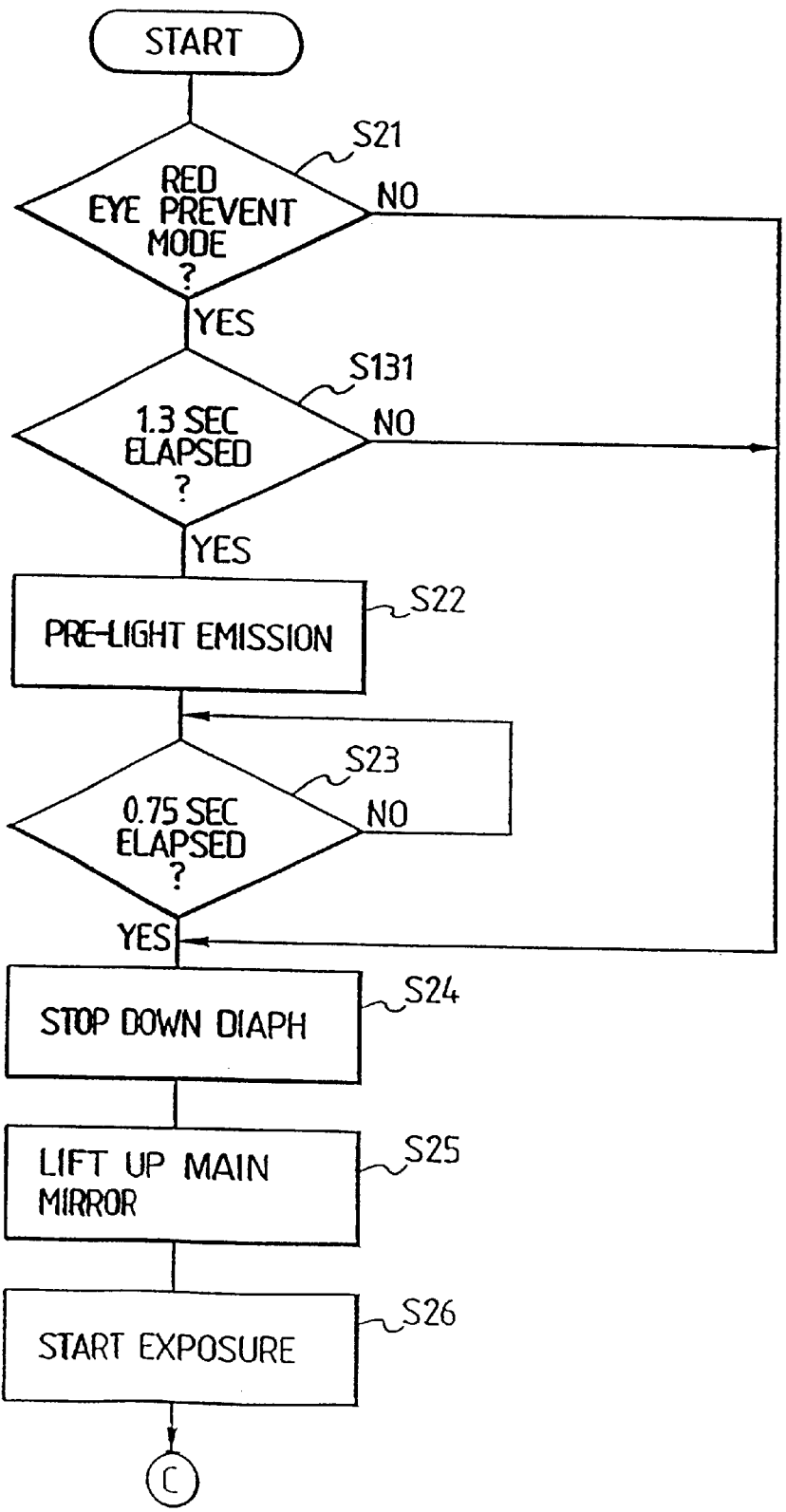

INTERRUPT ROUTINE

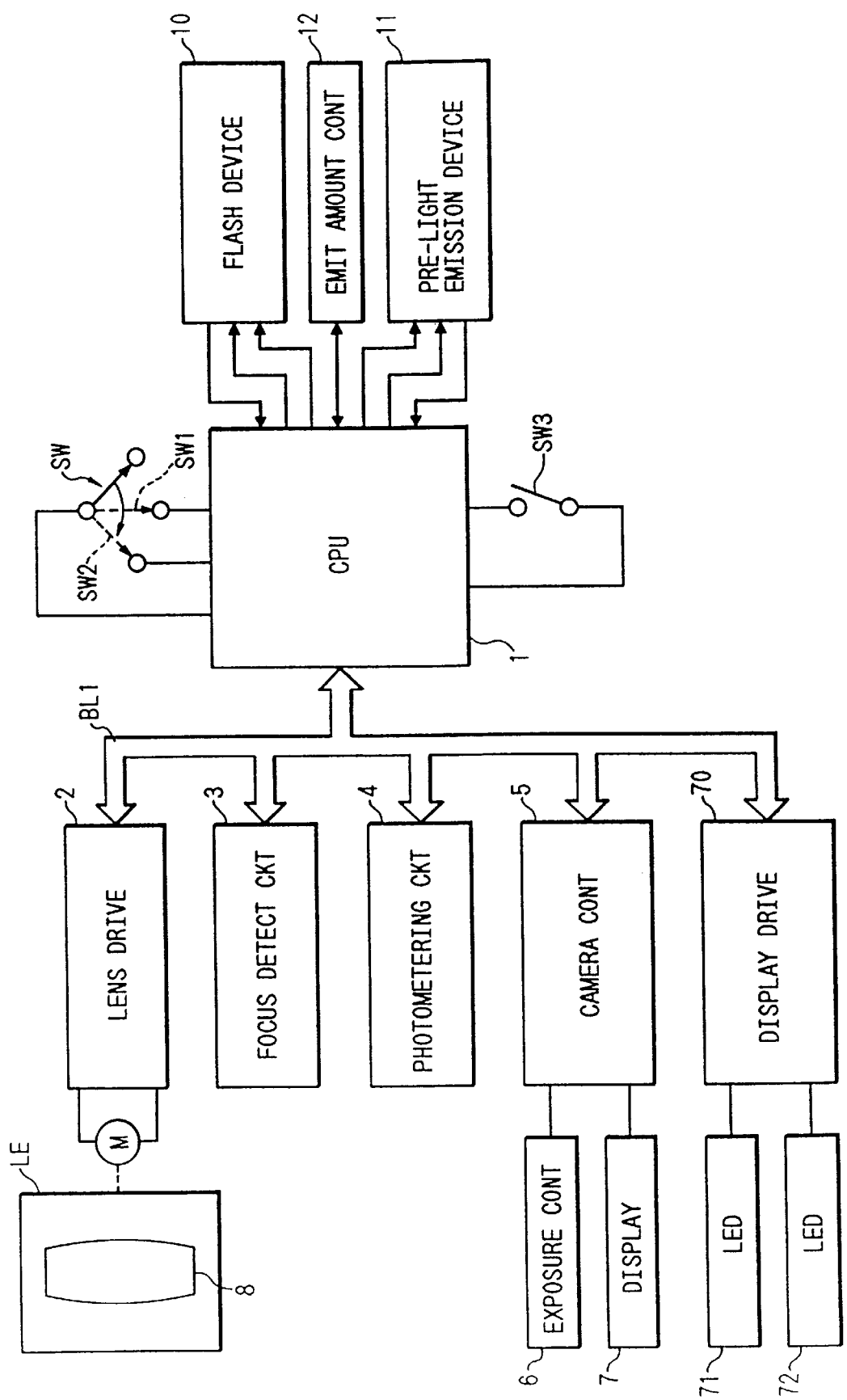

CONTROL DEVICE FOR PREVENTING RED-EYE EFFECT ON CAMERA

This is a continuation of application Ser. No. 08/475,571 filed Jun. 7, 1995, now U.S. Pat. No. 5,682,560, which is a division of application Ser. No. 08/071,613 filed Jun. 4, 1993, which is a continuation of application Ser. No. 07/974, 512 filed Nov. 12, 1992 (abandoned), which is a division of application Ser. No. 07/930,466 filed Aug. 20, 1992 (abandoned), which is a continuation of application Ser. No. 07/785,210 filed Oct. 25, 1991 (abandoned), which is a continuation application Ser. No. 07/632,648 filed Dec. 26, 1990 (abandoned), which is a continuation of application Ser. No. 07/445,996 filed Dec. 4, 1989 (abandoned), which is a continuation-in-part of application Ser. No. 07/323,386 filed Mar. 14, 1989 (abandoned).

BACKGROUND OF THE INVENTION

1. Field of the Invention

The present invention relates to a control device for use on a camera and capable of preventing red-eye effect which tends to be caused in a flash-assisted color photography.

2. Related Background Art

The red-eye effect is a phenomenon in which human eyes are red- or gold-colored in a flash-assisted color photography. This phenomenon is attributable to a fact that the flash light from an electronic flash is applied to and reflected by the retinas through the pupils of human eyes to reach the photographic film. As is well known, numerous capillary blood vessels exist around the retinas to circulate blood containing hemoglobin which is red, so that the image formed by the light reflected from the retinas inevitably becomes red.

Experience shows that the red-eye effect is remarkable particularly under the following conditions:

1) When the Photographing Environment is Dark

The size of the pupil of the human eye varies depending on the brightness of the environment. For instance, the pupil is expanded to about 7 to 8 mm in diameter in the dark. In such a case, the quantity of the light incident to the eye and the quantity of the light reflected by the retina are increased, with the result that the red-eye effect is enhanced correspondingly.

2) When the Distance between the Light-emitting Portion of the Electronic Flash and the Photographing Optical Axis is Small The retina of a human eye generally has a high reflection factor and exhibits a high directivity of the reflected light. Therefore, the red-eye effect is enhanced when three elements, i.e., the light-emitting portion, photographing lens and the eye, are located in relation to one another such that the light reflected from the retina can easily come into the photographing lens, i.e., when the light-emitting portion of the electronic flash is located close to the optical axis of the photographing lens. More particularly, the red-eye effect is produced without fail when the angle formed between a line interconnecting the eye of a person as the photographing object and the photographing lens and a line interconnecting the eye and the light-emitting portion of the electronic flash is smaller than a predetermined angle. Experience shows that this angle generally ranges between about 2 and 2.5 degrees. Thus, the red-eye effect would be avoided if the light-emitting portion of the electronic flash is spaced apart from the optical axis of the photographing lens. The distance, however, is practically limited because of the restriction in the distance between the camera and the object (this distance will be referred to as "object distance" hereinafter). Thus, the red-eye effect may be unavoidable under the circumstance in which the object distance is greater than a certain value.

Under these circumstances, methods have been proposed for avoiding the undesirable red-eye effect. For instance, "psa JOURNAL", July, 1952 discloses a method in which the person to be photographed is kept in a bright condition in advance of the photographing so that the state of the eyes is changed to cope with the brightness, and the flash lights up when the pupil diameter has come down below 3 mm, whereby the red-eye effect can be suppressed.

On the other hand, Japanese Patent Publication No. 58-48088 discloses an art in which pre-light-emission is conducted before the photographing over a period necessary for the pupil to reduce its diameter and, when the pupil diameter has been minimized, the flashing section of the electronic flash operates to enable photographing.

Japanese Patent Publication No. 58-9130 discloses an art in which a pair of flash discharge tubes are used such that pre-light-emission is effected by one of these two tubes so as to reduce the pupil diameter and then main-flash is generated by the other tube to enable the photography.

These known methods, however, suffer from various disadvantages as follows.

A first disadvantage is as follows. When pre-light-emission is effected for the purpose of preventing red-eye effect, shutter release with main flash is delayed over a period necessary for, the pupil to contract, typically 0.75 second. Therefore, in a camera which is designed to effect the pre-light-emission, the pre-light-emission is wastefully effected even in photography under a bright condition and even in the case where the pupil has contracted as in the case of the second and the following shots in continuous flash-assisted photography in the darkness. In consequence, the photographer may lose the best shutter opportunity. In addition, power of the batteries used for the pre-light-emission is wastefully consumed.

A second disadvantage is that, when the power supply or batteries have not been charged sufficiently both for the pre-light-emission and main flashing, there is a risk for the photographer to lose a photo opportunity because of shortage of the electric charge as a result of the discharge for the pre-light-emission.

A third disadvantage is that the pre-light-emission is effective only when the person to be photographed correctly looks at the camera, because the light generated by the pre-light-emission cannot enter the eyes if the eyes do not sight in the direction of the camera. In addition, the person to be photographed tends to mis-understand that the photography is finished upon completion of the pre-light-emission so that he may turn his head or close his eyes when photographed, with the result that the intended shot fails.

A fourth problem is caused by the fact that the intensity of the light generated in the pre-light-emission is constant regardless of the object distance, so that the quantity of light received by the eyes varies depending on the object distance. A too small object distance may cause the face to be unnaturally changed or the eyes to be closed due to dazzle. Such an excessively large quantity of pre-light-emission light received by the eyes is nothing but a wasteful use of the battery power.

A fifth problem is that there are some persons whose pupils do not sufficiently contract by a single pre-light-emission, so that the red-eye effect cannot be suppressed satisfactorily because the known method conducts pre-light-emission only once in advance of the shot.

A camera is known in which, as disclosed in the specification of the U.S. Pat. No. 4,305,647, an electronic flash is activated for pre-light-emission in advance of the shutter release which is accompanied by the main flashing, and the light reflected from the object is measured. The measured value representing the object brightness is used as data for determining the aperture value or as data for judging whether the pre-set aperture value is adequate, with an alarm activated when the aperture value is judged as being inadequate.

When the pre-light-emission for preventing red-eye effect is applied to this type of camera, pre-light-emission is conducted twice: namely, once for determination of the aperture value and once for preventing the red-eye effect. In consequence, battery power is consumed rapidly and the person to be photographed is confused by the repetition of flashing.

A camera also is known which is capable of conducting a timer-assisted photography. In this type of camera, the timer starts to measure the time in response to full pressing of a release button and releases the shutter when a predetermined set time has passed. In most cases, the timer-assisted photographing mode is used when the photographing object is a person or persons. This means that the red-eye effect tends to be experienced frequently in the timer-assisted photography.

The camera having the timer function, when incorporating a flash for preventing red-eye effect, requires that the photographing mode be switched to select the pre-light-emission mode by, for example, pressing a push button, when the timer-assisted photography is to be conducted. Such a switching operation is troublesome and the red-eye effect tends to be caused when the switching has failed.

SUMMARY OF THE INVENTION

Accordingly, an object of the present invention is to provide a red-eye effect prevention device for a camera, which allows the pre-light-emission to be omitted when the red-eye effect prevention function is not needed and which minimizes the wasteful use of the battery power.

Another object of the present invention is to provide a red-eye effect prevention device for a camera, in which the pre-light-emission for the purpose of preventing generation of red-eye effect is omitted when the main flash device has not been charged to a degree enough for the flashing, thus enabling photography for the desired shot without fail.

Still another object of the present invention is to provide a red-eye effect prevention device which is capable of informing the person to be photographed of the fact that the photography with main flashing is effected following a pre-light-emission.

A further object of the present invention is to provide a red-eye effect prevention device which provides a constant quantity of pre-light-emission light received by eyes regardless of the object distance, thereby optimizing the light stimulus on the human eyes.

A still further object of the present invention is to provide a red-eye effect prevention device which is capable of performing pre-light-emission a plurality of times, thereby avoiding red-eye effect regardless of the type of the object.

A still further object of the present invention is to provide a camera incorporating a red-eye effect prevention device in which a pre-light-emission for preventing generation of red-eye effect is conducted without fail whenever the camera operates in a timer-assisted mode, thus eliminating troublesome switching operation, as well as generation of red-eye effect which is unavoidable in some of known cameras when the switching has been forgotten.

BRIEF DESCRIPTION OF THE DRAWINGS

FIGS. 5 to 7 are flow charts showing interrupt routines;

FIG. 20 is a flow chart showing a modification of the interrupt routine;

FIG. 30 is a block diagram showing a fourth embodiment of invention;

DESCRIPTION OF THE PREFERRED EMBODIMENT

Figure 1:
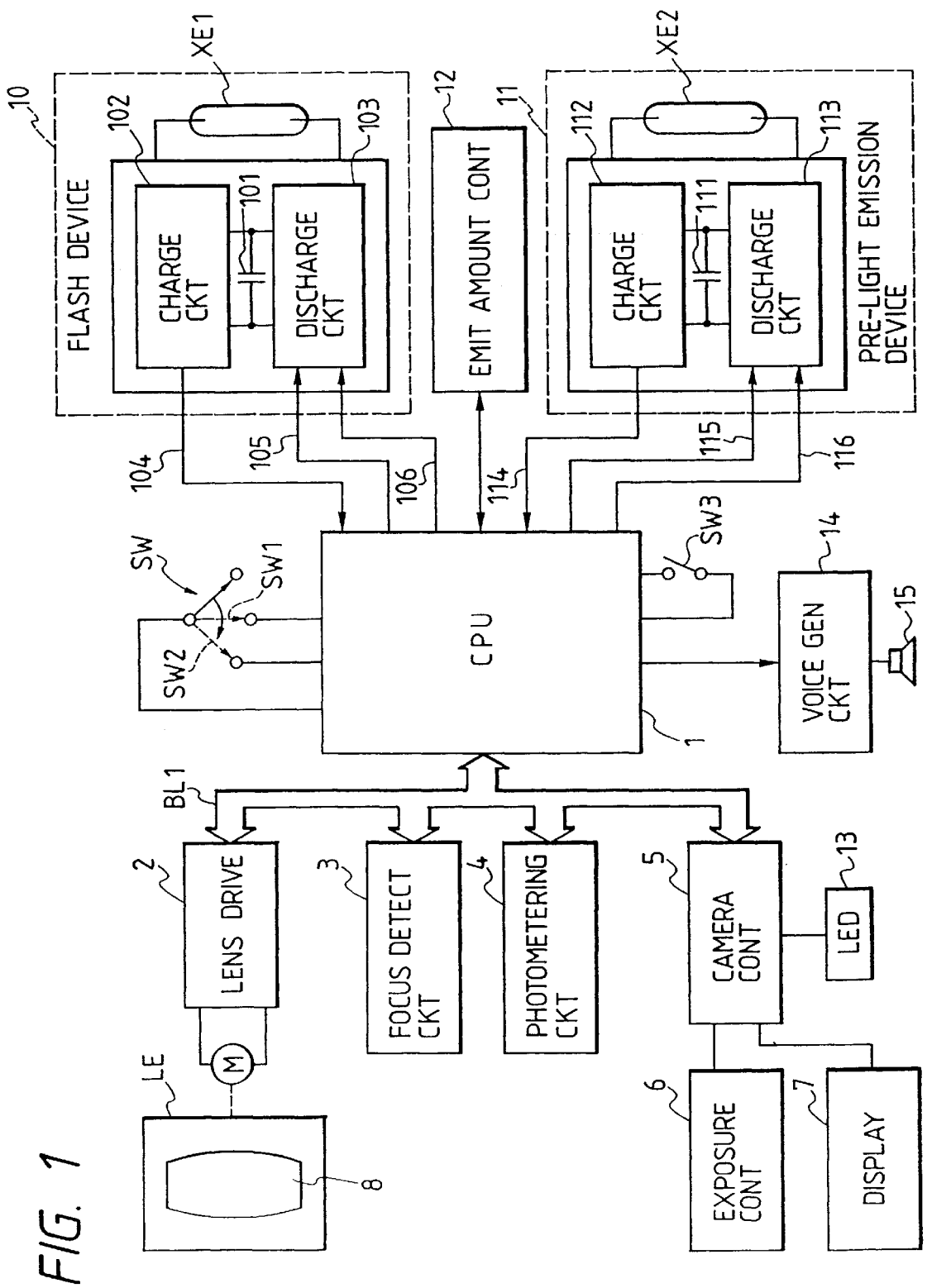
FIG. 1 is a block diagram of a first embodiment of the present invention.

A first embodiment of the present invention will be described with reference to FIG. 1.

A lens drive circuit 2, a focus detection circuit 3, a photometering circuit 4 and a camera control circuit 5 are connected to a CPU 1 through signal transmission lines BL1. The focus detection circuit 3 has, for example, a pair of light-receiving elements such as CCDs. A pair of object images are formed on these elements through an exposure lens LE and a pair of lenses which are not shown. Upon receiving electrical signals from these elements, the focus detection circuit delivers a focus detection signal which represents the amount of offset of the object image forming plane and a predetermined image forming plane, as well as the direction of the offset.

The photometering circuit 4 has a light receiving element which receives light from the object and is capable of producing an output which is delivered as photometric data to the CPU.

The camera control circuit 5 is connected to an exposure control device 6 capable of controlling aperture and shutter and also to a display device 7 such as a liquid crystal display device. The camera control circuit 5 is capable of operating in accordance with instructions given by the CPU so as to enable the display device 7 to display information concerning photography such as the exposure value, shutter speed and so on, and to drive the exposure control device 6 thereby effecting exposure.

The lens drive circuit 2 includes a motor 9 for driving a focusing lens 8. The motor 9 is driven in accordance with a lens driving instruction from the CPU 1 so as to drive the focusing lens, thereby conducting focusing. The lens drive instruction is generated by the CPU in accordance with the above-mentioned focus detection signal.

An electronic flash device 10 and a pre-light-emission device 11 integral with the electronic flash device 10 are connected to the CPU.

The electronic flash device 10 includes a xenon discharge tube XE1, a main capacitor 101 for storing electric charges for activating the xenon discharge tube XE1, a charging circuit 102 for charging the main capacitor 101, and a discharge circuit 103 for controlling the start and termination of light emission, i.e., the discharge, in the xenon discharge tube XE1. The charging circuit 102 produces a charge-up signal 104 upon completion of the main capacitor 101 to a level high enough for allowing the discharge in the xenon light-emitting tube XE1 and delivers this signal to the CPU. Upon receipt of this charge-up signal 104, the CPU delivers a discharge start signal 105 to the discharge circuit 103 as a later-mentioned second switch SW2 is turned on. In response to the discharge start signal 105, the discharge circuit 103 delivers the electric charges of the main capacitor 101 to the xenon discharge tube XE1 thereby initiating the emission of light from the xenon discharge tube XE1. The amount of light emitted by the xenon discharge tube XE1 is measured by an emission amount control circuit and the result of measurement is delivered to the CPU as light amount data used for the purpose of controlling the amount of light emitted from the discharge tube. As an emission termination instruction 106 is delivered by the CPU to the discharge circuit 103, the discharge circuit terminates the supply of the electric charges to the xenon discharge tube XE1, thereby terminating the discharge from the xenon discharge tube XE1.

The pre-light-emission device 11 includes a xenon discharge tube XE2 capable of emitting light in amount large enough to cause the pupils of human eyes to contract, a capacitor 111, a charging circuit 112 for charging the capacitor 111, and a discharge circuit 113 for controlling the start and termination of the discharge in the xenon discharge tube XE2. Upon completion of the charging of the capacitor 111 to a level high enough to cause a discharge in the xenon discharge tube XE2, the charging circuit 112 produces a charge-up signal 114 and delivers the same to the CPU. Upon receipt of the charge-up signal 114, the CPU delivers a discharge start instruction 115 to the discharge circuit 113 as the second switch is turned on, so that the discharge circuit 113 delivers electric charges of the capacitor 111 to the xenon discharge tube XE2 thereby allowing the tube to emit pre-light-emission light. The CPU also delivers a discharge termination instruction 116 to the discharge circuit 113, thereby terminating the pre-light-emission.

A release switch SW operatively associated with a release button (not shown) is connected to the CPU. The release switch SW is composed of a first switch SW1 and the aforementioned second switch SW2. The arrangement is such that the first switch SW1 is turned on in response to pressing of the release button to the bottom of a first stroke and, as the release button is further pressed to the bottom of the second stroke, the second switch SW2 is turned on. In response to the turning on of the first switch SW1, the CPU activates the above-mentioned focus detection circuit 3 and the photometering circuit 4, and determines the distance between the camera and the object in accordance with the focus detection signal derived from the focus detection circuit 3, as well as the amount of drive of the lens for bringing the focusing lens 8 to the best-focus state. Then, a lens drive instruction is delivered to the lens drive circuit 2 in order to drive the focusing lens to the best-focus position, in accordance with the lens driving amount computed by the CPU.

The turning on of the first switch SW1 also initiates determination of the object brightness B on the basis of the photometric data derived from the photometering circuit 4. Then, as the second switch SW2 is turned on, the exposure control device 6 is driven to effect the exposure. In this state, the electronic flash device 10 or the pre-light-emission device 11 is activated as desired.

A voice generating circuit 14 also is connected to the CPU. The voice generating circuit 14 has a speaker 15 which generates voice in response to a voice generating instruction from the CPU. The voice is for telling the person to be photographed that a pre-light-emission is executed in advance of the exposure. For instance, the voice tells "Please do not move until the flash lights twice".

The CPU determines whether the present photographing conditions may cause red-eye effect when the exposure is done with the assist of the flash light, in accordance with the object distance D and the object brightness. When the conditions are judged as possibly causing red-eye effect, the CPU produces a red-eye effect signal so as to set the camera in a red-eye effect prevention mode. Then, in response to turning on of the second switch SW2, a voice generating instruction is input to the voice generating circuit 14 so as to activate this circuit and then to activate the pre-light-emission device 11. Thereafter, a lighting instruction is delivered to the camera control circuit 5 so as to light the LED 13 so as to inform the person to be photographed that exposure with the aid of the electronic flash 10 is going to be executed. Then, when 0.75 second has passed after the operation of the pre-light-emission device 11, the LED 13 is turned off and the exposure control device 6 is driven through the camera control circuit 5, thereby outputting a discharge start signal to the discharge circuit 103. The lighting of the LED 13 is effected after the operation of the pre-light-emission device 11 but before the operation of the electronic flash 10.

A description will be given hereinafter of the control performed by the CPU, in accordance with the flow chart.

Figure 2:
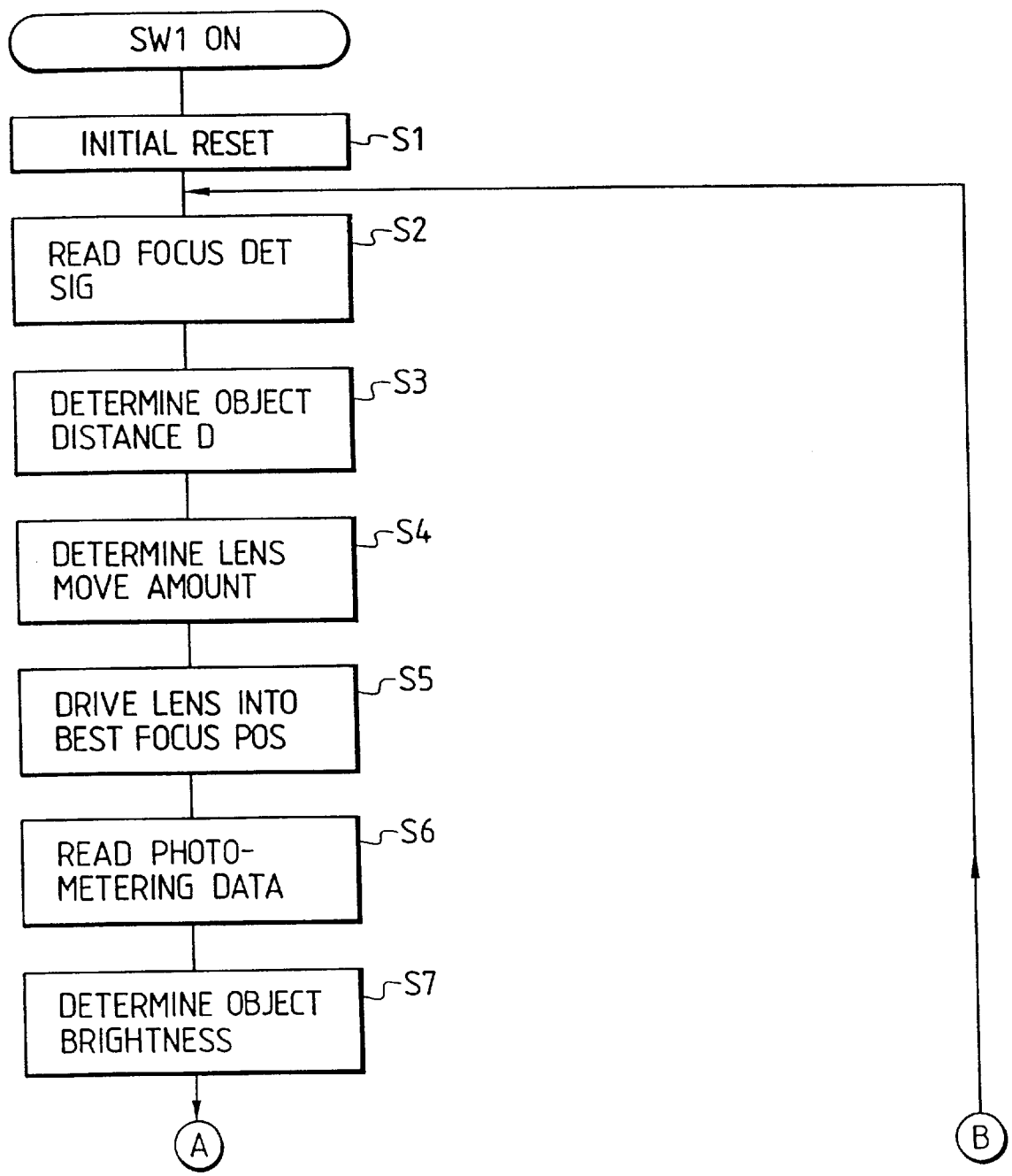
FIGS. 2 and 3 are flow charts showing a main routine.
Figure 3:
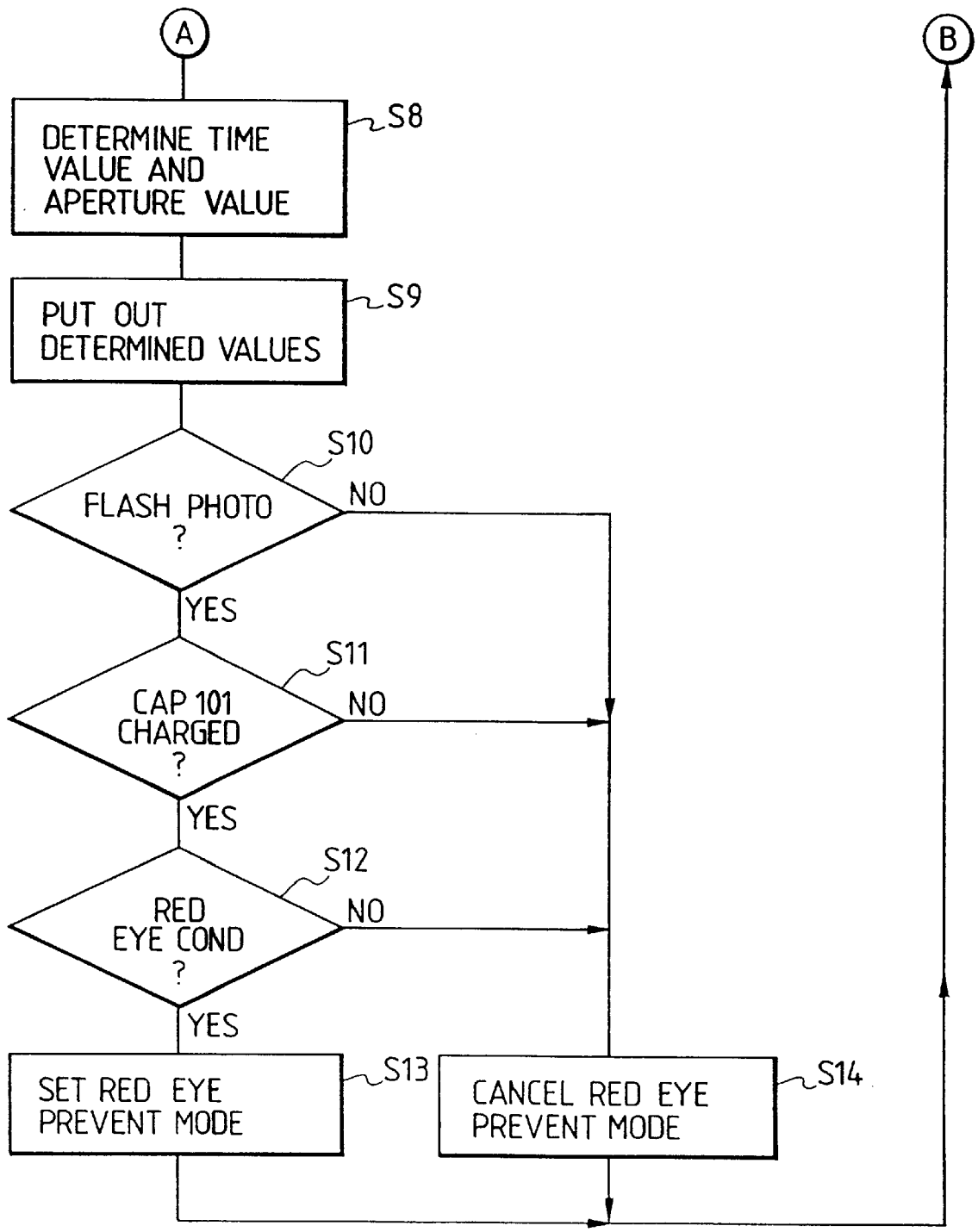

A program shown in FIGS. 2 and 3 is started as the first switch SW1 is turned on. Referring first to FIG. 2, a memory is reset in Step S 1 to initialize the values set therein. At the same time, all the circuits are reset. In consequence, the focus detection circuit 3 and the photometering circuit 4 convert the results of the detection by the light-receiving elements and deliver the electric signals to the CPU. In Step S 2, the CPU reads the focus detection signal from the focus detection circuit 3 and determines the object distance D in Step S 3. The process then proceeds to Step S 4.

In Step S 4, the CPU determines the amount of driving of the focusing lens 8 necessary for bringing the focusing lens 8 to a best-focus position. In Step S 5, the focusing lens 8 is driven by the motor 9 to the best focus position. In Step S 6, photometric data is read from the photometering circuit 4 and, in Step S 7, the brightness B of the object is determined in accordance with the thus obtained photometric data. Referring now to FIG. 3, in Step S 8, the time value and the aperture value are determined in accordance with the brightness B of the object and the ISO sensitivity. The thus determined time value and the aperture value are delivered to the camera control circuit 5 in Step S 9. The camera control circuit 5 then operates to display these values on the display device 7.

The process then proceeds to Step S 10 in which a judgment is executed as to whether the electronic flash 10 is to be used. The judgment is executed by detecting whether an electronic flash inhibition switch (not shown) is set for inhibiting the use of the electronic flash 10 or by determining whether the use of the electronic flash device 10 is necessary on the basis of the detected brightness B of the object. If the answer to the question posed in Step S 10 is YES, the CPU operates the charging circuit 102 so as to start the charging and then the process proceeds to Step S 11. Conversely, when the answer is NO, the red-eye effect prevention mode is dismissed in Step S 14 and the process returns to Step S 2.

In Step S 11, the CPU judges whether the charging of the main capacitor 101 of the electronic flash device 10 has been finished, by detecting whether the charge-up signal has been output from the charging circuit 102. If the charge-up signal has been delivered from the charging circuit 102, an answer YES is given in Step S 11 so that the process proceeds to Step S 12. However, if the charge-up signal has not been produced, i.e., if the capacitor has not been charged up, an answer NO is given so that the process proceeds to Step S 14.

In Step S 12, a judgment is executed as to whether the present conditions may cause the red-eye effect. In this embodiment, the judgment is executed on the basis of the object distance D and the object brightness B.

Figure 4:
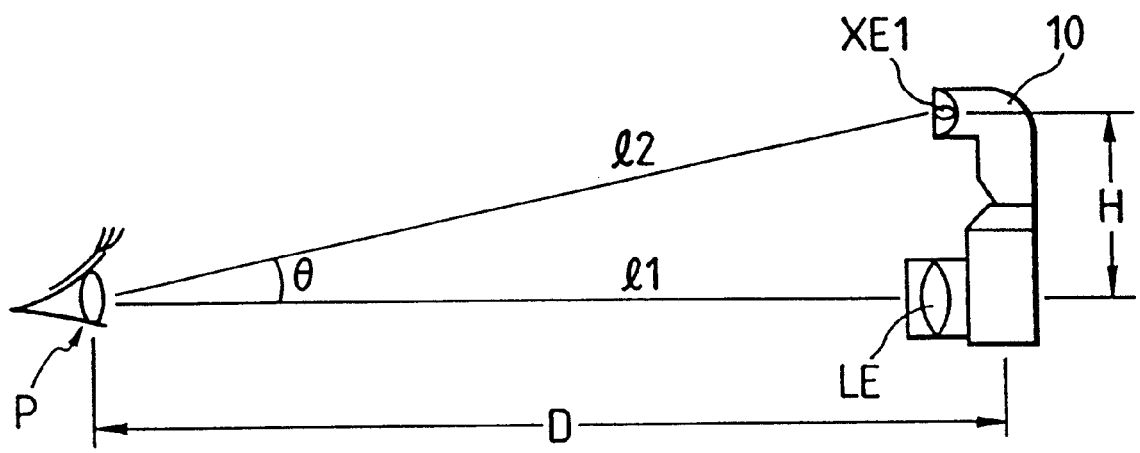
FIG. 4 is an illustration of a positional relationship between a camera and a pupil of a person to be photographed.

FIG. 4 illustrates the condition for generation of red-eye effect. A symbol P represents one of the pupils of the person to be photographed. The red-eye effect tends to occur when the angle $\theta$, which is formed between a line $l_1$ passing through the pupil P and the center of the photographing lens LE and a line $l_2$ passing through the pupil P and the center of the xenon flashing device 10, is 2° or below. Representing the distance between the axes of the exposure lens LE and the xenon tube XE1 by H, the angle $\theta$ is given by a formula $\tan \theta = H/D$.

From this formula, the object distance D is determined as follows:

$$D = H/\tan \theta \quad (1).$$

Assuming here that the distance H between the axes of the exposure lens LE and the xenon tube XE1 of the electronic flash 10 is 0.1 m and that the red-eye effect is produced when the above-mentioned angle $\theta$ is 2° or below, the object distance D at which the red-eye effect possibly occurs can be given as follows.

$$D = 28.6 \times 0.1 \; m = 2.86 \; m.$$

Thus, the red-eye effect is considered to occur when the object distance is 2.86 m or greater.

It will be understood that the object distance D as determined by the formula (1) can be used as the criterion for the judgment of the photographing condition as to whether the red-eye effect will be produced or not.

On the other hand, when the object brightness is higher than a certain level, there is almost no possibility for the red-eye effect to occur, because the pupils are closed almost fully. In other words, the red-eye effect is produced only when the object brightness is so low as to cause the pupils to open.

In this embodiment, therefore, the CPU judges that the red-eye effect may occur when the object distance D is greater than the above-mentioned criterion value of 2.86 m while the object brightness B is below a predetermined reference level. If these conditions are met in Step S 12, the process proceeds to Step S 13, whereas, if the conditions are not met, the process proceeds to Step S 14. In Step S 13, the camera is set in the red-eye effect prevention mode and then the process returns to Step S 2 to repeat the described steps. The above-mentioned distance H is determined by the CPU which receives a signal representative of the heightwise position of the xenon tube XE1 delivered by the electronic flash 10.

Figure 7:
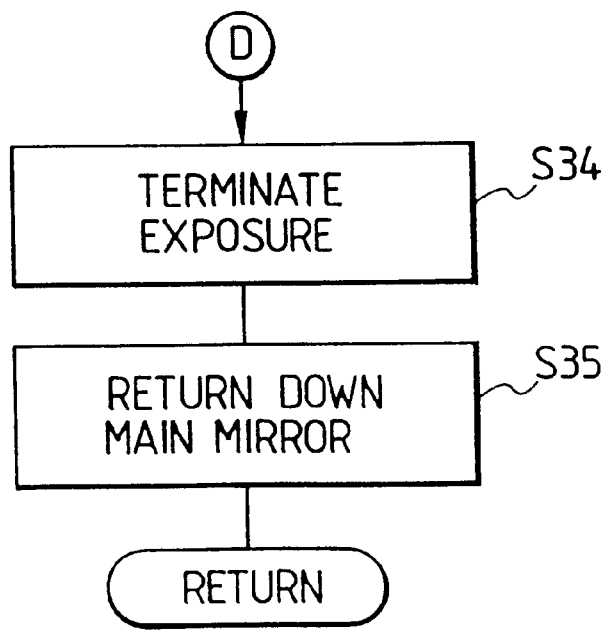
Figure 5:
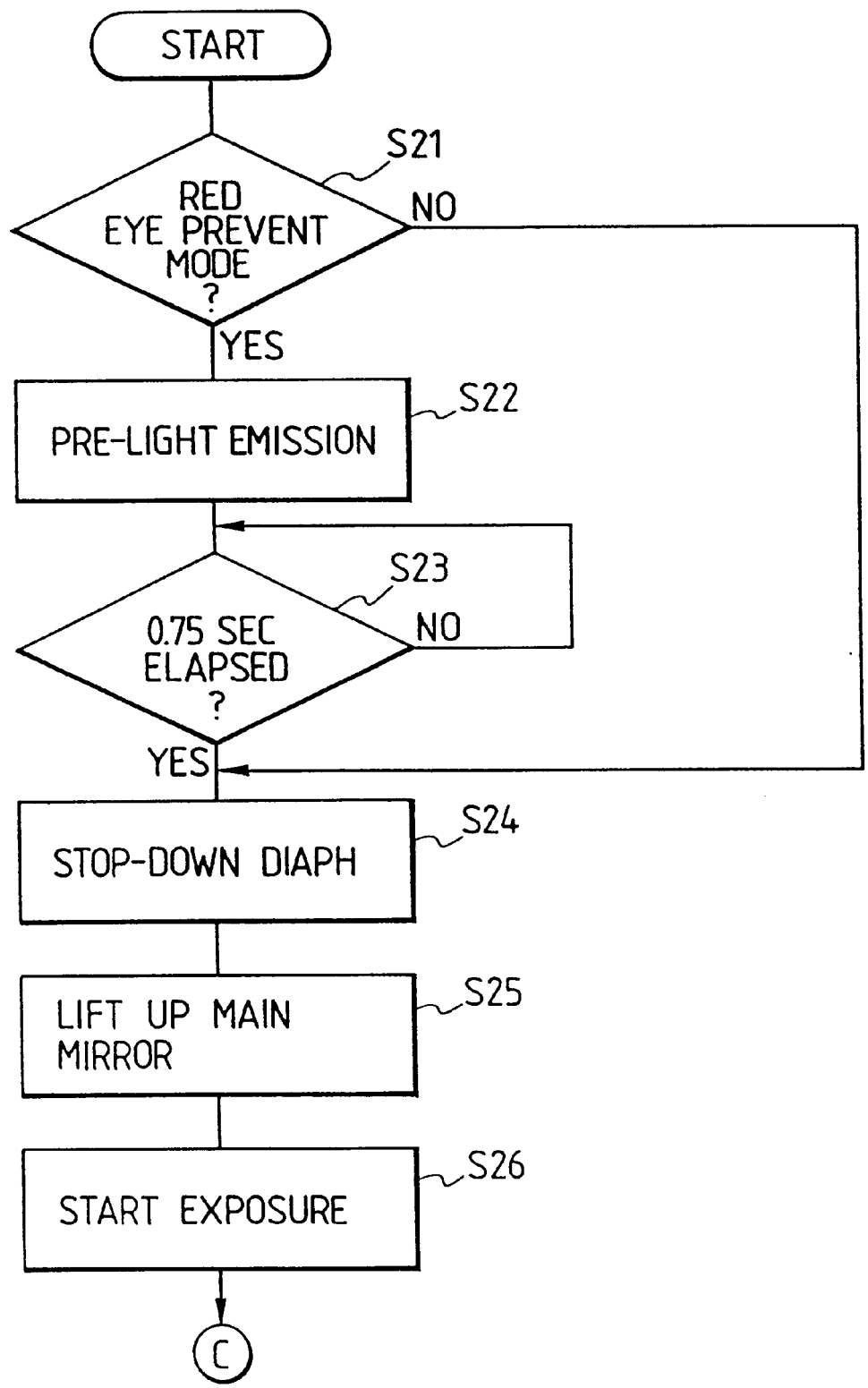

As the second switch SW2 is turned on in this state, the interrupt routine shown in FIGS. 5 to 7 is performed. Referring first to FIG. 5, in Step S 21, a judgment is executed as to whether the camera has been set in the red-eye effect prevention mode. If the answer is YES, the process proceeds to Step S 22, and a discharge instruction 115 is delivered to the pre-light-emission device 11 thereby causing the xenon tube XE2 to flash so as to illuminate the person to be photographed. In consequence, the eyes of the person as the photographing object are illuminated with the pre-light-emission light so that te pupils contract.

In Step S 23, a judgment is executed as to whether a predetermined time, e.g., 0.75 second, necessary for the pupil diameter to be minimized, has elapsed after the emission of the light from the xenon tube XE2. This judgment is executed by starting a timer simultaneously with the delivery of the discharge instruction to the xenon tube XE2. If the answer is NO, the process stays on Step S 23 until the above-mentioned time expires. Conversely, if the answer is YES, the process proceeds to Step S 24 in which the diaphragm is operated through the camera control circuit 5. Then, in Step S 25, the main mirror is lifted up. In Step S 26, the shutter front curtain is made to run to start exposure and, thereafter, whether the electronic flash device 10 is used is judged in Step S 27.

If the answer to the question posed in Step S 27 is NO, the process proceeds to Step S 31 in which a judgment is executed as to whether a predetermined exposure time has elapsed. If the answer is NO, the process stays on Step S 31 until the predetermined exposure time elapses. Conversely, if the answer is YES, the process proceeds to Step S 34 of FIG. 7 in which the rear shutter curtain is made to run thereby terminating the exposure. Then, in Step S 35, the main mirror is set down whereby the routine is completed.

Conversely, if the answer to the question posed in Step S 27 is YES, the process proceeds to Step S 28 in which a judgment is executed as to whether the aperture has been fully opened. If the answer is NO, Step S 28 is maintained until the aperture is fully opened. If the aperture has been fully opened, a discharge start instruction is given to the discharge circuit 103 of the electronic flash device 10 in Step S 29 thereby starting flashing of the xenon tube XE1. The process then proceeds to Step S 30 in which a judgment is executed as to whether the aperture opening time has become equal to a set synchronization time. If the answer is YES, the process proceeds to Step S 34.

When the answer to the question posed in Step S 30 is NO, the process proceeds to Step S 32 which determines whether the amount of light emitted from the xenon lamp 1 has reached a predetermined value. This judgment is conducted in accordance with the photometric data which is input from the light emit amount control circuit 12 to the CPU. If the answer to the question posed in Step S 32 is NO, the process returns to Step S 30. However, if the answer is YES, the process proceeds to Step S 33 in which a discharge termination instruction is given to the discharge circuit 103 thereby stopping the discharge in the xenon tube XE1. Then, the process proceeds to Step S 34. According to this routine, the flash-assisted exposure is conducted when the pupil size has been minimized, whereby the generation of the red-eye effect is prevented.

Thus, in the process described hereinbefore, the CPU judges that the red-eye effect is possible to occur on condition that the object distance D as determined in Step S 3 meets the condition of θ<2° while the object brightness B is below a predetermined level. In such a case, the CPU operates the pre-light-emission device 11 so as to present occurrence of red-eye effect. When either one or both of these two conditions are not met, the CPU does not operate the pre-light-emission device 11, so that loss of photo opportunity due to unnecessary pre-light-emission is avoided and wasteful use of the battery power is prevented.

Referring to FIG. 1, a display light-emitting diode (referred to as LED) 13 set in the viewfinder is connected to the camera control circuit 5. The CPU judges whether the present photographing conditions may cause red-eye effect, on the basis of the object distance D and the object brightness B. Upon judging that the red-eye effect may occur, the CPU operates the LED 13 through the camera control circuit 5 to make the LED flicker, thereby informing the user of the possibility of occurrence of the red-eye effect.

A third switch SW3 connected to the CPU is operatively associated with a momentary type button for operating the red-eye effect prevention device. The third switch SW3 produces a red-eye effect prevention instruction when it is turned on for the first time and a red-eye effect prevention dismissal instruction when turned on for the second time. The camera is set in the red-eye effect prevention mode in response to the red-eye effect prevention instruction and this mode is dismissed in response to the dismissal instruction.

Figure 8:
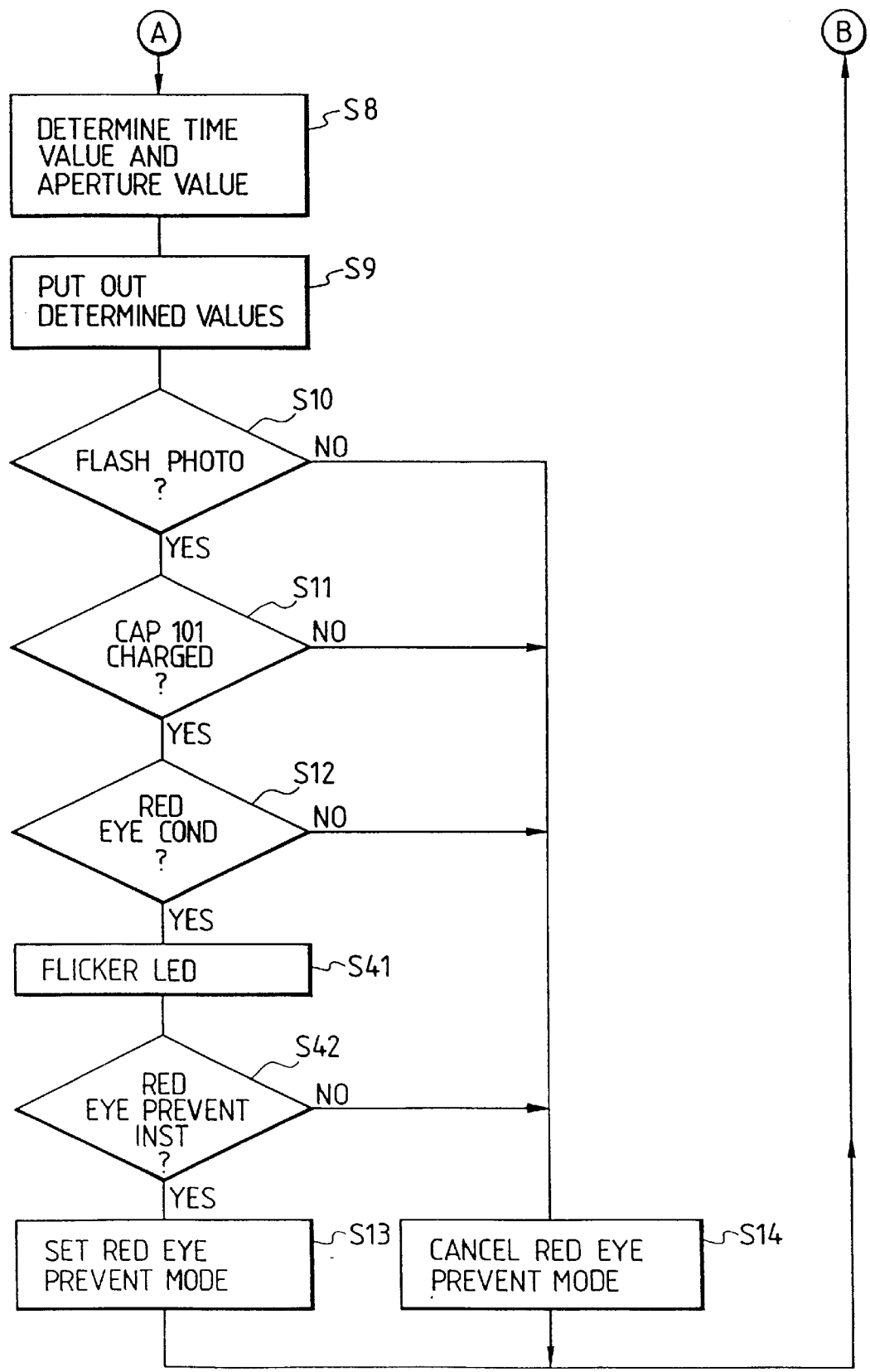
FIGS. 8 to 10 are flow charts of different modifications of the main routine.

FIG. 8 shows an example of the operation which is conducted when the camera incorporates the LED 13 and the third switch SW3. The flow shown in FIG. 8 is substituted for the flow shown in FIG. 3. In this Figure, therefore, the same step Nos. are used to identify the same steps as those in the flow shown in FIG. 3. The description therefore will be focused mainly on the features which discriminate the flow of FIG. 8 from the flow of FIG. 3.

When the present photographing conditions are judged as possibly causing red-eye effect in Step S 12, the process proceeds to Step S 41 in which the LED 13 is made to flicker. The process then proceeds to Step S 42 in which a judgment is executed as to whether the red-eye effect prevention instruction has been given by the third switch SW3 which is turned on only when the red-eye effect prevention button is pressed. It will be seen that the third switch SW 3 alternatingly produces the red-eye effect prevention instruction and the red-eye effect prevention dismissal instruction each time it is turned on through the red-eye effect prevention button. The "on" state of the switch can be received each time the camera power supply is in "on" state. The red-eye effect prevention instruction is turned off upon completion of exposure of each frame, thereby avoiding the possibility of any unnecessary pre-light-emission.

If the answer to the question posed in Step S 42 is YES, the process proceeds to Step S 13 in which the camera is set in the red-eye effect prevention mode. The process then returns to Step S 2. Conversely, if the answer is NO, the process returns to Step S 2 via Step S 14 in which the red-eye effect prevention mode is dismissed.

According to this process, the LED 13 flickers to inform the user of the possibility of occurrence of red-eye effect when the CPU has judged that the present photographing conditions have such a possibility. The user then manipulates the button of the red-eye effect prevention device, before pressing the second switch SW2, so that a pre-light-emission is performed by the xenon tube XE2 of the pre-light-emission device 11 in advance of the flashing of the xenon tube XE1 of the electronic flash device 10. However, in case that the photographer has operated the second switch SW2 without turning on the button of the red-eye effect prevention device, the xenon tube XE1 of the electronic flash device 10 alone flashes without being preceded by the pre-light-emission. The photographer therefore can select freely either the mode in which the pre-light-emission is executed and a mode in which the pre-light-emission is omitted. For instance, when no person exists in the field of the object to be photographed, pre-light-emission is unnecessary because there is no possibility of occurrence of red-eye effect. In consequence, the photographer can take a photograph with good timing, without being disturbed by unnecessary pre-light-emission.

In the described embodiment, the CPU judges that a red-eye effect may occur when both the condition of the object distance D being greater than the value given by the formula (1) and the condition of the object brightness being below a predetermined level are simultaneously met. However, the possibility of occurrence of red-eye effect is still large even if both of these conditions are not simultaneously met, i.e., even when either one of these conditions is not met. Thus, the described embodiment may be modified such that the red-eye effect prevention function is put into effect when either one of these conditions is met. A modification also is possible such that whether the red-eye effect may occur is judged upon consultation with a table which stores the data concerning such a possibility on a plurality of combinations between each of a plurality of sections or steps of the object distance D and each of a plurality of sections or steps of the object brightness B.

It is also to be noted that the described embodiment can also be applied to a camera of active range finding type in which light is projected from the camera to an object and light reflected from the object is received by a light-receiving element which produces a detection signal to be used in the determination of the object distance, although a single-lens reflex camera has been specifically mentioned in which the object distance D is determined on the basis of the amount and direction of offset of the object image plane from a predetermined image forming plane on the basis of signals from a pair of light-receiving elements.

Figure 9:
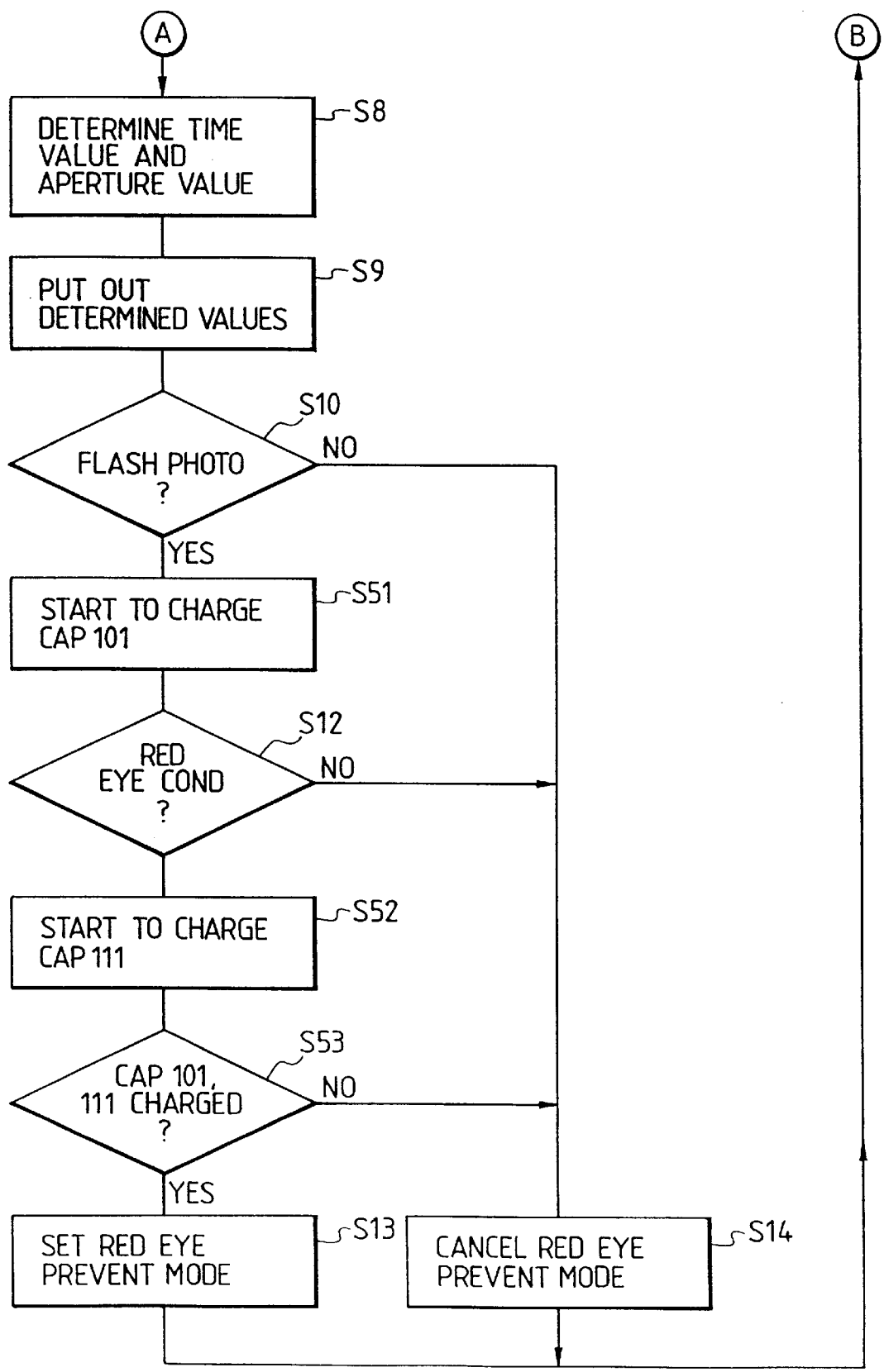

A description will be given with reference to FIG. 9 as to a modification in which the occurrence of pre-light-emission for preventing occurrence of red-eye effect is determined on the basis of the state of charging of the main capacitor 101 of the electronic flash device 10 so as to enable omission of the pre-light-emission in the event that the main capacitor 101 has not been charged sufficiently. The flow shown in FIG. 9 is substituted for the flow shown in FIG. 3 and, therefore, the same step Nos. are used in FIG. 9 to indicate the same steps as those appearing in the flow chart shown in FIG. 3.

If the use of the electronic flash device 10 is confirmed in Step S 10, the process proceeds to Step S 51 in which the charging of the main capacitor 101 of the electronic flash device 10 is started. The process then proceeds to Step S 12 which executes judgment as to whether the present photographing conditions may cause red-eye effect.

If an affirmative answer is obtained in Step S 12, charging of the capacitor 111 of the pre-light-emission device 11 is commenced in Step S 52. Subsequently, in Step S 53, the charging circuit 102 of the electronic flash device 10 delivers a charge completion signal and, at the same time, a judgment is executed as to whether the charge-up signal has been delivered by the charging circuit 112 of the pre-light-emission device 11. Namely, whether both the main capacitor 101 of the electronic flash device 10 and the capacitor 111 of the pre-light-emission device 11 have been charged. Upon confirming the charge-up signals from both charging circuits, the process proceeds to Step S 13 in which the camera is set for operation in the red-eye effect prevention mode. However, if one of these charge-up signals is missed, the red-eye effect prevention mode is dismissed in Step S 14.

Thus, according to the flow shown in FIG. 9, the CPU judges that the red-eye effect may occur when the object distance D is greater than a value which provides a condition of $\theta<2°$ while the object brightness B is below a predetermined reference level. When flash-assisted exposure is to be conducted under such conditions, the CPU operates the pre-light-emission device 11 in advance of the main flash, on condition that both the main capacitor of the electronic flash device 10 and the capacitor of the pre-light-emission device have been charged up. Thus, the pre-light-emission device 11 is not allowed to operate when one of the following states is confirmed: (1) the photographing mode is not the flash-assisted mode; (2) at least one of the capacitors has not been charged up; and (3) the present photographing conditions are judged as not possibly causing red-eye effect. It is to be understood, however, the flash-assisted photography can be executed by adopting the interrupt routine of FIGS. 5 to 7 which enables the xenon tube XE1 to flash, even if the main capacitor 101 has not been charged up. The detection of the state of charging of the capacitor of the pre-light-emission device 11 is not essential. The arrangement may be such that the pre-light-emission device 11 operates regardless of the state of charging of its capacitor, provided that the main capacitor 101 has been charged up.

A modification of the process shown in FIG. 9 will be described with reference to FIGS. 10 and 11.

Figure 10:
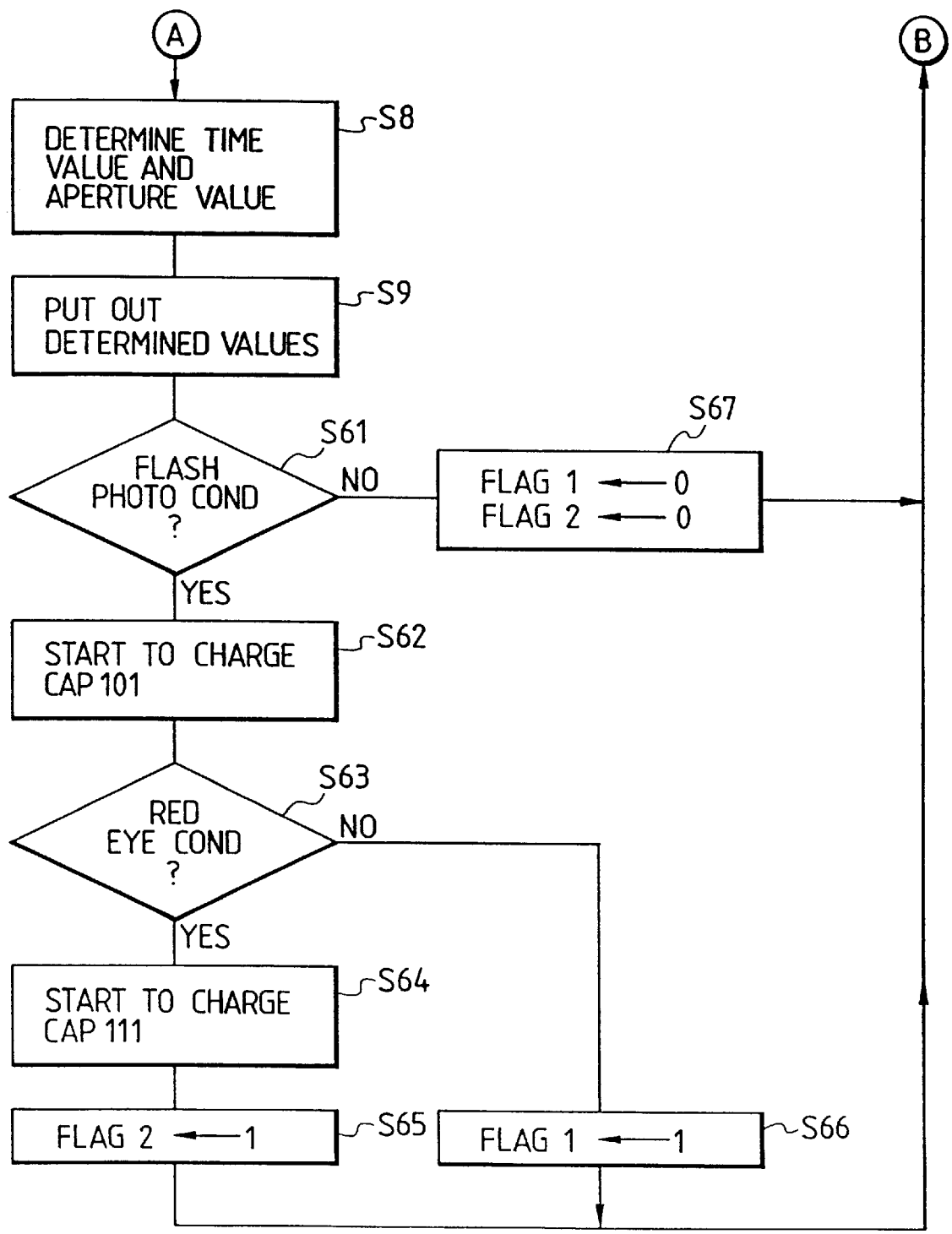
Figure 11:
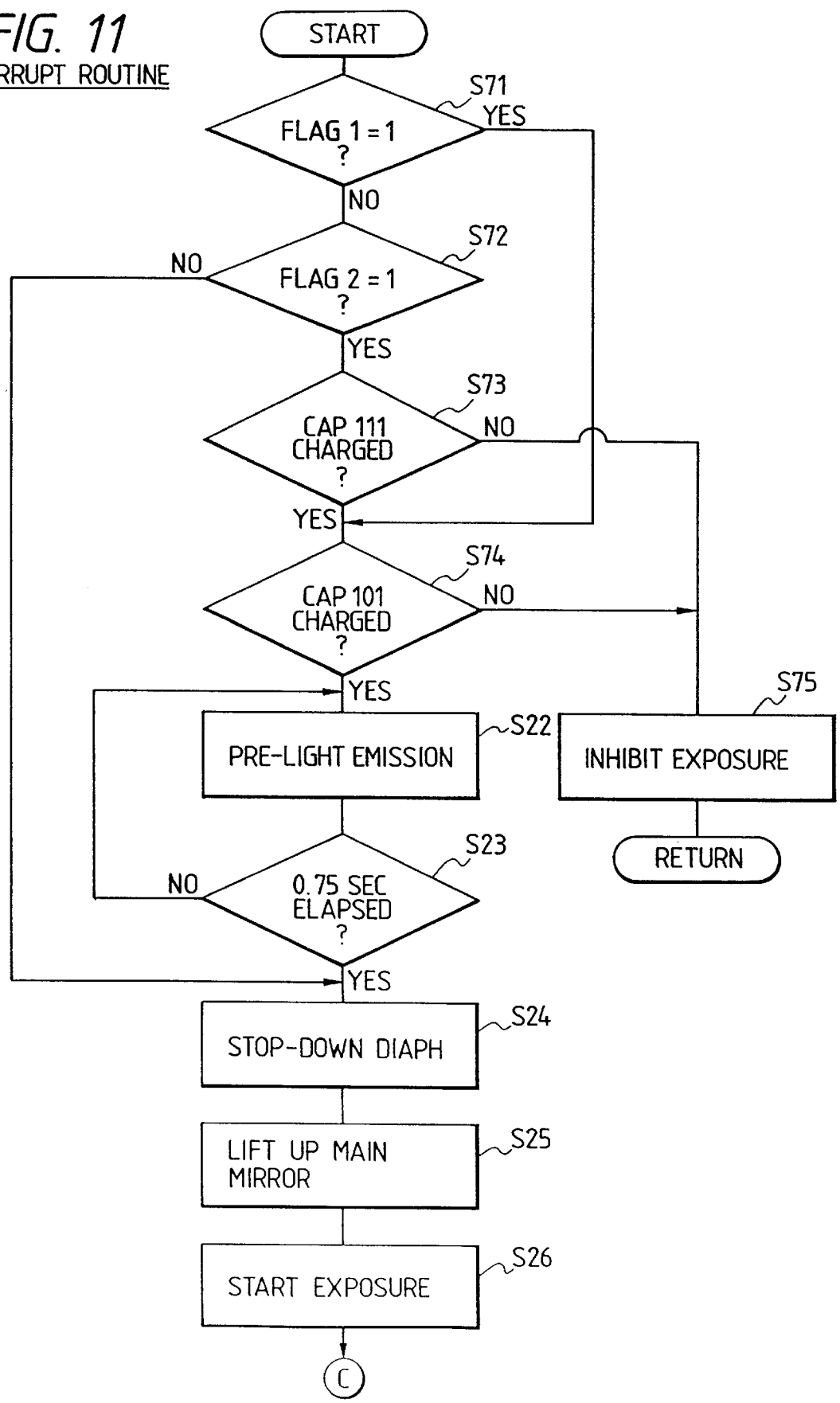
FIGS. 11 to 14 are flow charts showing different modifications of interrupt routines.

The flow shown in FIG. 10 is substituted for Steps S 8 to S 14 in the flow of FIG. 9, while the flow shown in FIG. 11 is usable in place of Steps S 21 to S 26 in the flow of FIG. 5. Thus, the same Step Nos. are used in FIGS. 10 and 11 to indicate the same Steps as those in FIGS. 5 and 9, respectively.

Referring to FIG. 10, the proces proceeds from Step S 9 to Step S 61 which judges whether the electronic flash device 10 is to be used or not, as in Step S 10 explained before. If the answer is NO. the process proceeds to Step S 67 to reset a flag and then to Step S 2 of FIG. 2. Conversely, when the answer is YES, charging of the main capacitor 101 of the electronic flash device 10 is commenced in Step S 62 and the process proceeds to Step S 63 which judges whether the present photographing conditions may cause red-eye effect, as in the case of Step S 12 explained before. If the answer is NO, the process proceeds to Step S 66 in which a flag FLAG 1 indicative of the use of the electronic flash device 10 alone is set. The process then proceeds to Step S 2 of FIG. 2. Conversely, if the answer to the question posed in Step S 63 is YES, charging of the capacitor 111 of the pre-light-emission device 11 is started in Step S 64 and, in Step S 65, a flag FLAG 2 indicative of the use of both the pre-light-emission device 11 and the electoronic flash device 10 is set. The process then proceeds to Step S 2.

Thus, in this modification, Step S 1 of the flow shown in FIG. 2 is executed in response to turning on of the first switch SW1. Thereafter, Steps S 2–S 9 to Steps S 61–S 67 of FIGS. 2 and 10 are repeatedly executed until the second switch SW 2 is turned on.

The flow shown in FIG. 11 is interrupted when the second switch SW2 is turned on. The interrupt routine is commenced with Step S 71 judging whether FLAG 1 has been set. If not, the process proceeds to Step S 72. Conversely, if an affirmative answer is obtained, the process proceeds to Step S 73 in which whether the capacitor 111 of the pre-light-emission device 11 has been charged is judged. If the answer is YES, the process proceeds to Step S 74 in which a judgment is executed as to whether the main capacitor 101 of the electronic flash device 10 has been charged. If the answer is YES, Steps S 22 to S 26 are executed in the same manner as in the flow shown in FIG. 5 and then the process proceeds to Steps S 34 and S 35 of FIG. 7. If an affirmative answer is given to the question posed in Step S 71, the process proceeds to Step S 74. Negative answers in Steps S 73 and S 74 causes the process to proceed to Step S 75 in which a release lock is put into effect so as to inhibit the exposure. The process then returns.

Thus, in this modification, the release lock is put into effect so as to inhibit the pre-light-emission and the exposure when either one of the capacitors 111 and 101 has not been sufficiently charged up under photographing conditions which necessitate the use of both the pre-light-emission device 11 and the electronic flash device 10.

The release lock is put into effect also in photographing conditions which necessitate the electronic flash device 10 alone, whenever the main capacitor 101 has not been charged up.

The described embodiment may be modified such that a warning device operates in response to a red-eye effect prevention instruction so as to inform that the photographing conditions may cause red-eye effect and then the user inputs a pre-light-emission instruction from a separate switch so as to activate the pre-light-emission device on condition that both the main flashing instruction and the charge-up signals are available. In such a modification, the warning device may be omitted so that only the separate switch for inputting the pre-light-emission instruction is added to the described embodiment.

In the described embodiment, the photographing conditions are judged as possibly causing red-eye effect when both the condition of the object brightness B being below a predetermined reference level and the object distance D being greater than a predetermined value are met. Under a comparatively bright condition such as at twilight time, the red-eye effect is not liable to occur even when the object brightness is below the predetermined reference level. The red-eye effect is more liable to occur in the darkness. Taking this fact into consideration, the described embodiment may be modified such that the threshold or reference object distance is set to be comparatively large and comparatively small, respectively, when the photographing condition is comparatively bright and dark, when the object brightness is below the predetermined reference level.

A description will be given of an arrangement which is capable of informing the person to be photographed that a main flashing for the exposure is conducted following a pre-light-emission for preventing the red-eye effect, with specific reference to FIG. 12.

Figure 12:
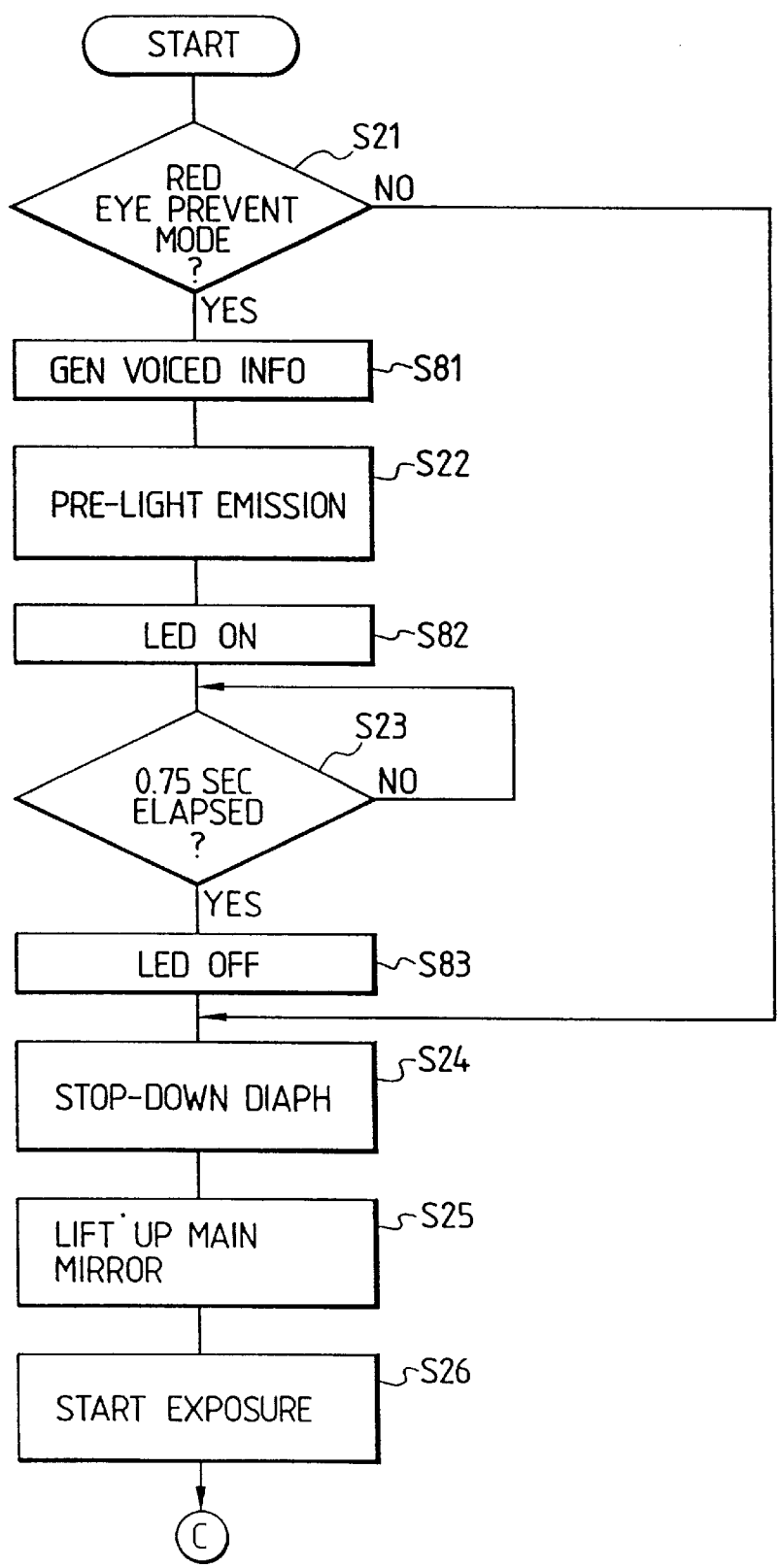

The flow shown in FIG. 12 can be used in place of the Steps S 21 to S 26 of the flow shown in FIG. 5.

As the second switch SW2 is turned on, the interrupt routine shown in FIGS. 12, 6 and 7 is started. If an answer YES is given to the question posed in Step S 71, a voice generating signal is given to the voice generating circuit 14 so that the speaker 15 generates voice to inform the person to be photographed that a pre-light-emission for the purpose of prevention of red-eye effect is going to be performed. Then, the process proceeds to Step S 22 in which a discharge start instruction 115 is produced to activate the xenon tube XE2 thereby applying pre-light-emission light to the person to be photographed. In consequence, the pupils of the person's eyes gazing at the flashing light contract.

Then, in Step S 82, a lighting signal is delivered to the camera control circuit 5 so that the process proceeds to Step S 23. This step judges whether a predetermined time, e.g., 0.75 second, necessary for the pupil diameter to be minimized, has elapsed after the flashing of the xenon tube XE2. If the answer is YES, the process proceeds to Step S 83 in which a display stop signal is given to the camera control circuit 5 thereby turning the LED 13 off. Then, the same steps are followed as those explained before.

This process ensures that the person to be photographed gazes at the camera without fail when pre-light-emission for preventing occurrence of red-eye is performed, by virtue of the voice message which inform the person of the fact that the pre-light-emission is going to be executed.

Furthermore, since the LED 13 on the front side of the camera lights up between the flashings of the xenon tube XE2 and the xenon tube XE1, the person to be photographed can correctly understand that the exposure has not been completed when the xenon lamp XE2 has flashed but is conducted only at the time of flashing of the xenon tube XE1, so that the person continues to gaze at the camera without fail after the pre-light-emission, until the main flashing of the xenon tube XE1 is over.

The warning by the LED 13 effected in Step S 82 may be replaced by voice warning. Either one or both of voice warning and lighting of an LED may be used in each of Steps S 81 and S 82. Obviously, warning by voice may be replaced with a buzzer type warning means.

Figure 13:
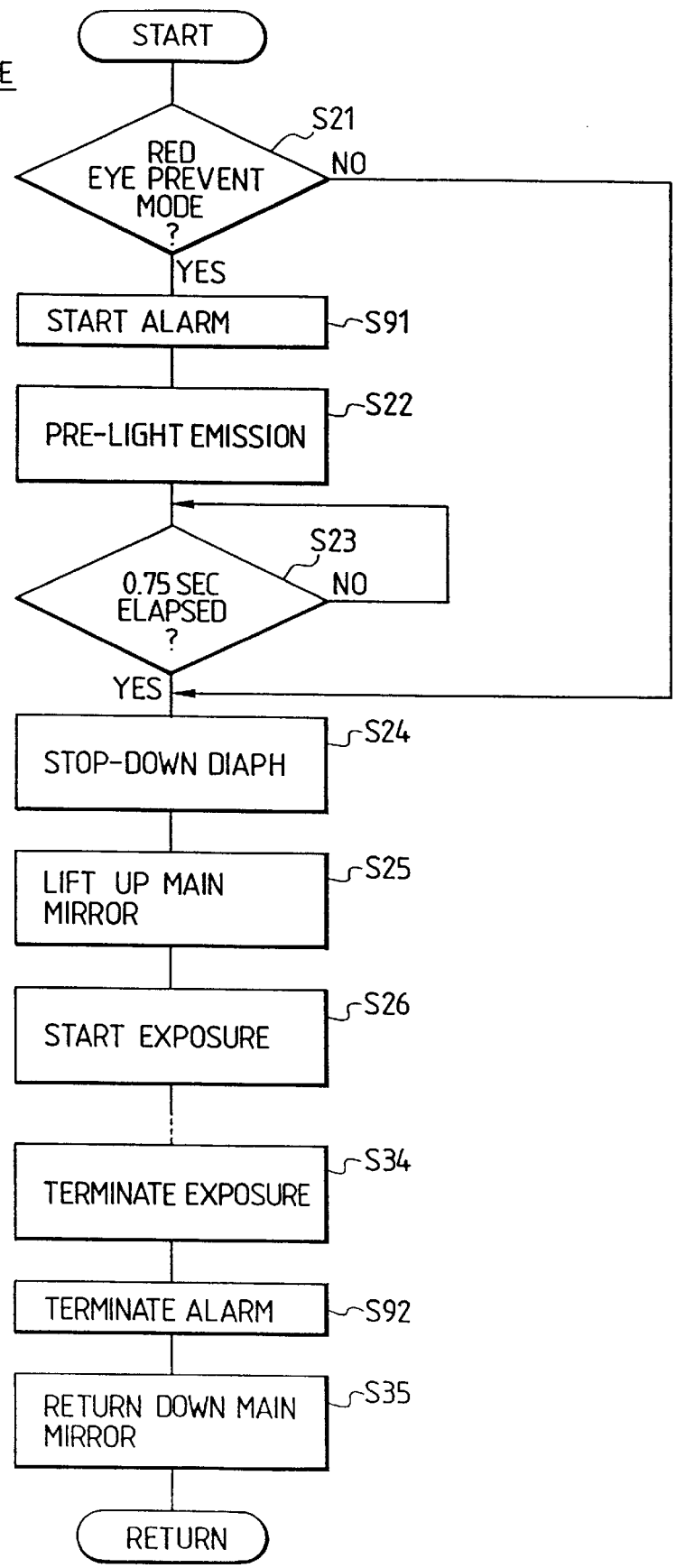

In an alternative arrangement shown in FIG. 13, when the red-eye effect prevention mode is confirmed in Step S 21 of the release interruption routine, the process proceeds to Step S 91 in which the warning by means of a voice, warning sound or flickering of an LED is started and, after execution of Steps S 22 to S 34 to complete the exposure, the warning ceases in Step S 92. With this arrangement, it is possible to make the person to be photographed gaze at the camera from the moment before the pre-light-emission for preventing red-eye effect till the completion of the exposure.

Preferably, an existing warning or informing device such as a self-timer informing device is used also as the warning device such as the LED 13, voice generating circuit 14 or the speaker 15.

A description will be given of a modification in which the amount of light emitted from the pre-light-emission device is controlled in accordance with the object distance, such that a constant amount of light is received by the photographing object.

Figure 14:
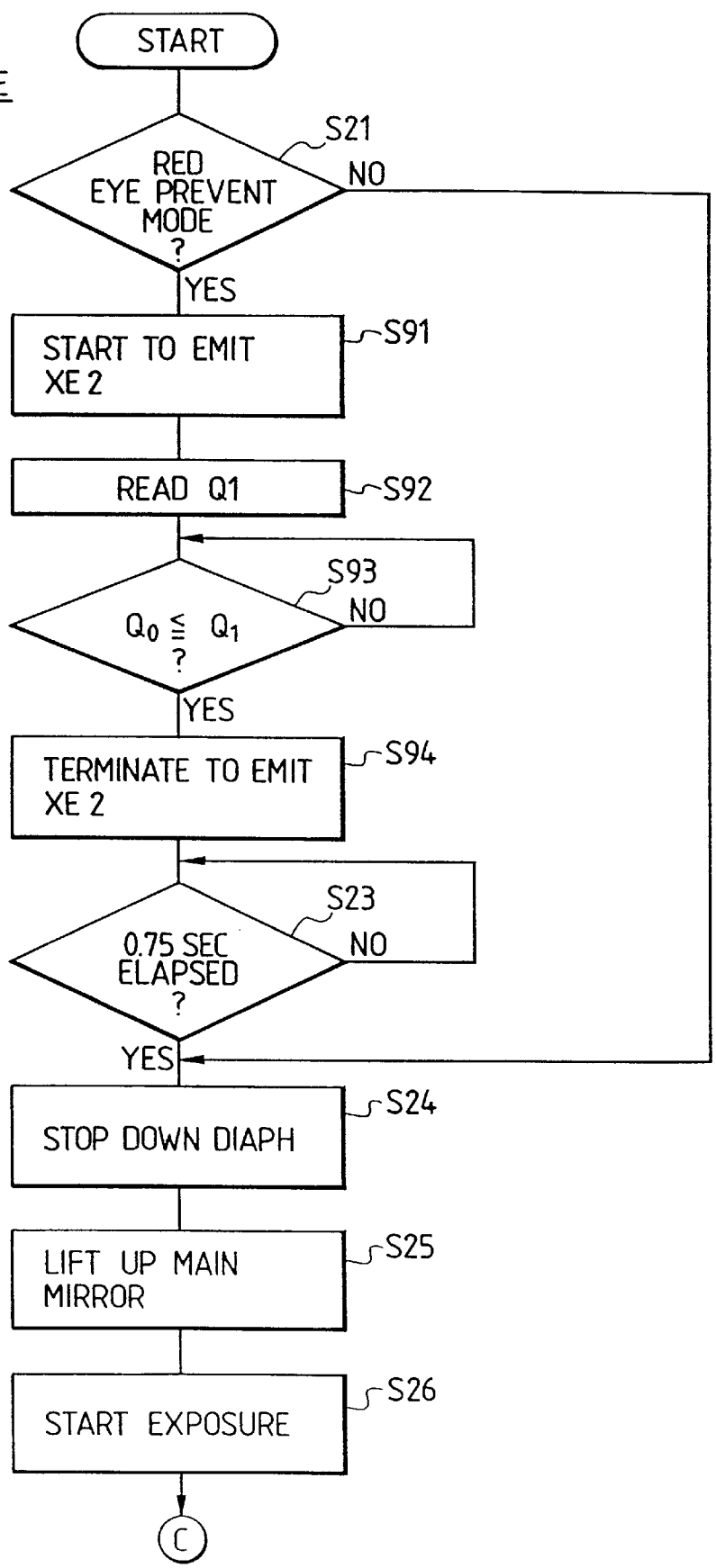

FIG. 14 shows a flow chart of a process which executes the control of the amount of flash light emitted from the pre-light-emission device. The interrupt routine as shown in FIGS. 14, 6 and 7 is started as the second switch SW2 is turned on. If the camera has been set for operation in red-eye effect prevention mode in Step S 21, the process proceeds to Step S 19 in which a discharge instruction is given to the discharge circuit 113 so that the xenon tube XE2 is activated to perform pre-light-emission. Then, in Step S 92, the light quantity $Q_1$ on the photographing object as detected by the photometering circuit 4 is read and, in Step S 93, a judgment is executed as to whether this light quantity $Q_1$ is greater than a predetermined reference light quantity $Q_0$. When the detected light quantity $Q_1$ has reached the same level as the reference light quantity $Q_0$, a discharge termination instruction is given to the discharge circuit 113 in Step 94, whereby the discharge in the xenon tube XE2 ceases. As a result of the pre-light-emission, the pupils of the eyes of the person to be photographed, who has gazed at the camera, reduce their diameters.

Then, after elapse of the time required for the pupil diameter to be minimized, e.g., 0.75 second, steps of the routine shown in FIGS. 6 and 7 are executed.

Thus, the flashing of the xenon tube XE2 terminates when the light quantity $Q_1$ of the light applied to the photographing object is increased to the level of the predetermined reference light quantity $Q_0$, so that the quantity of the pre-light-emission light received by the object is maintained substantially constant regardless of the object distance. The reference value $Q_0$ of the light quantity is selected so as to bring about a satisfactory red-eye effect prevention without to dazzling on the person to be photographed. Therefore, the person to be photographed is relieved from dazzle which may otherwise be caused by an excessively large quantity of the pre-light-emission light, even when the object distance is small. In addition, a sufficiently large quantity of pre-light-emission light received by the photographing object is ensured even when the object distance is large, thus ensuring prevention of red-eye effect which may otherwise be caused due to shortage of the pre-light-emission light.

The arrangement may be such that a pre-light-emission device incorporating a pair of discharge tubes is used in place of the pre-light-emission device shown in FIG. 1, the tubes being operative such that one of the discharge tubes operates when the object distance is small and both discharge tubes operate when the object distance is large.

Figure 15:
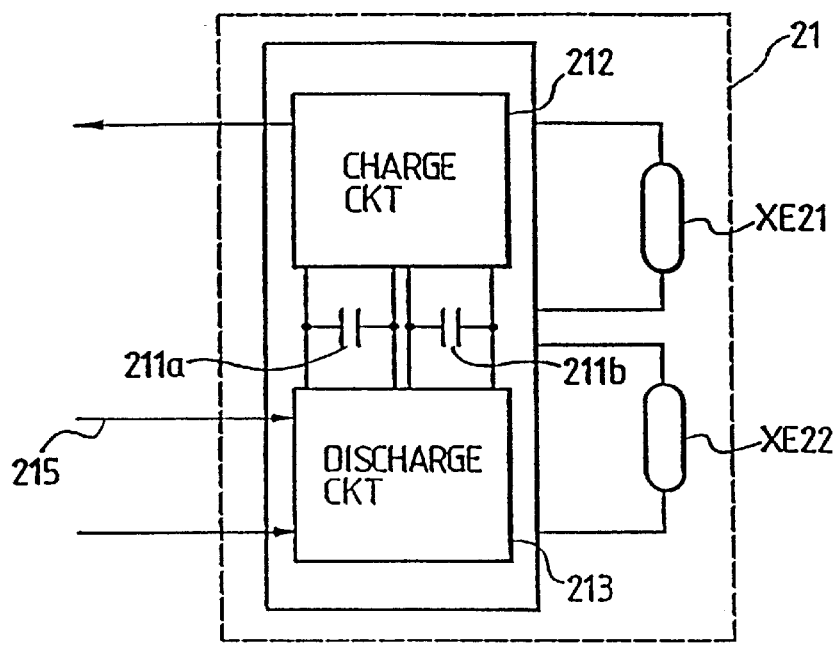
FIG. 15 is a circuit diagram of a modification of a pre-light-emission device.

More specifically, a pre-light-emission device 21 shown in FIG. 15 includes a pair of xenon tubes XE21 and XE22, a pair of capacitors 211a and 211b for storing electric charges to be discharged in the respective xenon tubes, and a charging circuit 212 and a discharge circuit 213 similar to those used in the described embodiment. The charging circuit 212 is capable of charging both capacitors in accordance with an instruction given by the CPU, while the discharge circuit 213 allows the xenon tubes XE21 and XE22 to fully discharge in accordance with the amount of the charges stored in the capacitors.

In this case, a region which is farther than the reference object distance $D_0$ is divided into two regions; namely, a farther region and a nearer region. If the object is recognized to be in the farther region, the CPU delivers to the discharge circuit 213 a discharge instruction 215 for activating both xenon tubes. Conversely, when the photographing object is in the nearer region, the CPU delivers to the discharge circuit a discharge instruction 215 which enables only one of two xenon tubes to flash. Other portions are materially the same as those in the arrangement shown in FIG. 1, so that detailed description is omitted in regard to these portions.

Figure 16:
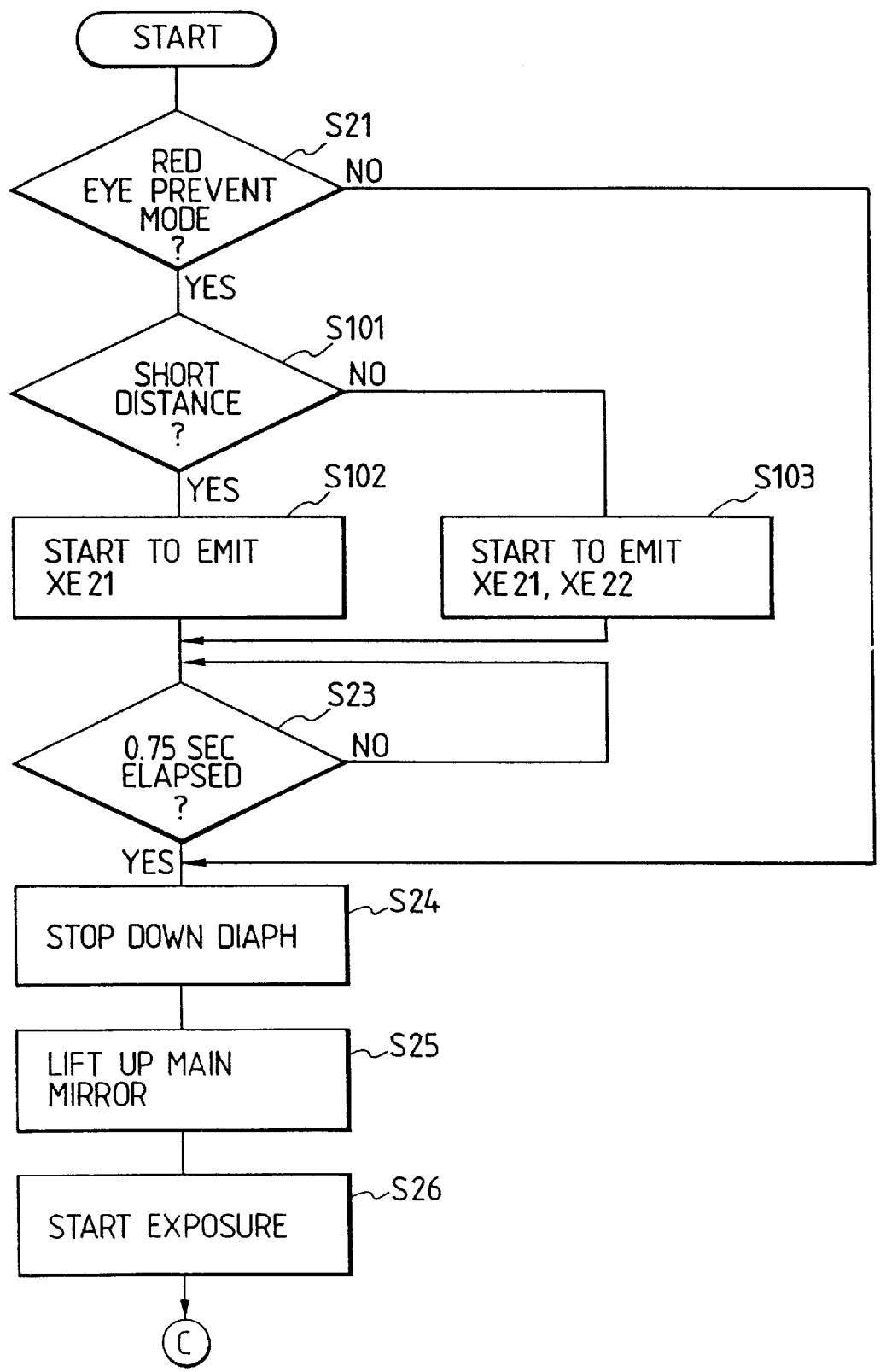
FIG. 16 is a flow chart of a modification of the interrupt routine.

A process performed by the CPU for effecting such a control of two xenon lamps according to the object distance will be explained with reference to a flow chart shown in FIG. 16 in which the same reference numerals are used to denote the same steps as those in FIG. 5.

When setting of the camera for operation in the red-eye effect prevention mode is confirmed in Step S 21 in the release interrupt routine, the process proceeds to Step S 101 in which a judgment is executed as to whether the object distance D ranges in the farther region or the nearer region. If the object is in the nearer region, the process proceeds to Step S 102 in which a discharge instruction is given to enable the xenon tube XE21 to flash and then the process proceeds to Step S 23. Conversely, when the object is in the farther region, the process proceeds to Step S 103 in which a discharge instruction is given so as to activate both the xenon tubes XE21 and XE22. The process then proceeds to Step S 23.

Obviously, three or more xenon tubes may be used though an example having two xenon tubes has been described. In such a case, the region beyond the reference object distance $D_0$ is divided into a plurality of regions and the number of the xenon tubes taking part in the pre-light-emission is increased in correspondence with an increase in the object distance.

Although the described embodiments incorporate flash-type pre-light-emission device, the pre-light emission may be performed by an ordinary lamp. In such a case, the intensity of the light from the lamp is changed by varying the voltage applied to the lamp suitably in accordance with the object distance. When a single pre-light-emission tube is used, the arrangement may be such that the frequency of the pre-light-emission tube is changed in accordance with the object distance so as to provide a substantially constant light quantity of the pre-light-emission light.

In the described embodiments, the brightness of the object as measured by the exposure control photometering circuit is used as one of the conditions for judging the possibility of occurrence of red-eye effect. This, however, is not exclusive and the arrangement may be such that a photometering circuit capable of metering the brightness on the rear side of the camera is used in place of the exposure control photometering circuit. This is because the red-eye effect may not be produced provided that the sight on the rear side of the camera which is viewed by the person to be photographed is bright, even when the brightness of the photographing object is judged as possibly causing the red-eye effect.

Figure 17:
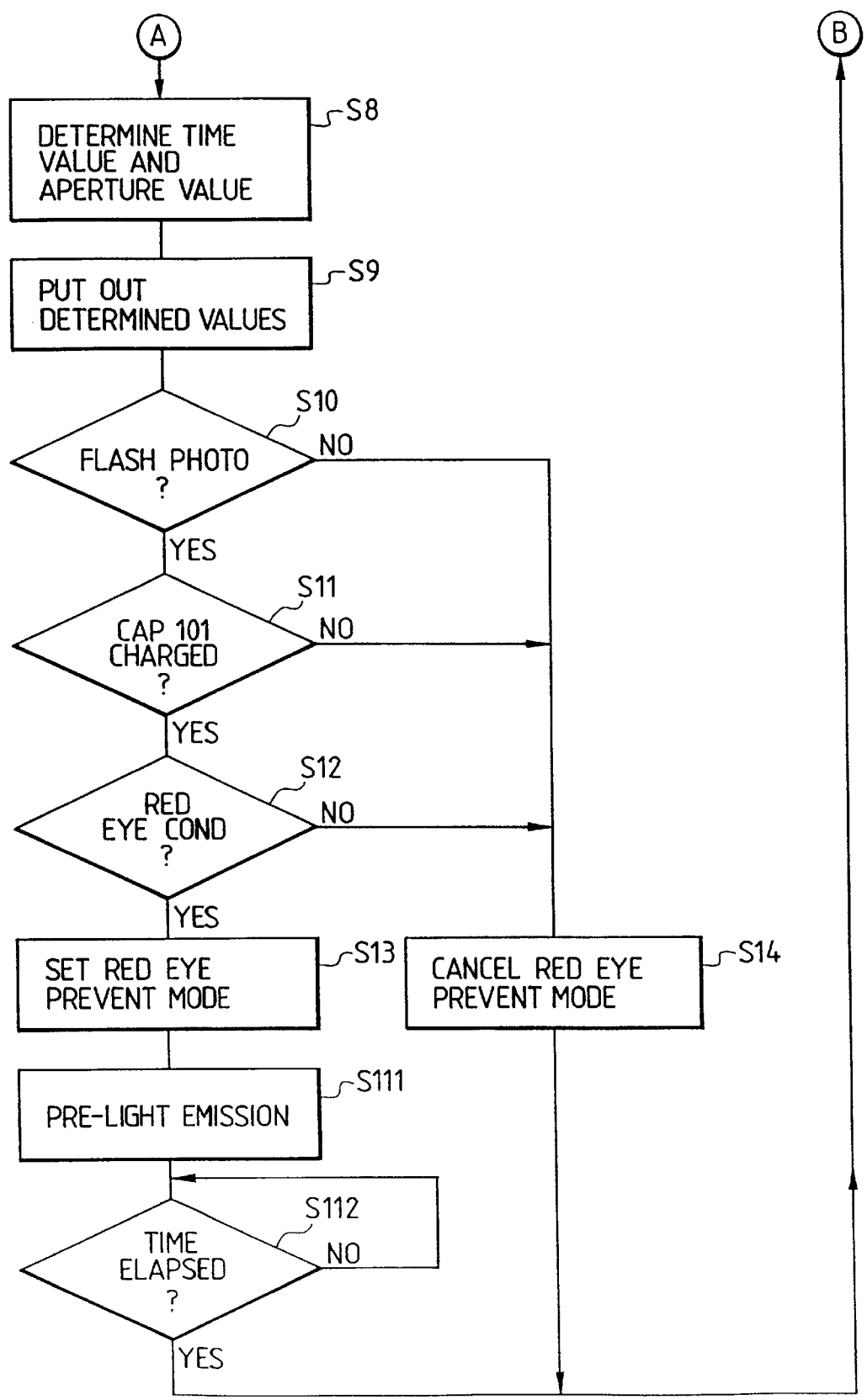
FIG. 17 is a flow chart showing a modification of the main routine.

A modification will be described with reference to FIGS. 17 and 18 in which the pre-light-emission is repeatedly conducted at a predetermined time interval in response to the pressing of the release button to the bottom of the first stroke so as to keep the pupils of the eyes of the person to be photographed in such a contracted state as to prevent occurrence of the red-eye effect.

In Step S 13, the red-eye effect prevention mode is set as is in the case of the process shown in FIG. 3. The process then proceeds to Step S 111 and then to Step S 112 in which a discharge instruction is given to the pre-light-emission device 11 so as to cause the xenon tube XE2 to illuminate over a predetermined period. The process then returns to Step S 2 and subsequent Steps are followed as explained before. This routine is repeated so that the pre-light-emission for preventing the red-eye effect is repeatedly executed at a predetermined time interval T until the switch SW2 is turned on as a result of completion of the second stroke of the release button or until the switch SW1 is turned off as a result of dismissal of pressing of the release button.

Figure 18:
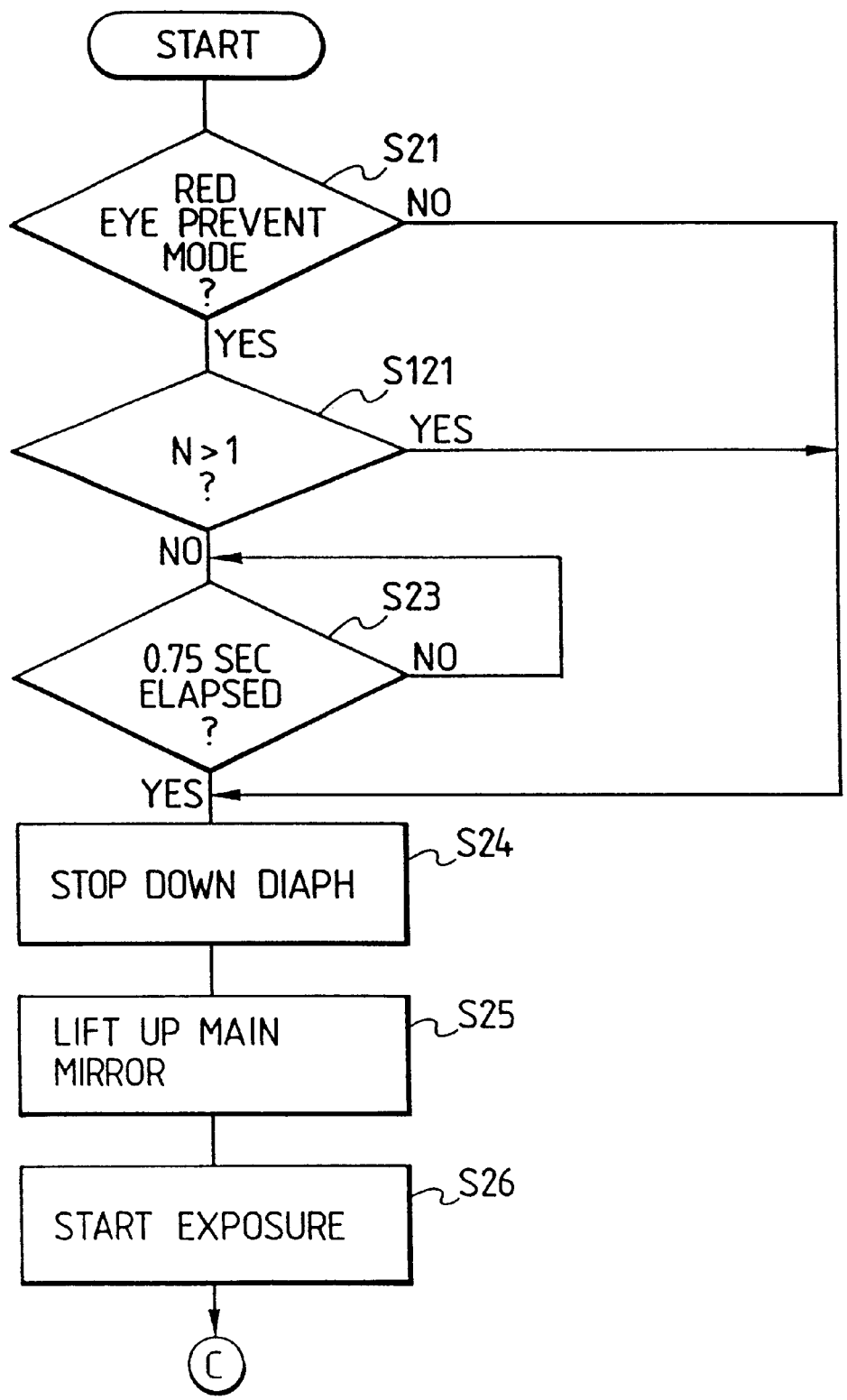
FIG. 18 is a flow chart showing a modification of the interrupt routine.

As the second switch SW2 is turned on, the interrupt routine shown in FIGS. 18, 6 and 7 is started. If the camera has been set for operation in the red-eye effect prevention mode, the process proceeds to Step S 121 in which the number N of repetitions of the pre-light-emission is determined. If the number is 1 (one), the process proceeds to Step S 23, whereas, if the number is 2 (two) or greater, the process proceeds to Step S 24 skipping over Step S 23, so that the flashing operation is executed without delay.

Figure 19:
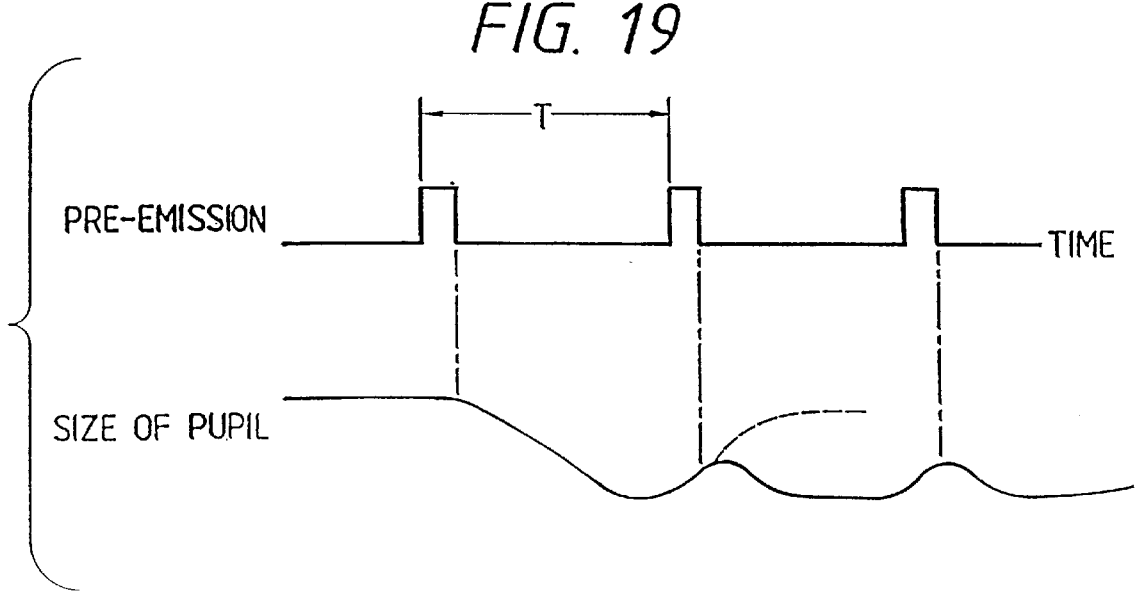
FIG. 19 is a timing diagram showing the relationship.

FIG. 19 shows how the pupil size is changed in relation to time in response to repeated pre-light-emission. The pupil size decreases in response to a first pre-light-emission but tends to increase again. However, if the second and third pre-light-emissions are effected before the pupil size increases to such a degree as to allow red-eye effect to occur, the pupil size further decreases as a result of these successive pre-light-emissions. In consequence, the pupil is maintained at such a small size as not to allow the occurrence of red-eye effect.

The pupil size gets smaller as the brightness of the environment increases and the time required for the pupil to become large to a degree which allows the occurrence of red-eye effect increases correspondingly. The time interval T, therefore, is preferably controlled in accordance with the brightness of the object. Such a control eliminates any unnecessary pre-light-emission and suppresses wasteful use of the electric power.

A description will be given hereinafter of an embodiment which employs a specific control of pre-light-emission during successive continuous flash-assisted shots.

If a predetermined time has passed after the immediately preceding flashing of the main flash device, the pre-light-emission for preventing red-eye effect is executed in advance of operation of the main flash device. However, if the predetermined time has not passed, the pupils of the person to be photographed are maintained small enough to present occurrence of red-eye effect as a result of flashing in the immediately preceding flash-assisted shot, so that the main flash device operates without being preceded by a pre-light-emission.

In case of a flash-assisted exposure, the CPU operates to effect pre-light-emission in response to manipulation of the second switch SW2 and, when 0.75 second has elapsed thereafter, effects a shutter release operation accompanied by main flashing of the electronic flash device. Time measurement is started simultaneously with a main flashing and, when the next flash-assisted exposure is to be conducted before the expiration of a predetermined time which is, for example, 1.3 second, the operation of the pre-light-emission device is prohibited and the next exposure with the assist of the main flash is performed without delay in response to pressing of the second switch SW2. The predetermined time is typically a time over which the pupil size is maintained so small as not to allow occurrence of red-eye effect.

Referring to FIG. 20, when the red-eye effect prevention mode is confirmed in Step S 21, the process proceeds to Step S 131 in which a judgment is executed as to whether 1.3 second has elapsed after the main exposure of the immediately preceding flash-assisted exposure. If the answer is YES, the process proceeds to Step S 22 in which the xenon tube XE2 of the pre-light-emission device 11 is activated to perform a pre-light-emission and, after elapse of a time necessary to cause the pupil to contract, e.g., 0.75 second, an exposure routine beginning with Step S 24 is executed, Conversely, if the answer is NO in Step 131, i.e., when the predetermined time has not elapsed yet, the process proceeds to Step S 24 without activating the pre-light-emission device 11. The measurement of the predetermined time, i.e., 1.3 second, is commenced immediately after execution of Step S 29.

Another example of repeated pre-light-emission will be described hereinunder.

Figure 21:
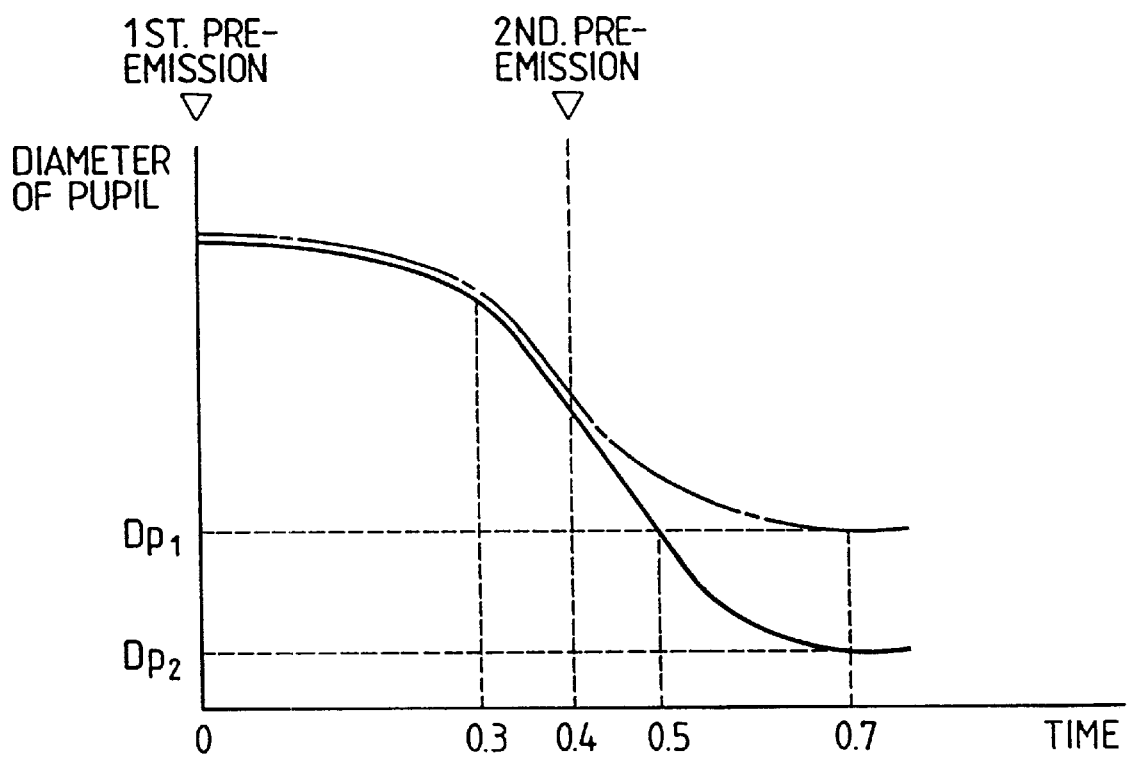
FIG. 21 is a graph showing the relationship between pre-light-emission condition and pupil size.

FIG. 21 shows the manners in which the pupil size decreases in relation to time, when the pre-light-emission device 11 flashes twice with a time interval of 0.4 second and when the same flashes only once, respectively.

As will be seen from the dot-and-dash line, when the pre-light-emission is executed only once, the rate of reduction in the pupil size is drastically increased when 0.3 second has elapsed after the emission but is decreased when 0.45 second has elapsed after the emission. The pupil size is decreased to $D_{P1}$ which is small enough to prevent red-eye effect when 0.7 second has passed after the emission.

In contrast, when the second pre-light-emission is effected, when 0.4 second has passed after the first emission, rapid contraction of the pupil is continued even after elapse of 0.45 second and the pupil diameter $D_{P1}$ is reached when 0.5 second has passed. At a moment which is 0.7 second after the first emission, the pupil size is further decreased to $D_{P2}$ with which the occurrence of red-eye effect is further suppressed.

In this case, the flash-assisted exposure is conducted at a moment which is 0.5 second after the first pre-light-emission and 0.1 second after the second pre-light-emission, at which the pupil diameter has been reduced to $D_{P1}$. However, when a higher red-eye effect is desired, the flash-assisted exposure may be conducted at a moment which is 0.7 second after the first pre-light-emission, in order to attain a higher effect of preventing red-eye effect.

Thus, the second pre-light-emission provides a longer period of rapid contraction of the pupils. In consequence, the time required for the pupil to contract to a predetermined size is shortened, and a smaller pupil size is obtained at the same moment than in the case where the pre-light-emission is performed only once.

The second pre-light-emission is preferably conducted while the pupil size is contracting comparatively rapidly, i.e., in a period which is 0.3 to 0.5 second after the first pre-light-emission, as in the described case, because the second pre-light-emission conducted at such a timing ensures that the rapid contraction of pupil is maintained to shorten the time which is required for the pupil to contract to a predetermined small size after the first pre-light-emission.

An experiment showed that the energy to be consumed for attaining a sufficiently large effect of prevention of red-eye effect is smaller in the case where first and second pre-light-emissions are executed as in the described case than in the case where the pre-light-emission is effected only once.

More specifically, while the flash guide number for preventing red-eye effect by a single pre-light-emission was 2.8, the guide number was about 2.54 in the case where first and second pre-light-emissions were conducted. The guide number in the latter case is a composite guide number determined as a square mean of the guide numbers in the first and second pre-light-emissions. It was also confirmed that the effect for preventing red-eye effect was almost the same even if the guide numbers in the first and second pre-light-emissions are varied in various manners, provided that the composite guide number as the square mean is unchanged. For instance, a substantially equal prevention effect was obtained both in a first case in which the guide numbers were equally set at 1.8 for the first and second pre-light-emissions and a second case in which the guide number in the first pre-light-emission was set at a greater value of 2.08 while the guide number for the second pre-light-emission was set at a smaller value of 1.47. It was also confirmed that the effect is substantially the same even if the first and the second pre-light-emissions were conducted with smaller and greater guide numbers.

When greater and smaller guide numbers are used in the first and second pre-light-emissions, respectively, the time required for the charging of the capacitor to a level which enables the second light emission is advantageously shortened.

Conversely, when smaller and greater guide numbers are used for the first and second pre-light-emissions, respectively, the difference in the stimulus between these light emissions is reduced so that the following advantages are brought about.

The pupil diameter is usually large when the first pre-light-emission is executed. Therefore, if the first pre-light-emission is conducted with a large guide number, the eyes of the person to be photographed are excessively stimulated imparting an unpleasant feeling. Such a problem can be avoided by employing a smaller guide number in the first pre-light-emission so as to reduce the stimulus.

The pupil size has been appreciably reduced when the second pre-light-emission is executed. Therefore, the effect to reduce the pupil size produced by the second pre-light-emission is weakened. This problem, however, can be overcome by applying a greater guide number to the second pre-light-emission than to the first pre-light-emission.

In some cases, the eyes of the person to be photographed may avert from the camera when the first pre-light-emission is performed. However, even in such a case, the second pre-light-emission can produce an appreciable preventing of red-eye effect when the second pre-light-emission is executed with a large guide number. In such a case, the time interval from the second pre-light-emission to the flash-assisted exposure is determined to be comparatively long, e.g., 0.4 to 0.7 second, so as to ensure a sufficient contraction of the pupil caused by the second pre-light-emission alone.

Figure 22:
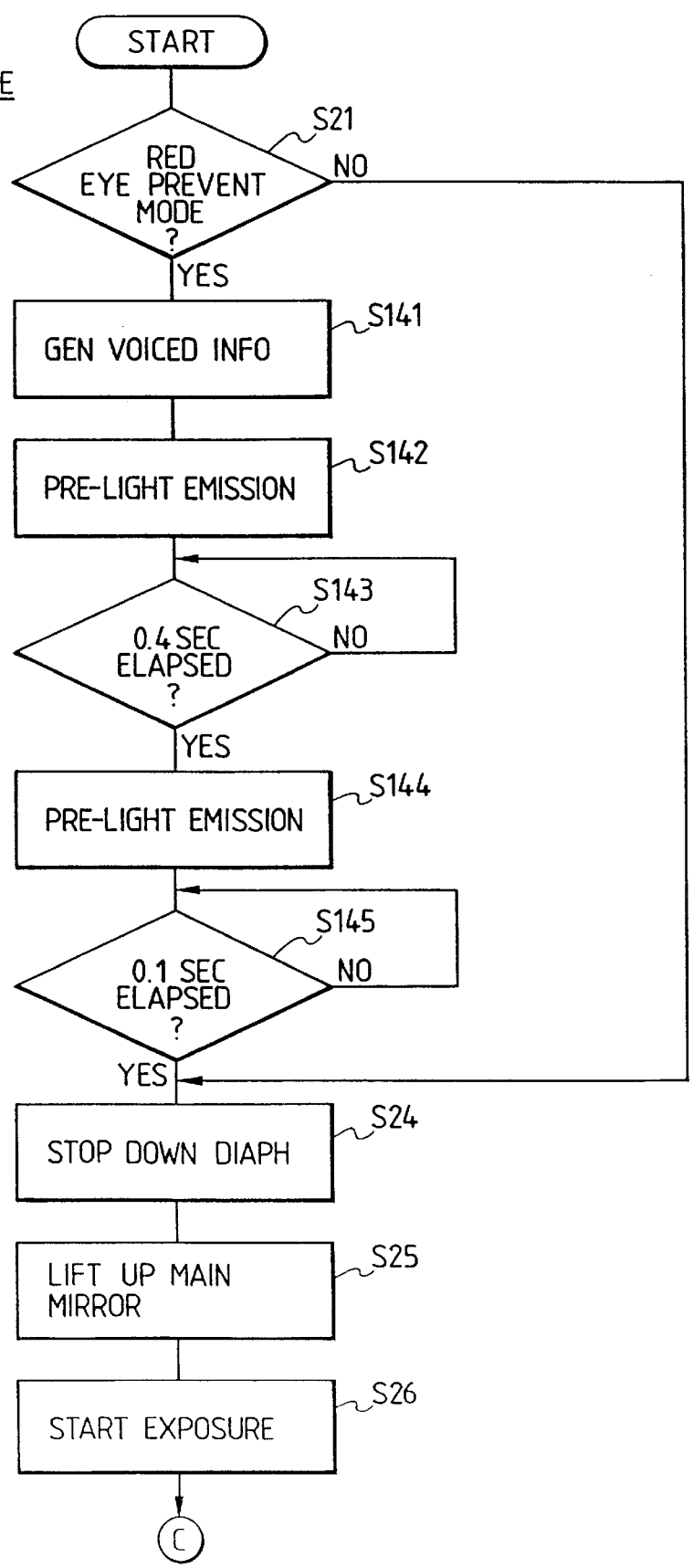
FIG. 22 is a flow chart showing a modification of the interrupt routine.

The process of this control will be explained in connection with FIG. 22.

When the red-eye effect prevention mode is confirmed in Step S 21, the process proceeds to Step S 141 in which the voice generating circuit 14 is activated to announce that a pre-light-emission for preventing occurrence of red-eye effect is going to be performed. The process then proceeds to Step S 142 in which a light-emission instruction is given to the pre-light-emission device 11 thereby conducting a first pre-light-emission, so that the pupils of eyes of the person to be photographed are made to contract.

In Step S 143, whether 0.4 second has passed after the pre-light-emission is judged and a second pre-light-emission is performed in Step S 144. The second pre-light-emission ensures that the pupils contract without fail even if they failed to contract in the first pre-light-emission. Then, after judging whether 0.1 second has passed in Step S 145, the process proceeds to the next step.

A second embodiment of the invention will be described with reference to FIGS. 23 to 25.

Figure 23:
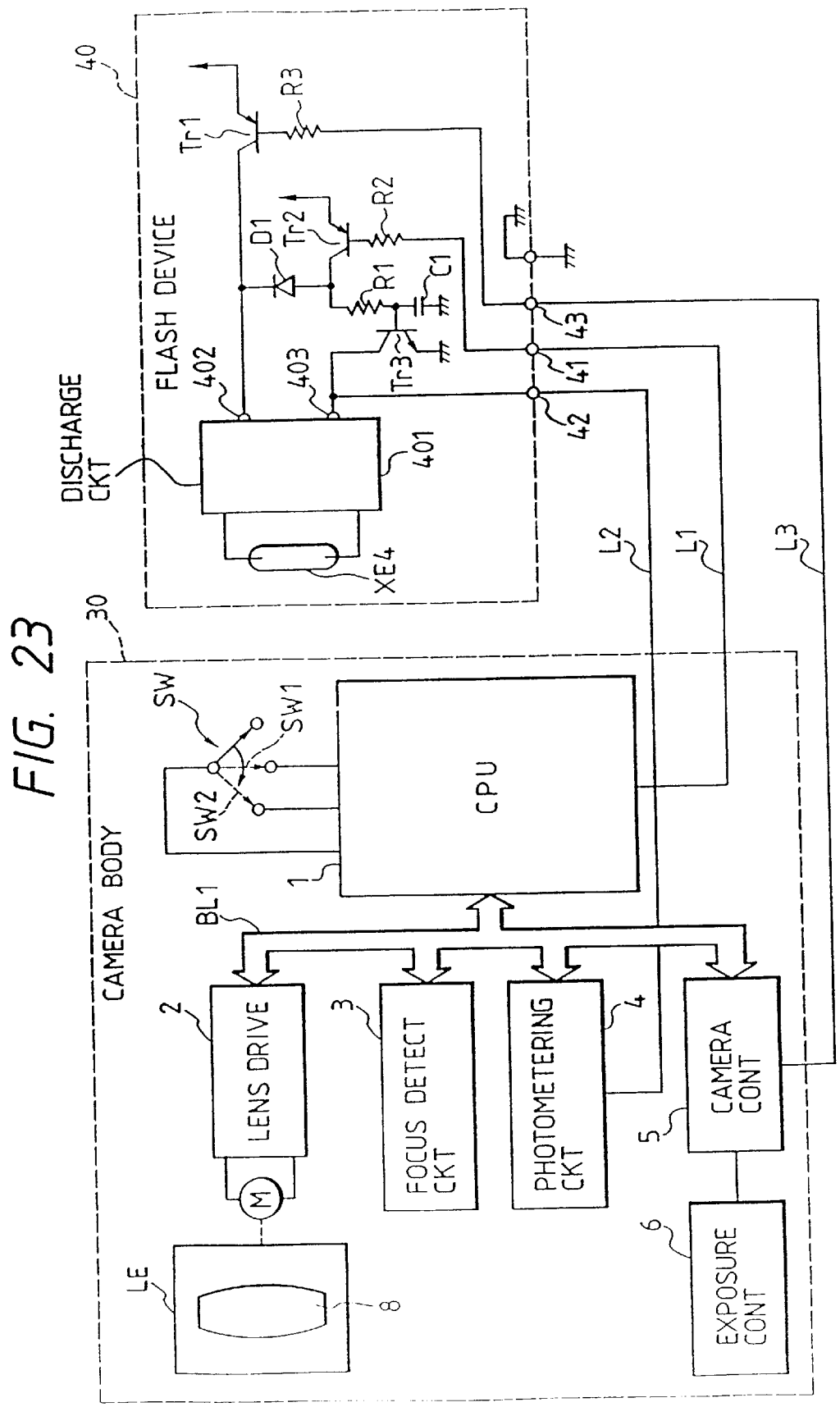
FIG. 23 is a block diagram of a second embodiment.

Referring to FIG. 23 which shows the general arrangement of the second embodiment, components 1 to 6 and 8 on the camera 30, as well as switches SW1 to SW3, are substantially the same as those shown in FIG. 1.

The camera 30 has an electronic flash device 40 which is detachably secured thereto. The electronic flash device 40 has a xenon tube XE4 and a discharge circuit 401. The discharge circuit 401 is automatically connected to a CPU through a line L1 via a connection terminal 41, upon mounting of the electronic flash device 40 on the camera 30. At the same time, the photometering circuit 4 and the camera control circuit 5 are connected to the discharge circuit 401 through lines L2 and L3 via connection terminals 42 and 43.

In the case of a flash-assisted exposure which employs the electronic flash device 40, the exposure control device 5 drives the exposure control device 6 in response to turning on of the second switch SW2 and delivers a discharge start signal of a low level to the line L3. This signal is input to the base of the transistor Tr1 through an internal resistance R3 of the electronic flash device 40 thereby turning the transistor Tr1 on. As the transistor Tr1 is turned on, a potential of the input terminal 402 of the discharge circuit 401 is set high, so that the discharge circuit operates to allow the xenon tube XE4 to flash and illuminate the photographing object, i.e., a main light emission is started.

The photometering circuit 4 has a light-receiving element which receives light reflected by the photographing object and determines the brightness of the object. The thus determined object brightness is delivered to the CPU. When the brightness of the object illuminated by the main-light-emission reaches a predetermined level, the CPU delivers a discharge termination signal of low level to the line L2 through the photometering circuit 4. Consequently, the input terminal of the discharge circuit 401 is set low, whereby the xenon tube XE4 of the electronic flash device stops illuminating.

When the flash-assisted exposure is performed, a pre-light-emission signal of a low level is delivered to the line L1 in response to the turning on of the second switch SW2, in advance of the main flashing. This signal is delivered to the base of the transistor Tr2 through a resistor R2 so that the transistor Tr2 is turned on, whereby the input terminal of 402 the discharge circuit 401 is connected to the power supply through a diode D1 so as to be set high. As a result, the discharge circuit operates to allow the xenon tube XE4 to discharge, thereby commencing a pre-light-emission. The turning on of the transistor Tr2 causes the capacitor C1 to be charged through the resistor R1. When a predetermined amount of charge has been reached in the capacitor C1, i.e., when a predetermined time has passes after the turning on of the transistor Tr2, the transistor Tr3 is turned on, so that the input terminal 403 of the light-emitting circuit 401 is set low thereby causing the discharge circuit 401 to terminate the discharge in the xenon tube XE4, whereby the pre-light-emission ceases.

The photometering circuit 4 receives light reflected by the photographing object and computes the object brightness on the basis of the detection signal and delivers the thus determined brightness to the CPU. Upon receipt of the data concerning the object brightness obtained as a result of the pre-light-emission, the CPU again determines the aperture value. The amount of the pre-light-emission light reaching the object decreases as the object distance is increased, so that the brightness of the object becomes correspondingly low. To compensate for this reduction in the brightness, the aperture value i.e. the stop value is increased to ensure optimum exposure at the time of flash-assisted exposure.

The CPU also judges whether the present photographing conditions may cause occurrence of red-eye effect when the flash-assisted exposure is performed, on the basis of the object brightness. If red-eye effect is judged or possibly occurring, the CPU sets the camera for operation in the red-eye effect prevention mode, and controls the time interval or delay time between the pre-light-emission and the main flashing of the xenon tube XE4, on the basis of the brightness information obtained in response to the pressing of the release button to the bottom of the first stroke. In this embodiment, the object brightness is classified into three classes: namely, low brightness, medium brightness and high brightness regions. When the object brightness as measured by the photometering circuit belongs to the low brightness region, the delay time is set to $T_1$. Similarly, the delay time is set to $T_2$ and $T_3$, respectively, when the measured object brightness belongs to medium and high brightness regions. The delay times $T_1$, $T_2$ and $T_3$ are determined to meet the following condition:

$T_1 > T_2 > T_3$

Thus, the delay time is prolonged as the object brightness becomes lower. This is attributable to the fact that, since the pupils have contracted to a certain degree when the object brightness is high, the time required for the pupils to contract to a size which can prevent occurrence of red-eye effect is short as compared with the case where the object brightness is low.

The described process performed by the CPU will be described on the basis of the flow chart shown in FIGS. 24 and 25.

Figure 24:
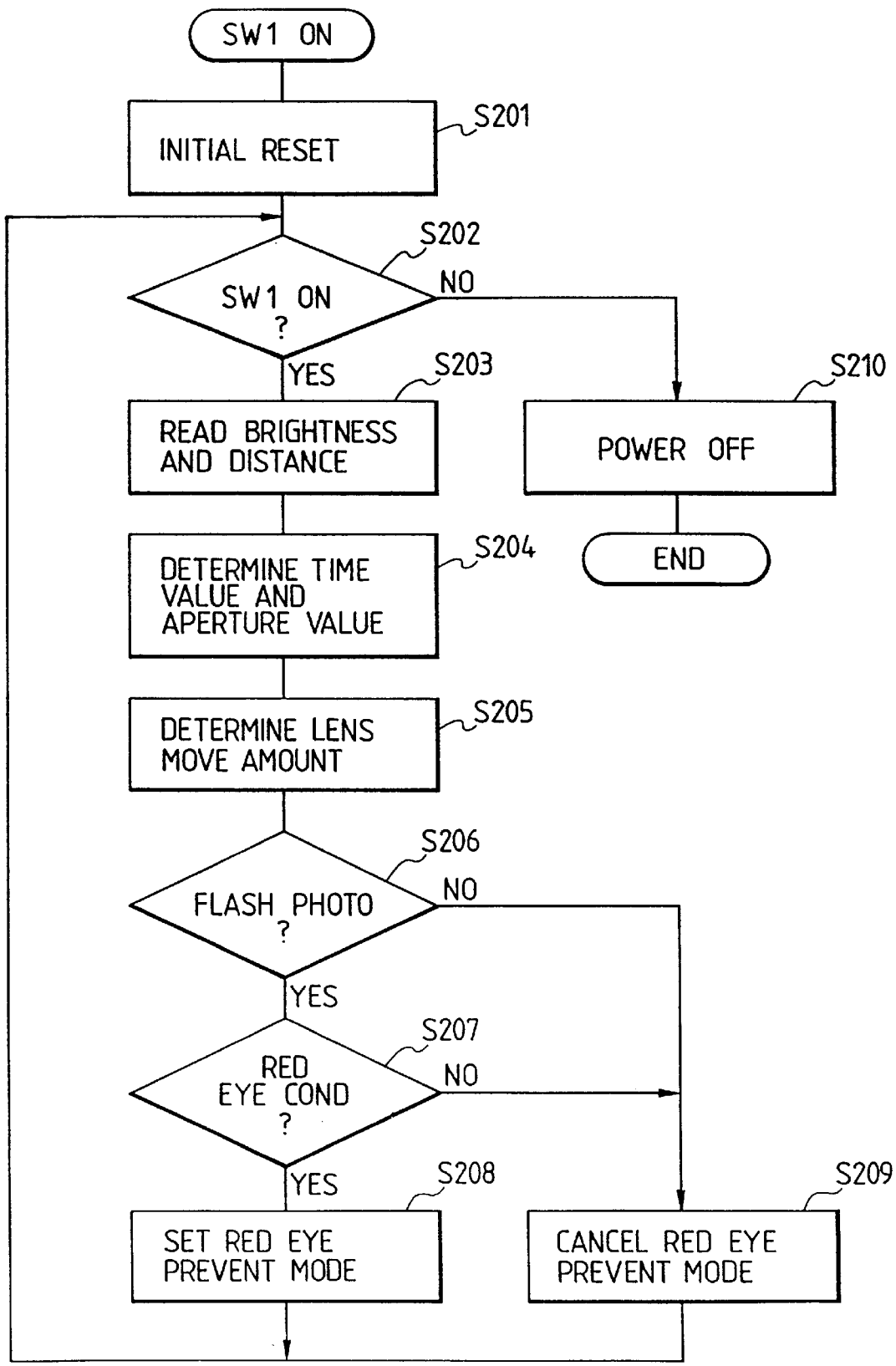
FIG. 24 is a flow chart showing the main routine.

As the first witch SW1 is turned on, an interrupt terminal of the CPU 1 is set low so that the interrupt program of FIG. 24 is started. This program begins with Step S 201 in which initial resetting is performed. Namely, the memory and other components in the CPU are reset and electrical power is supplied to the electrical circuits.

In Step S 202, a judgment is executed as to whether the first switch SW1 has been turned on. If the answer is NO, the supply of power to the electric circuits ceases and the process is finished. However, if the answer is YES, the process proceeds to Step S 203 in which the object brightness and the object distance are read from the photometering circuit 4 and the range finding circuit 3. Then, in Step S 204, the aperture value and the time value are determined on the basis of the object brightness and, in Step S 205, the amount of driving of the lens for bringing the lens to the best focus position is determined. The process then proceeds to Step S 206. The thus determined time value and the lens driving amount are stored in a memory.

In Step S 206, a judgment is executed as to whether exposure to be conducted is flash-assisted exposure which employs an electronic flash device 40. This is accomplished by judging whether the flash inhibition switch (not shown) has been turned on or whether the object brightness read in Step S 203 is lower than a predetermined reference value. When the answer is NO in Step S 206, the process proceeds to Step S 209 in which the red-eye effect prevention mode is dismissed and then the process returns to Step S 202. Conversely, if the answer is YES, a judgment is executed as to whether the photographing conditions may cause red-eye effect. Thus, the CPU judges that the red-eye effect may when the object brightness read in Step S 207 is higher than a predetermined threshold value for the generation of red-eye effect, and that the red-eye effect will not occur when the object brightness is below this threshold.

If the answer to the question posed in Step S 207 is NO, the red-eye effet prevention mode is dismissed in Step S 209. Conversely, if the answer is YES, the camera is set for operation in the red-eye effect prevention mode in Step S 208. The process then returns to Step S 202 and the described operation is repeated.

Figure 25:
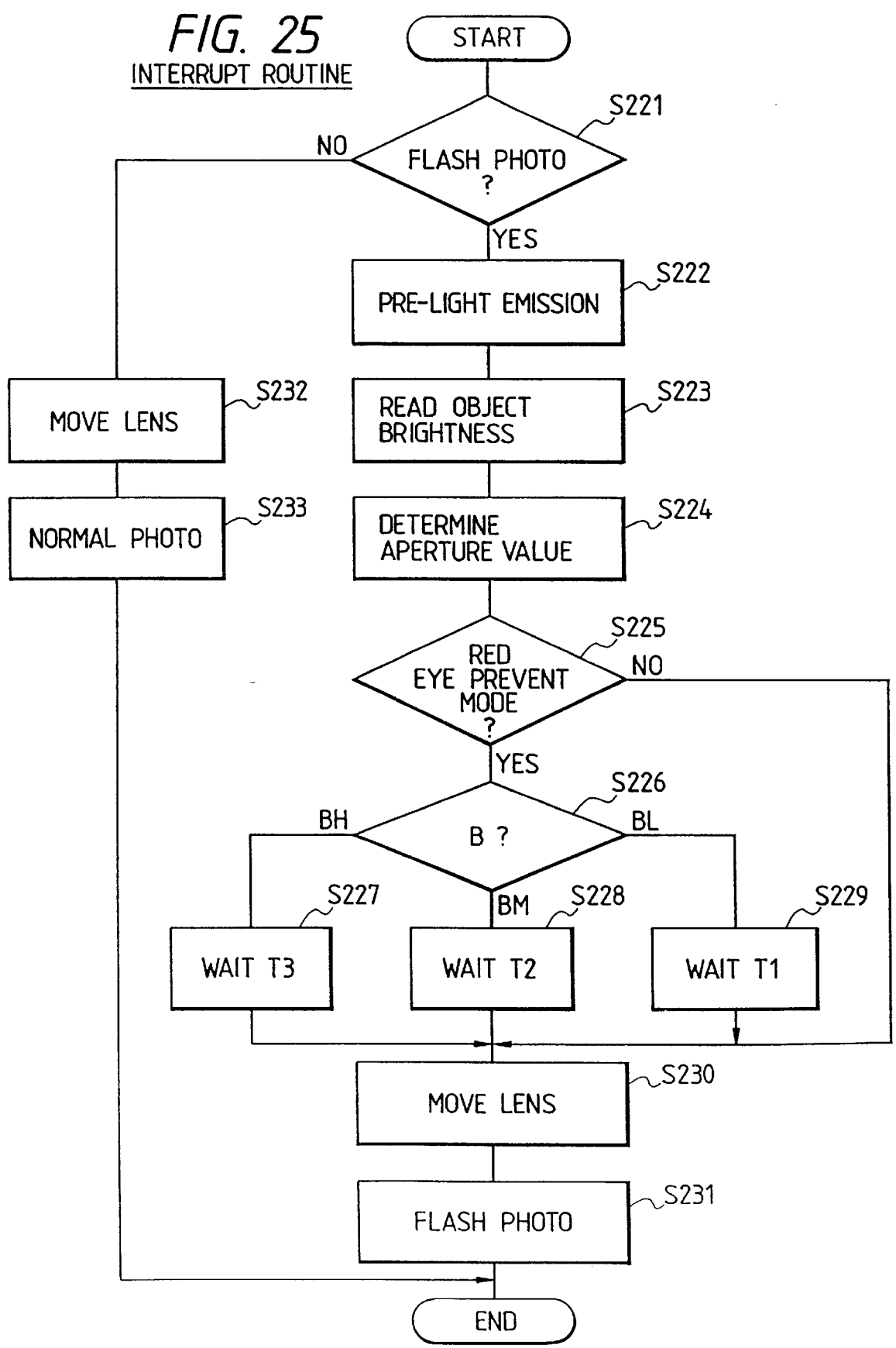
FIG. 25 is a flowchart showing an interrupt routine.

When the second switch SW2 is turned on in this state, the interrupt program shown in FIG. 25 is started. In Step S 221, judgment is executed as to whether the photographing operation to be conducted is the flash-assisted exposure which requires the use of the electronic flash device 40. If the answer is YES, the process proceeds to Step S 222 and, if the answer is NO, the process proceeds to Step S 233. In Step S 222, a pre-light-emission start signal is delivered to the line L1 thereby effecting the pre-light-emission. As a result, the transistor Tr2 is turned on so that the input terminal 402 of discharge circuit 401 is set high, so that the discharge circuit 401 activates the xenon tube XE4 thereby allowing the same to emit light.

The turning on of the transistor Tr2 initiates the charging of the capacitor C1 and, when the amount of charge in this capacitor has reached a predetermined value, the transistor Tr3 is turned on to set the input terminal 403 of the discharge circuit 401 low, whereby the discharge circuit 401 operates to terminate the discharge in the xenon tube XE4.

The process then proceeds to Step S 223 in which the quantity of the pre-light-emission light reflected by the object, i.e., the object brightness, is read from the photometering circuit 4. Then, the CPU computes the aperture value on the basis of the object brightness, and proceeds to the process to Step S 225 which determines whether the camera has been set for operation in the red-eye effect prevention mode. If the answer is NO, the process proceeds to Step S 230, whereas, if the answer is YES, the process proceeds to Step S 226. Step S 226 determines whether the object brightness as read in Step S 223 belongs to the high brightness region BH, medium brightness region BM or the low brightness region BL. When the measured object brightness is judged to belong to the high brightness region BH, the process proceeds to Step S 330 after elapse of the delay time $T_3$ in Step S 230. Similarly, the process proceeds to Step S 230 after elapse of the delay times $T_2$ and $T_1$, respectively, when the measured brightness belongs to the medium and low brightness regions BM and BL, respectively.

In Step S 230, the focusing lens is driven to the best focus position in accordance with the lens driving amount which is determined in Step S 205. The process then proceeds to Step S 231 in which an operation signal is delivered to the camera control circuit 5, thereby performing flash-assisted exposure.

In response to the operation signal, the camera control circuit 5 operates the exposure control device 6 in accordance with the time value determined in Step S 205 and the aperture value determined in Step S 224, while delivering a discharge start signal to the line L3. In consequence, the transistor Tr3 is turned on so that the input terminal 402 of the discharge circuit 401 is set high, so that the discharge circuit 401 activates the xenon tube XE4 thereby effecting main flashing. In Step S 231, an operation also is conducted for reading the brightness of the object illuminated by the main flash and, when this brightness has reached a predetermined value, the CPU delivers a discharge termination signal thereby to terminate the emission of light from the xenon tube XE4.

If the answer to the question posed in Step S 221 is NO, the focusing lens 8 is moved to the best focus position in Step S 232 and, in Step S 233, the camera control circuit 5 drives the exposure control device 6 in accordance with the aperture value and the time value determined in Step S 204, whereby the exposure is executed in the ordinary mode.

Thus, in this embodiment, the first pre-light-emission is executed when the release button is pressed to the bottom of the second stroke in the flash-assisted exposure mode and, when the instant photographing condition is judged as possibly causing red-eye effect, the shutter releasing operation accompanied by the main flashing is executed after elapse of the delay time. Thus, the pre-light-emission enables both the determination of the aperture value and the prevention of the red-eye effect, so that there is no need for execution of repeated pre-light-emission, whereby wasteful use of the battery power, as well as confusion of the person to be photographed, is avoided. When the instant photographing condition is judged as not possibly causing red-eye effect, the exposure under the main flash is executed without fail so that unintentional delay in the shutter release operation can be avoided.

In the described embodiment, the delay time can be varied in three stages. This, however, is not exclusive and the delay may be effected in two stages or in four or more stages. Furthermore, it is possible to take into account the object distance in addition to the object brightness, as the factor for determining the possibility of occurrence of red-eye effect. In general, red-eye effect becomes more liable to occur when the angle between the line interconnecting the photographing object and the exposure lens and the line interconnecting the light-emission portion of the electronic flash device and the photographing object is below a predetermined angle which is, for example, about 2.5°. Thus, the second embodiment may be modified so that the photographing conditions are judged as possibly cause red-eye effect when the object distance is greater than a value which corresponds to the above-mentioned angle while the object brightness is below a predetermined level.

A description will be given of a third embodiment of the present invention which is designed such that the pre-light-emission for preventing occurrence of red-eye effect is performed without delay whenever the exposure is conducted in a timer-assisted exposure mode.

Figure 26:
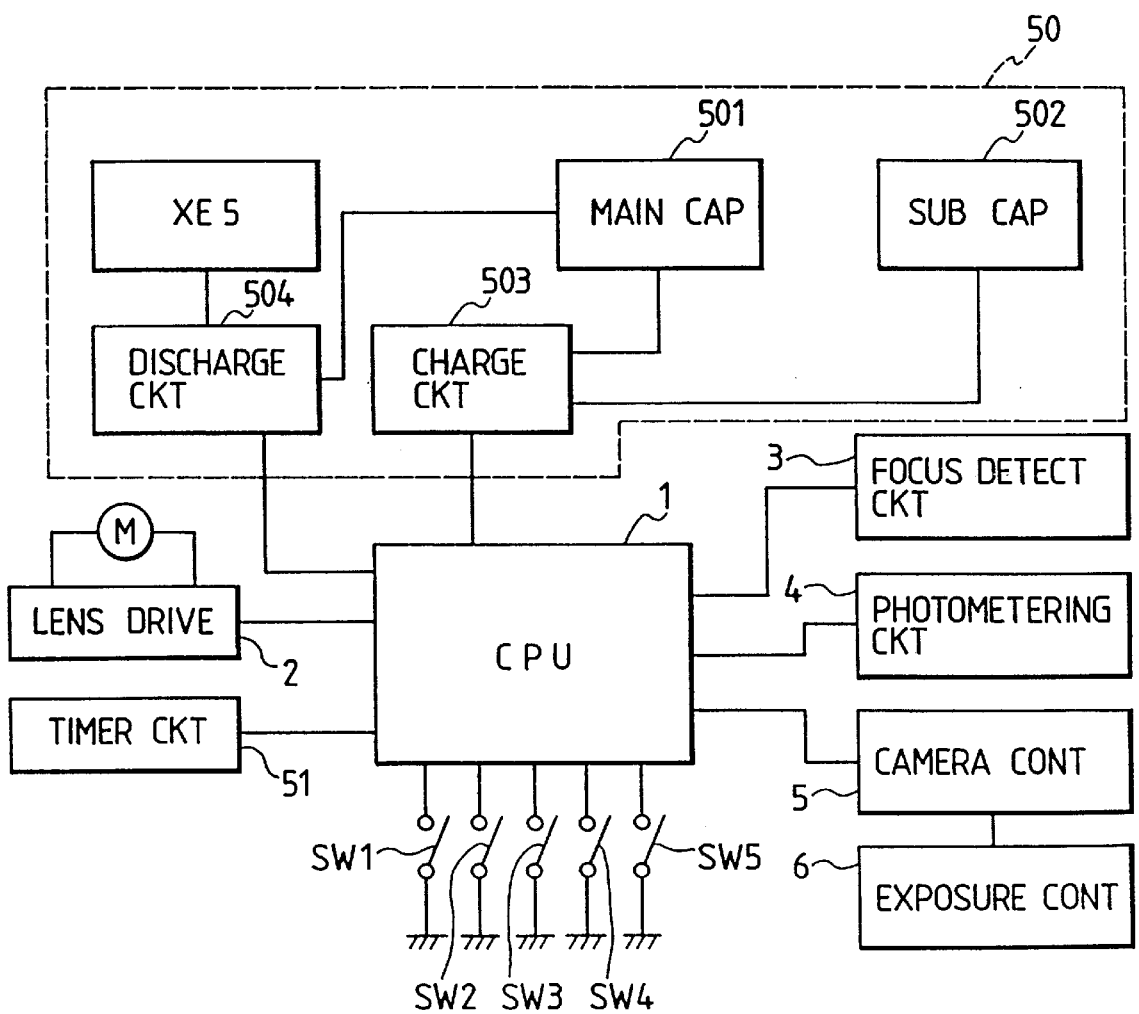
FIG. 26 is a block diagram of a third embodiment.

Referring to FIG. 26 the showing general arrangement of the third embodiment, a focus detection circuit 3, a photometering circuit 4, a camera control circuit 5, a lens drive circuit 2 and first and second switches SW1, SW2 are connected to a CPU 1. An exposure control device 6 for controlling the exposure conditions such as the time value and the aperture value is connected to the camera control circuit 5. As in the cases of the preceding embodiments, the first and second switches SW1 and SW2 are turned on in relation to a manipulation of a release button. In response to turning on of the switch SW1, the CPU 1 activates the focus detection circuit 3 and the photometering circuit 4 and, in response to turning on of the switch SW2, activates the motor driving circuit 2 and the camera control circuit 5.

An electronic flash device 50 serving also as a pre-light-emission device for preventing occurrence of red-eye effect, a timer circuit 51 and switches SW3 to SW5 are connected to the CPU. The electronic flash device 50 includes a light emission tube XE5, main capacitors 501, 502 for storing charges which are to be discharged in the light emission tube XE5, a charging circuit 503 for charging these capacitors, and a discharge circuit 504 for controlling the timing of start of the discharging of the light emission tube XE5. The main capacitor 501 stores charges which are to be discharged when the light-emission tube XE5 performs a main flashing at the time of exposure in response to a shutter releasing operation. On the other hand, a sub-capacitor 502 stores charges which are to be used in a pre-light-emission from the light-emission tube XE5 in advance of the main flashing for the purpose of preventing occurrence of red-eye effect. The charging circuit 503 is capable of charging main and sub-capacitors in response to an instruction given by the CPU and produces a charge-up signal upon detection of completion of charging of each capacitor. The discharge circuit 504 causes the light-emission tube XE5 to perform main flashing in response to a main flashing start signal given by the CPU, and terminates the main flashing in response to a main flashing termination signal delivered by the CPU. The discharge circuit 504 also starts and terminates the pre-light-emission in response to a pre-light-emission start signal and a pre-light-emission termination signal, respectively.

The switch SW3 is a momentary-type-switch which operates in relation to pressing of a flash change-over switch (not shown). Successive turn-on operations of the switch SW3 cause the CPU to successively set the camera operation mode from an automatic-flashing mode to a compulsory flashing mode and then to a flash prohibition mode. The automatic flashing mode is a mode in which whether the main flashing is to be executed is determined on the basis of the brightness information delivered by the photometering circuit 4. According to this mode, therefore, the exposure is performed in flash-assisted mode when the object brightness is low. The compulsory flashing mode is a mode in which the main flashing is executed at the time of exposure regardless of the level of the object brightness. The flash prohibition mode is a mode in which the exposure is executed without the assist of the flash device even when the object brightness is low. Thus, the main flashing is required when the compulsory flashing mode has been selected or when the object brightness is low in the automatic flashing mode. In such a case, the main capacitor 501 is charged to enable the flash-assisted exposure. A light-emission signal (main flashing instruction) is given to the discharge circuit 504 simultaneously with the shutter release so that the main flashing is performed with the charged stored in the main capacitor 501.

The switch SW4 is operatively associated with a push button (not shown) which is pressed when the red-eye effect is to be prevented. A red-eye effect prevention mode setting signal is produced as the switch SW4 is turned on. In response to this signal, the CPU sets the camera for operation in the red-eye effect prevention mode and allows the sub-capacitor 502 to be charged through the charging circuit 503. Then, the red-eye effect prevention instruction is given to the light-emission circuit in response to turning on of the second switch SW2, so that the light-emission tube XE5 flashes with the charges from the sub-capacitor 502 in advance of the main flashing which is to be executed in response to the shutter releasing operation, whereby the pre-light-emission is performed. The red-eye effect prevention mode is dismissed when the switch SW4 is turned off, so that the above-mentioned pre-light-emission is not conducted.

The switch SW5 is adapted to be turned on in relation to the operation of a self-timer button which is not shown. A self-timer mode setting signal is produced when the switch SW5 is turned on. In response to the self-timer mode setting signal, the CPU sets the camera for operation in the self-timer mode and, in response to turning on of the second switch SW2, delivers a timer instruction to the timer circuit 51 thereby enabling the timer circuit to count the time. After the predetermined time has elapsed, the CPU allows the shutter to be released, whereby exposure is conducted.

When the above-described conditions for the flash-assisted exposure are satisfied after the camera is set in the self-timer mode, the CPU delivers the red-eye prevention mode setting signal to the discharge circuit 504 regardless of the state of the red-eye effect prevention switch SW4.

Figure 27:
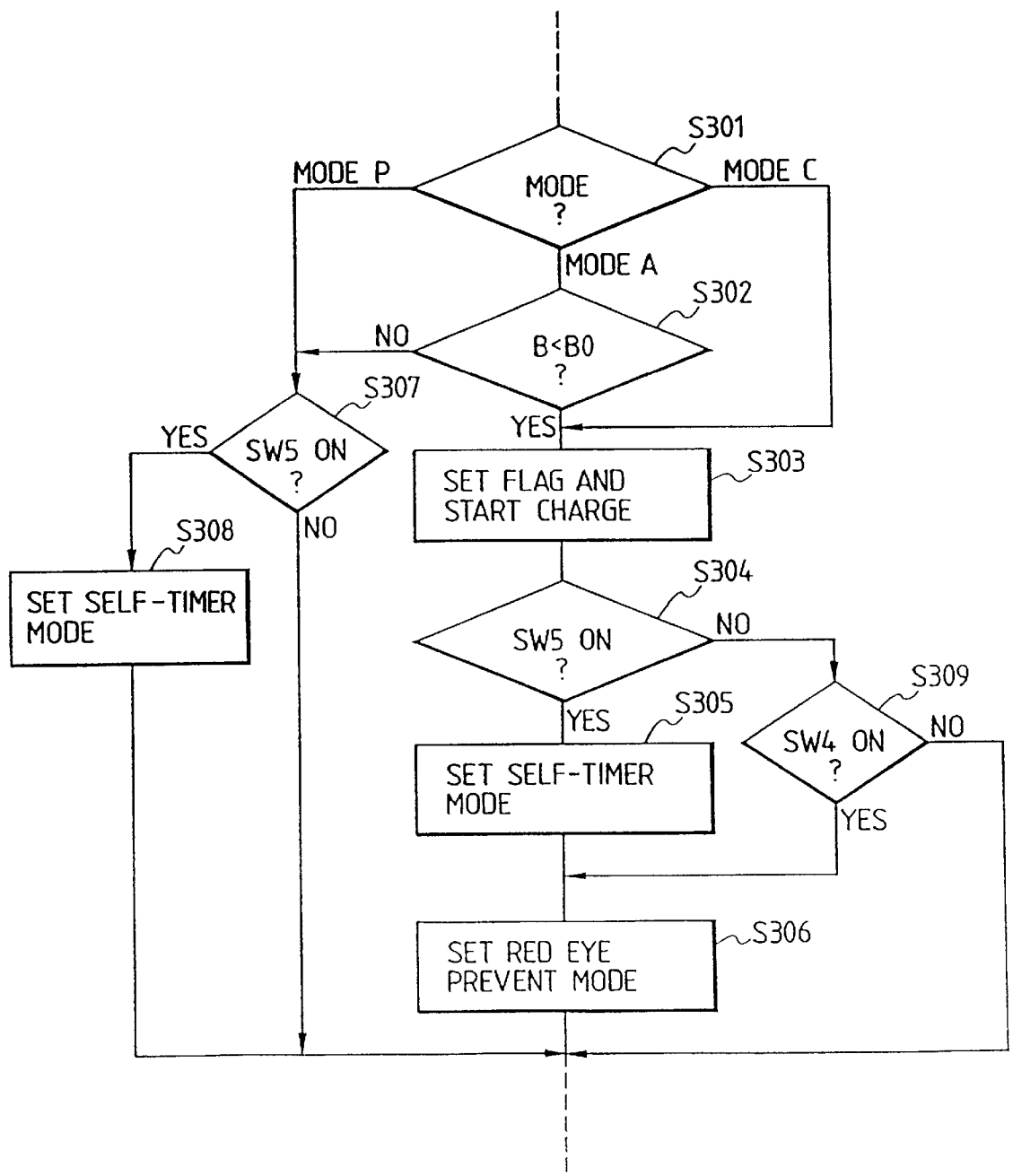
FIG. 27 is a flow chart showing a main routine.

The operation of this embodiment will be explained in connection with FIG. 27 which shows a flow chart illustrating the operation.

As the first switch SW1 is turned on, the CPU reads distance data and brightness data and determines the amount of driving of the lens, as well as the exposure value.

In Step S 301, the CPU judges the type of the flash-assisted exposure mode. If the instant mode is the automatic flashing mode (MODE A), a judgment is executed in Step S 302 as to whether the main flashing of the light-emission tube XE5 is to be executed or not, on the basis of the brightness information. This judgment is executed by judging whether the level of the brightness information B is less than a predetermined level $B_0$. When the level of the brightness information is low so that the main illumination is necessary, an answer YES is given in response to the question posed in Step S 302. Conversely, an answer NO is given when the level of the brightness information is higher than the predetermined level, i.e., when the main flashing is not needed. When the compulsory flashing mode (MODE C) has been selected, the process proceeds to Step S 303 and, when the flashing prohibition mode (MODE P) has been selected, the process proceeds to Step S 307.

An answer NO given to the question posed in Step S 302 causes the process to proceed to Step S 307 in which a judgment is executed as to whether the self-timer switch SW5 has been set on. An affirmative answer to this question causes the process to proceed to Step S 308 in which the camera is set for a self-timer mode. Conversely, when the answer to the question posed in Step S 302 is YES, the process proceeds to Step S 303 in which a flashing flag is set and the charging of the main capacitor is commenced through the charging circuit. The process then proceeds to Step S 304 in which whether the self-timer switch SW5 has been turned on is determined. If the answer is NO, the process proceeds to Step S 309 in which a judgment is executed as to whether the red-eye effect prevention switch SW4 has been set on. If the answer to the question posed in Step S 309 is YES, the CPU sets the camera for operation in the red-eye effect prevention mode in Step S 306 and, whereas, if the answer is NO, the process proceeds to the next step without setting the red-eye effect prevention mode.

When the answer to the question posed in Step S 304 is YES, the process proceeds to step S 305 in which the camera is set for operation in the self-timer mode. Then, the camera is set for operation in the red-eye prevention mode in Step S 306. The process then proceeds to the next step.

Thereafter, as the second switch SW2 is turned on, the CPU operates to drive the focusing lens to a focusing position and conduct an exposure by suitably driving the shutter and the diaphragm. If the above-mentioned main flashing flag has been set, a discharge start signal is given to the discharge circuit so that the light-emission tube XE5 flashes with the charges of the main capacitor, whereby the main flashing is executed. If the camera has been set for operation in the red-eye effect prevention mode, a red-eye effect prevention instruction is given in response to the turning on of the second switch SW2, so that the pre-light-emission is performed by the light-emission tube XE5 with the charges delivered by the sub-capacitor and, after elapse of a predetermined time, e.g., 0.75 second, the shutter is operated to cause the light-emission tube XE5 to perform the main flashing. It is therefore possible to avoid occurrence of red-eye effect.

If the flashing flag has been set while the camera has been set in the self-timer mode, a self-timer operating instruction is delivered to the timer circuit 51 thereby starting the measurement of the time in response to the turning on of the second switch SW2. Since the red-eye effect prevention mode has been set without fail whenever the flash-assisted photographing mode is used in the self-timer mode, the light-emission tube XE5 performs the pre-light-emission without fail when the predetermined time is counted. Then, after elapse of a predetermined time, the shutter is released simultaneously with the main flashing of the light-emission tube XE5.

As will be understood from the foregoing description, the camera is set for operation in the red-eye prevention mode regardless of whether the red-eye effect prevention switch SW4 has been turned on or off, when the camera is used in the self-timer mode under a photographing condition which requires the assist of a flash. The self timer mode is used in most cases when the photographing object includes persons so that the photographs taken in the self-timer mode often suffer from red-eye effect. This means that the red-eye effect prevention operation is preferably conducted in the flash-assisted exposure in the self-timer mode. It will be seen that the present invention eliminates the necessity for a manipulation of the red-eye effect prevention device and can eliminate occurrence of red-eye effect which may otherwise be caused when the user has forgotten to set the red-eye effect prevention mode.

Figure 28:
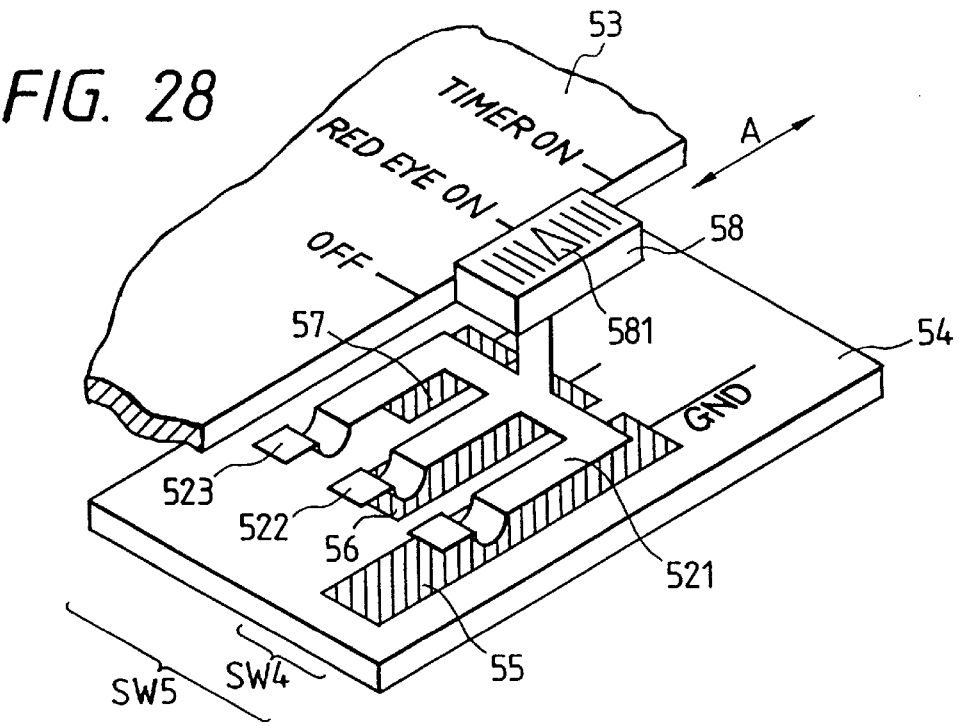
FIG. 28 is a perspective view of a switch device.

FIG. 28 shows examples of the red-eye effect prevention switch SW4 and the self-timer switch SW5 which are suitable for use in this embodiment. A manipulation member 58 which slightly projects from the camera cover 53 is movable in the direction of an arrow A. An arrow mark 581 is put on the manipulation member 58. Brushes 521, 522 and 523 are integrally attached to a lower portion of the manipulation member 58.

A pattern 55 is put on the upper surface of a rigid printed board fixed in the camera in such a manner as to be always contacted by the brush 521. Similarly, patterns 56 and 57 are arranged for contact with brushes 522 and 523. The pattern 55 is grounded. The arrangement is such that, when the brush 522 contacts the pattern 56, the patterns 55 and 56 are electrically connected through the brushes 521 and 522. The brushes 521, 522 and the patterns 55, 56 in cooperation provide the above-mentioned SW red-eye effect prevention switch. When the brush 523 is brought into contact with the pattern 57, the patterns 55 and 57 are electrically connected to each other through the brushes 521 and 523. The brushes 521, 523 and the patterns 55, 57 in cooperation provide the aforementioned self-timer switch SW5. It will be seen that the red-eye effect prevention switch SW4 is conductive without fail whenever the switch SW5 is conductive.

Gradations are provided on the upper surface of the camera cover 53 at three positions, and marks reading "OFF", "RED-EYE PREVENTION ON" and "TIMER ON" are printed near these three gradations. The contact between the brushes and patterns is achieved such that a click feeling can be obtained when the manipulation member 58 has been moved to bring the arrow 581 thereon to one of these three positions.

Figure 29A:
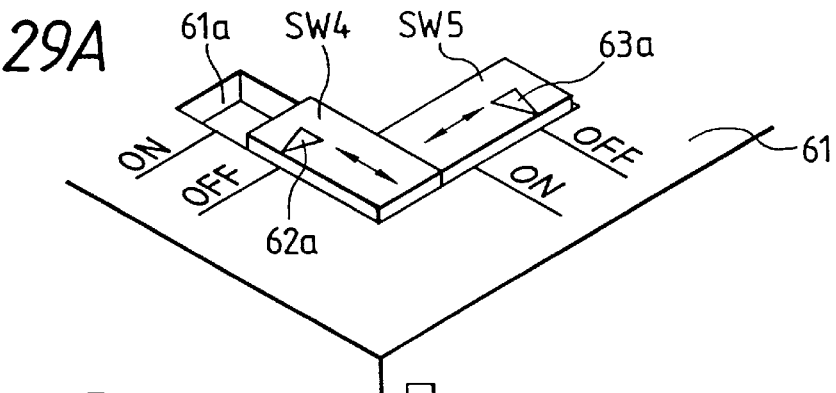
FIGS. 29A and 29B are perspective views of modifications of the switch device.
Figure 29B:
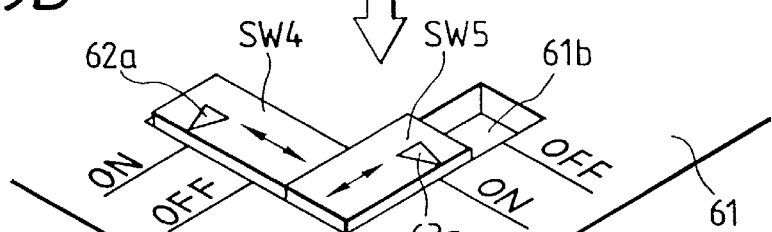

FIGS. 29A and 29B show another example of the red-eye effect prevention switch SW4 and the self-timer switch SW5. The red-eye effect prevention switch SW4 and the self-timer switch SW5 are provided on the upper side of the camera body 61 so as to slightly project therefrom as illustrated. These switches SW4 and SW5 are movable between the respective ON and OFF positions along grooves 61a and 61b, respectively. Arrows on the upper surfaces of these switches 62 and 63 represent, respectively, directions of movement of these switches.

The ON and OFF positions of these switches are displayed on the upper surface of the camera body 61.

The camera is set for operation in the red-eye effect prevention mode when the switch SW4 is manipulated to bring an index 62a thereon into alignment with the ON position. Likewise, when the switch SW5 is manipulated to bring an index 63a thereon into alignment with the ON position, the camera is set for operation in the self-timer mode.

Thus, in the present invention, the self-timer mode cannot be attained unless the camera has been set for operation in the red-eye prevention mode.

A fourth embodiment of the invention will be described hereinunder with reference to FIGS. 30 to 42.

This embodiment includes means for informing the object person of the number of times of pre-light emission or the total number of times of both of pre-light emission and main light emission previous to the start of photographing. Therefore, the person whose picture is to be taken can obtain information as the number of times of light emission.

FIG. 30 shows the general construction of the embodiment. The construction shown in FIG. 30 substantially corresponds to that in FIG. 1 with the exception of a display driver 70 and two light emitting diodes (LEDs) 71, 72 connected to the signal transmission lines BL1.

The LED 71 is provided at a position on the front side of the camera (a position which the object person can recognize). The other LED 72 is provided within the view-finder (that is, a position which the photographer recognize).

Figure 31:
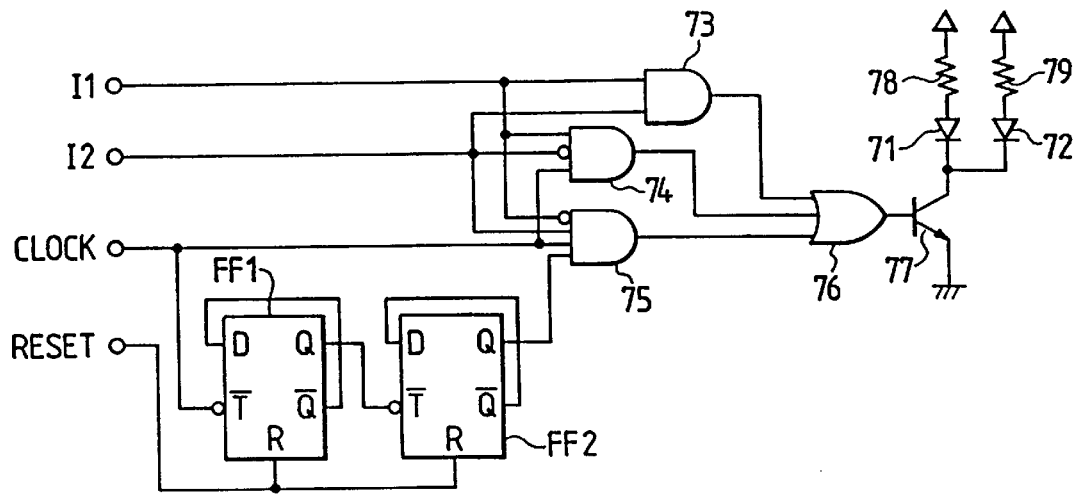
FIG. 31 is a circuit diagram of a display driver.
Figure 32:
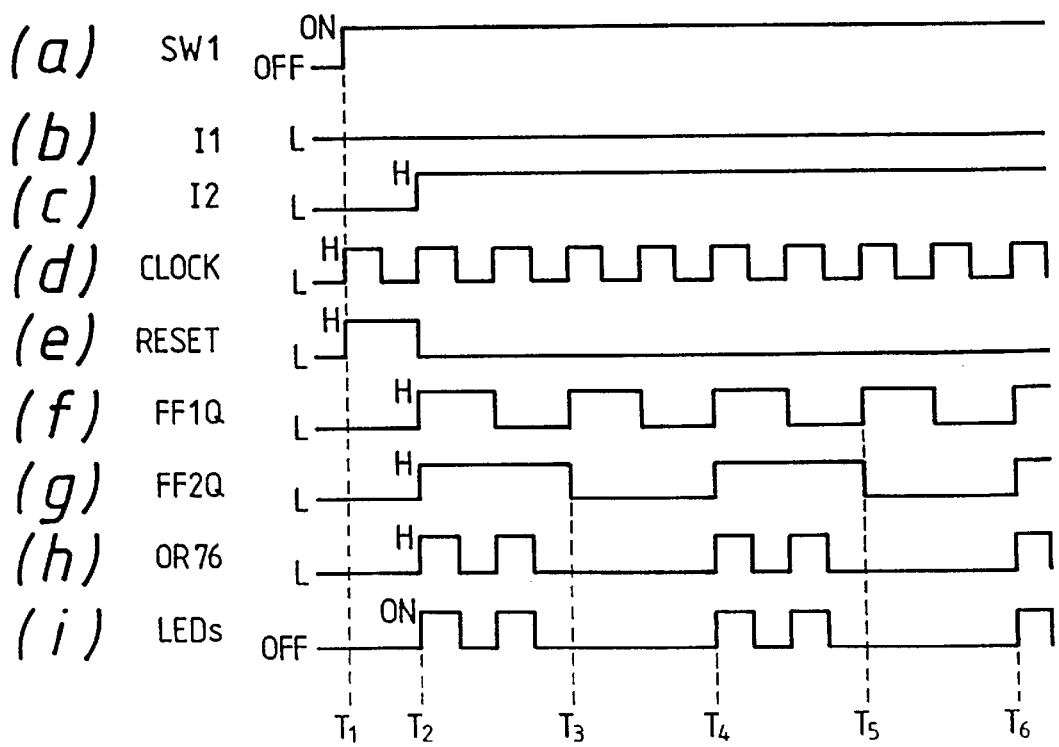
FIGS. 32A–32I are timing diagrams showing the signal levels at the terminals shown in FIG. 32.

The display driver 70 has, as shown in FIG. 31, input terminals $I_1$, $I_2$, CLOCK and RESET, AND gates 73, 74 and 75, an OR gate 76 and flip-flops FF1 and FF2.

The display switch signal input terminals $I_1$ and $I_2$ are connected to the input terminals of the AND gates 73, 74 and 75 respectively. The reference clock terminal CLOCK is connected to the input terminals of the AND gates 74 and 75, and to a terminal $\overline{T}$ of the flip-flop FF1 respectively. A clock signal as shown in FIG. 32D is applied to the terminal CLOCK from CPU1. The terminal RESET is connected to the reset terminals R of the flip-flops FF1 and FF2. The RESET signal is shown in FIG. 32E. The terminal Q of the flip-flop FF1 is connected to the terminal $\overline{T}$ of the flip-flop FF2. The terminals $\overline{Q}$ of the flip-flops FF1 and FF2 are connected to their terminals D respectively.

The output terminals of the AND gates 73, 74 and 75 are connected to the input terminals of the OR gate 76 the output of which is, in turn, connected to the base of an NPN transistor 77. The emitter of the transistor 77 is grounded and the collector thereof is connected to a power supply through the LEDs 71, 72 and resistors 78, 79. When the output of the OR gate 76 is turned to High level, the transistor 77 is turned conductive (ON) and LEDs 71, 72 put on. CPU1 applies a certain signal to the input terminals $I_1$ and $I_2$ to make LEDs 71, 72 light up or flicker in the manner which will be described later.

Further, when the switch SW1 is closed (ON) and the conditions for flash photographing are determined, the CPU1 judges this from the computed object distance D and object brightness B if the photographing condition is the red eye condition (a further description thereof will be given later). If the judgment is for the red eye condition and the switch SW3 is opened (OFF), then the CPU1 generates a signal to set the red eye prevent mode and displays the number of light emission times by LEDs 71 and 72 through the display driver 70 at the same time. In this embodiment, the number of light emission times is "2" which is the sum of an emission from the electronic flash device 10 and an emission from the pre-light emission device 11.

Thereafter, with turn-ON of the switch SW2, the CPU1 applies an operation signal to the pre-light emission device 11 to operate it. After the lapse of 0.75 seconds, the CPU1 drives the exposure controller 6 through the camera control circuit 5 and, at the same time, applies an emission start signal to the electronic flash device 10.

The procedure of control by the CPU1 will be described with reference to the flow chart shown in FIG. 33.

Figure 33:
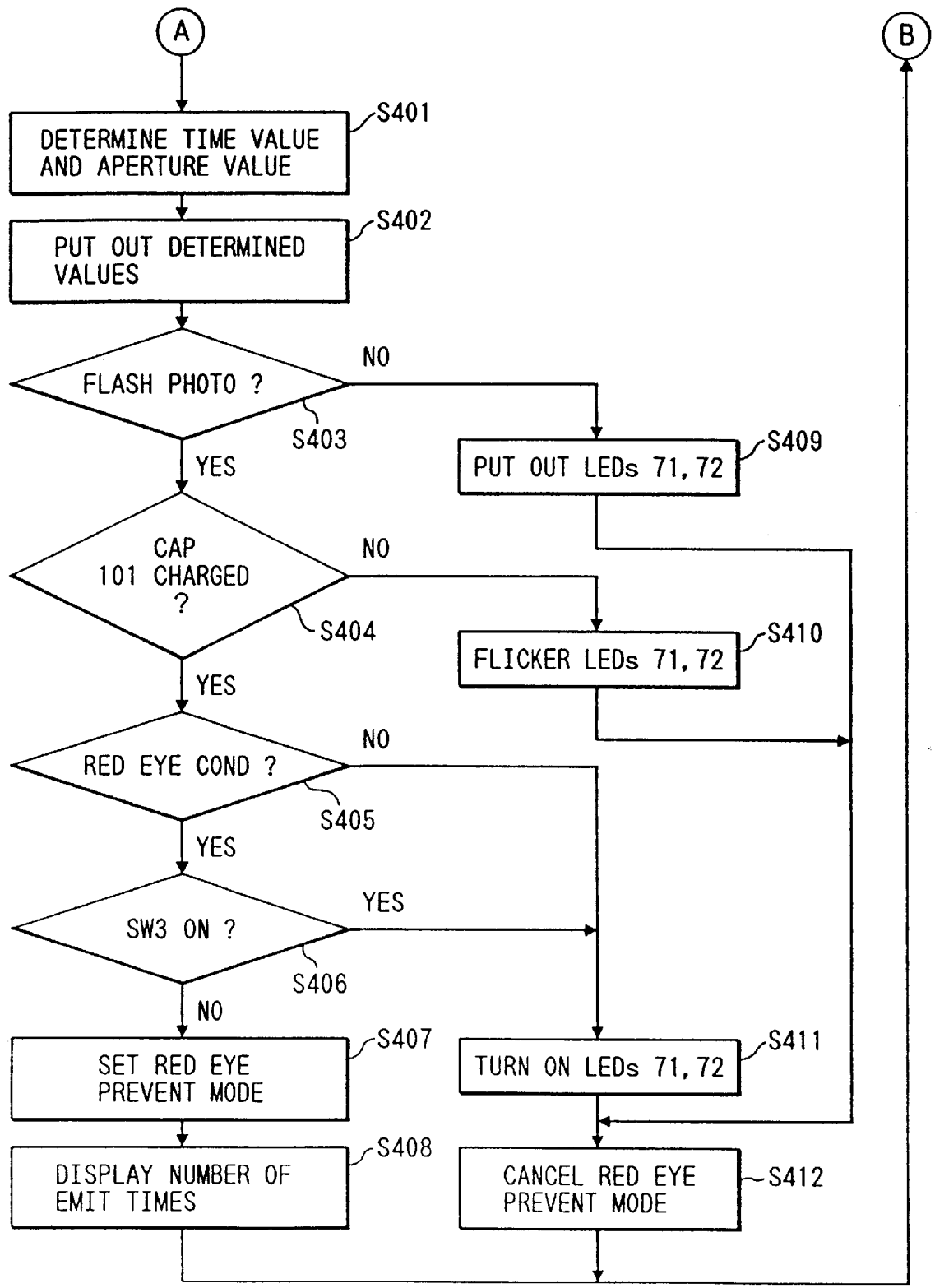
FIG. 33 is a flow chart showing the procedure of the main routine.
Figure 34:
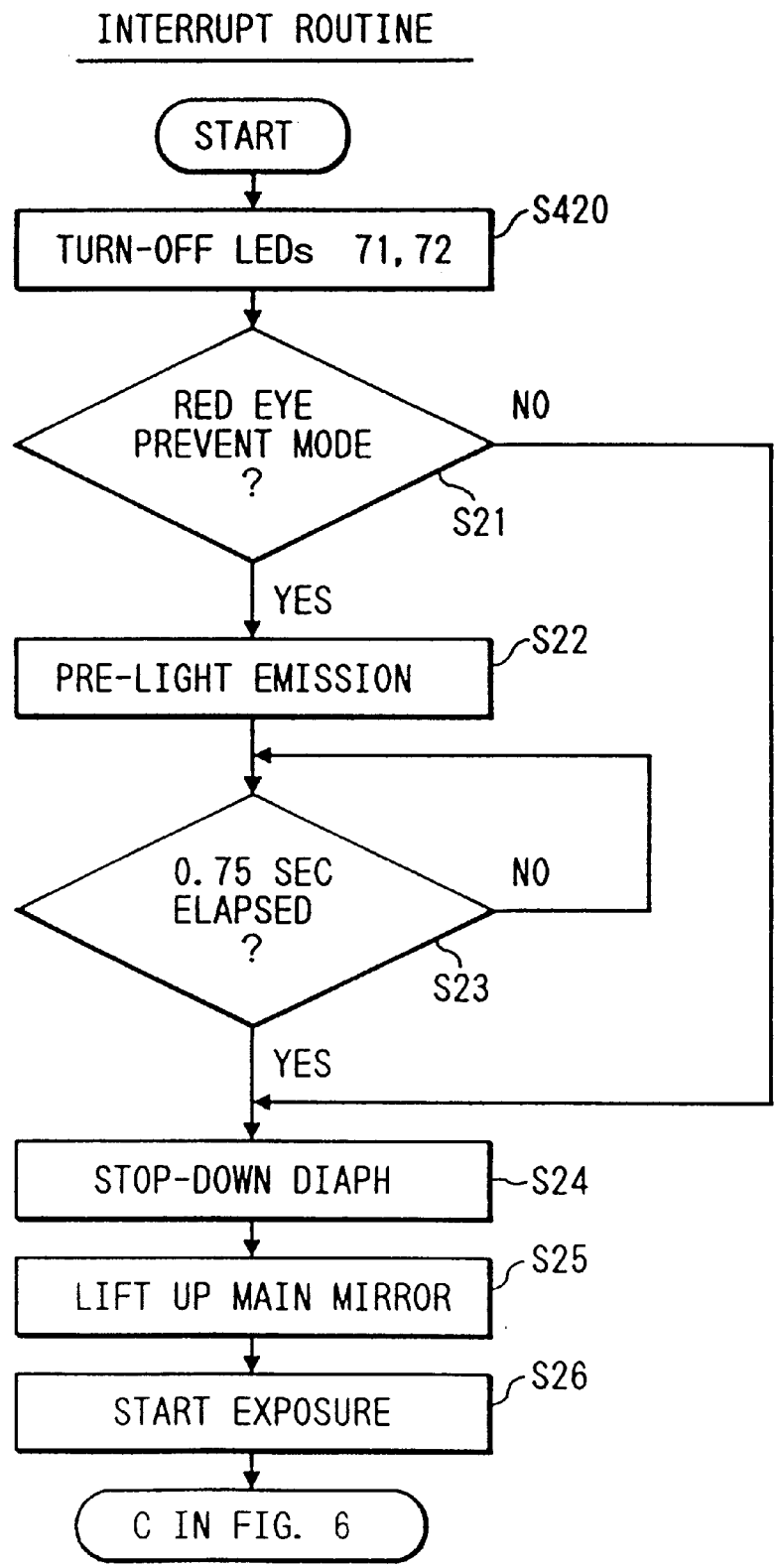
FIG. 34 is a flow chart showing the procedure of the interrupt routine.

Upon the turn-ON of the half-stroke switch (FIG. 32A), the steps S1 to S7 in FIG. 1 and S401 and S402 in FIG. 33 are perfomred in the same manner as in the first embodiment described above. At the next step S403, the CPU1 checks whether the electronic flash device 10 is to be used for photographing. When flash light photographing is denied at step S405, the procedure is advanced to step S409 where the CPU1 turns to Low level both of the input terminals $I_1$ and $I_2$ of the display driver 70 (FIG. 31) to make a display informing "not flash light photographing" by LEDs 71 and 72. Then, the process is advanced to step S412. Thereby the outputs of AND gates 73, 74 and 75 are all turned to Low level and also the output of OR gate 76 is turned to Low level. The transistor 77 is, therefore, not conductive and both of LEDs 71 and 72 remain OFF. At step S412, the red eye prevent mode is cancelled and the procedure returns to the step S2 in FIG. 2.

If the main condenser has not been completely charged at the step S404, the terminal $I_1$ is turned to High level and $I_2$ to Low level to make a display at step S410 indicating that the charging is incomplete. Thereafter, the procedure is advanced to the step S412. As a result, the outputs of AND gates 73 and 75 are turned to Low whereas the output of AND gate 74 is intermittently turned to High by the clock signal (FIG. 32D) inputted from the terminal CLOCK. Consequently, the output of OR gate 76 is also intermittently turned to High level. In response to this, the transistor 77 is turned to ON and OFF repeatedly and both of LEDs 71 and 72 flicker.

When the condition for red dye is satisfied at step S405, the procedure is advanced to the next step S406. If not, the procedure is advanced to step S411.

At the step S411, both of the terminals $I_1$ and $I_2$ are turned to High level to make a display informing that ordinary photographing without red eye prevention is executed and the charging has been completed. The procedure is further advanced to step S412. The outputs of AND gate 73 and OR gate 76 are turned to High level and the transistor 77 is continuously rendered conductive to put LEDs 71 and 72 on.

At the step S406, CPU1 judges whether the switch SW3 is ON or not. When Yes, the procedure is advanced to S411. If No, then the red eye prevent mode is set at the step S407. Thereafter, the number of light emission times is displayed at S408. To this end, as shown in FIG. 32B and FIG. 32C, the terminal $I_1$ is turned to Low level and the terminal $I_2$ is turned to High level. At the same, the terminal RESET is turned to Low level (at time point T2) and the procedure is turned back to the step S2 to repeat the above processings.

FIGS. 32A–32I show the change of signal level with time at every terminal. T1 is a time point at which the switch SW1 is turned ON (FIG. 32A). By S408, both of the outputs of AND gates 73 and 74 are turned to Low level. On the other hand, the clock signal from the terminal CLOCK is being put in the terminal $\overline{T}$ of the flip-flop FF1. The output from its terminal Q has a signal form as shown in FIG. 32F. This output is applied to the terminal $\overline{T}$ of the flip-flop FF2 whose output at Q terminal has a signal form as shown in FIG. 32G. The output from the terminal Q of the flip-flop FF2 and the clock signal from the terminal CLOCK are being put into the AND gate 75. Thereby, the output of the OR gate is turned to High level two times during the time of from T2 to T3 as shown in FIG. 32H. During the time of T3 to T4, the output is Low level and then it is turned again to High level two times for the time of T4 to T5. This is repeated so long as the switch SW1 is ON. In response to the output of the OR gate 76 the transistor 77 repeats ON-OFF. Consequently, the LEDs 71 and 72 repeat two times of ON-OFF at regular time intervals as shown in FIG. 32I so long as the switch SW1 is ON. This "two" times of ON-OFF indicates the number of light emission times for photographing to be done.

By closing the switch SW2 in this state of operation, the interrupt routine (FIG. 34 and FIGS. 6 and 7) is started. The steps in FIG. 34 correspond to the steps S21 to S26 in FIG. 5 with the exception of step S420.

According to the procedure described above, LEDs 71 and 72 make a display to the effect that the light emission will be done twice by depressing the release button a half stroke for flash light photographing with red eye prevent pre-light emission. Thus, when the release button is fully depressed, a pre-light emission (the first emission) is done and, 0.75 seconds after the first emission, as exposure is performed with a main light emission (the second emission).

In this manner, previous to an exposure, both of the object person and the photographer can be informed that the light emission is to be done twice. Therefore, the object person continues to look at the camera until the second emission is completed. Before the photographing is finished, the object person will neither change his or her face nor alter his or her posture.

Of the two LEDs 71 and 72, the one provided on the front side of the camera, that is, the LED 71 may serve also as the LED for indicating that the self timer is counting.

A modification of the above embodiment is shown in FIGS. 35 to 38. In these figures, the same reference numerals and characters as those in FIGS. 31 to 34 designate the same or corresponding parts or steps which need not be further described. A description will be given of the modified parts only.

Figure 35:
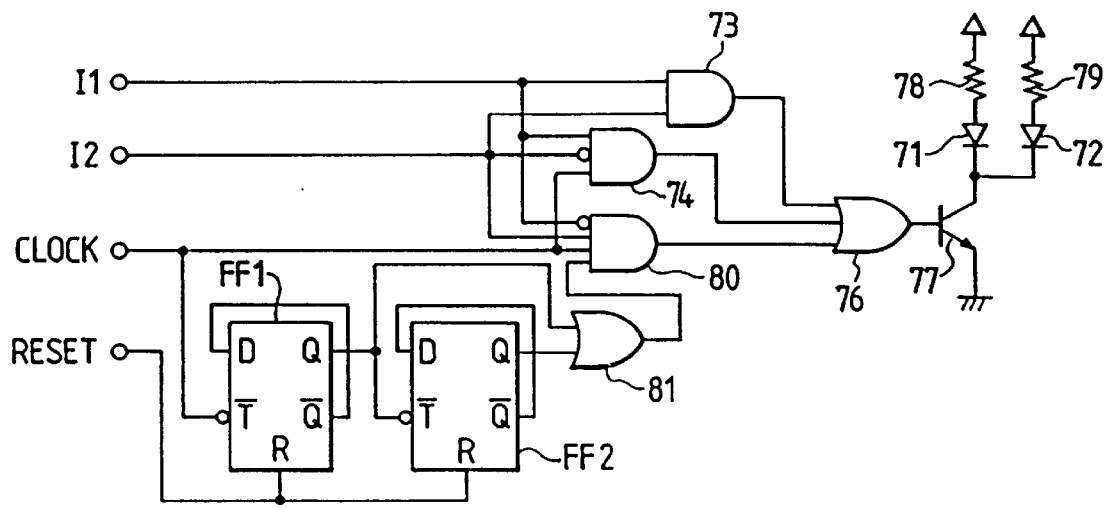
FIG. 35 is a circuit diagram of the display driver in a modification of the above embodiment.
Figure 36:
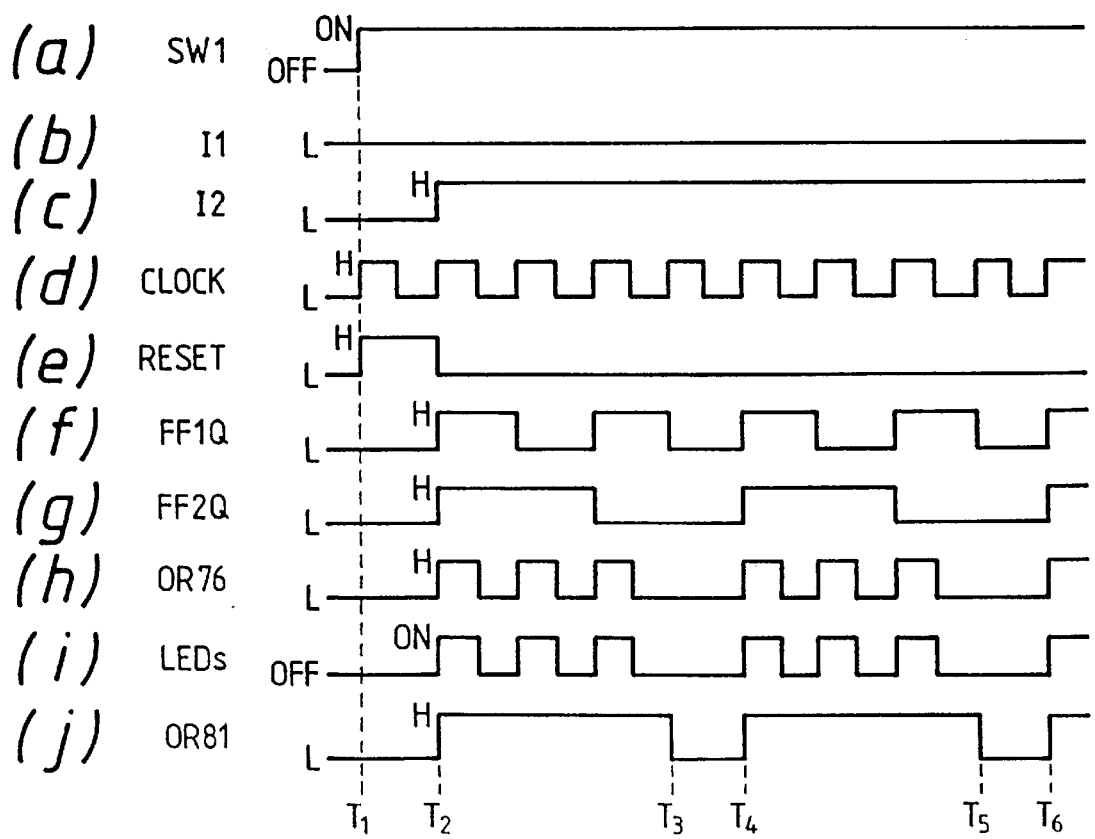
FIGS. 36A–36J are timing diagrams showing the signal levels at the switch and at terminals shown in FIG. 35.

Referring to FIG. 35, the output terminal Q of the flip-flop FF1 is connected to the input terminal $\overline{T}$ of the flip-flop FF2 and also to the input terminal of the OR gate 81. Also, the output terminal Q of the flip-flop FF2 is connected to the input terminal of the OR gate 81 whose output is connected to the input terminal of the AND gate 80.

In a camera according to the present modification, in order to prevent the red eye more surely for flash light photographing, the pre-light emission previous to a main light emission is done twice. More specifically, the pre-light emission device 11 emits light twice previous to a main light emission from the electronic flash device 10. Therefore, in this modification, the total number of the emission times including the main emission is "3".

Figure 37:
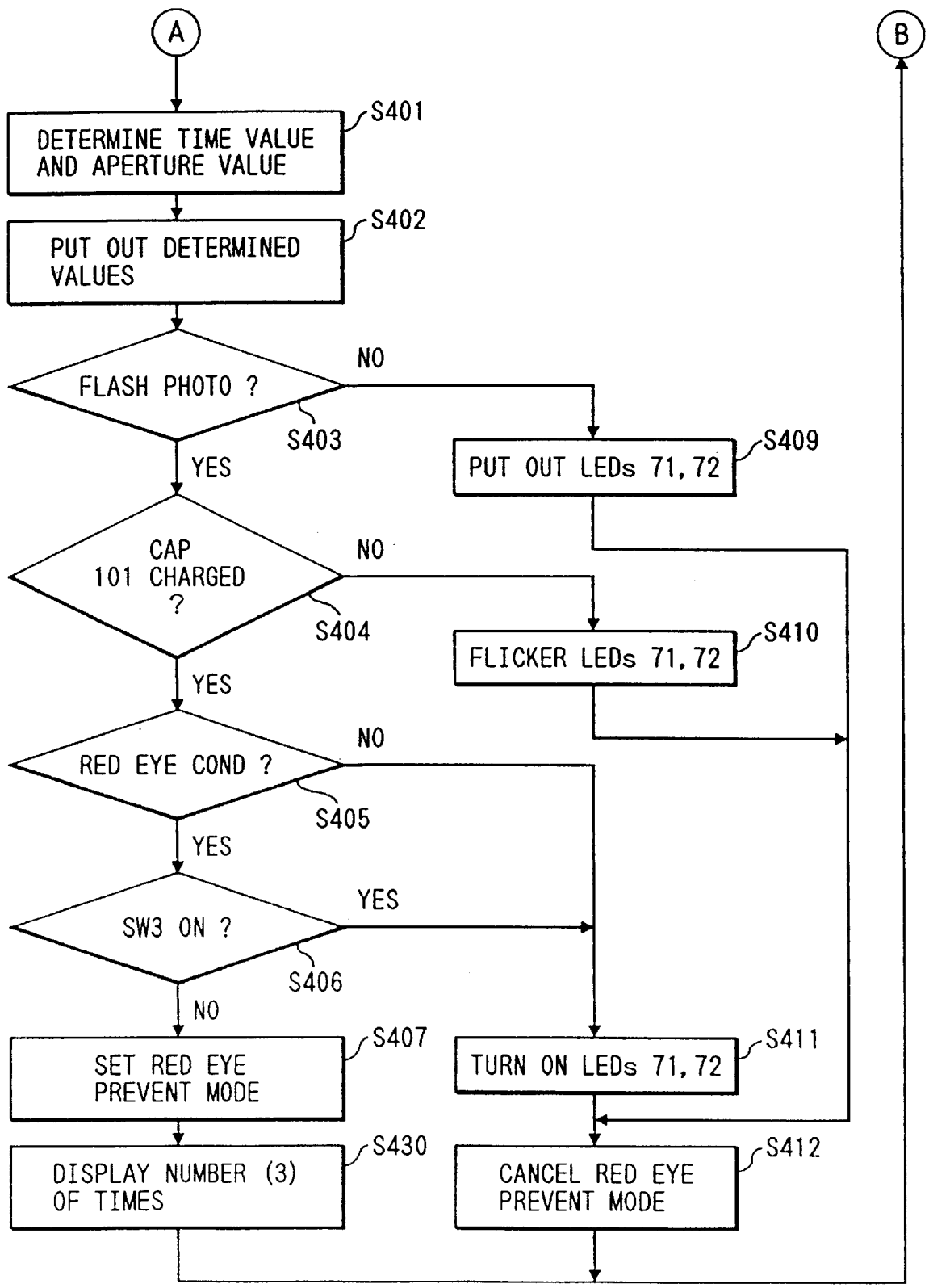
FIG. 37 is a flow chart showing the procedure of the main routine.

At the step S406 in the flow chart shown in FIG. 37, it is checked whether the switch SW3 is ON or not. If it is not ON, then the red eye prevent mode is set at step S407. Also, the number of light emission times is displayed at S430. To this end, as shown in FIG. 36B and 36C, the terminal $I_1$ of the display driver 70 is turned to Low level and the terminal $I_2$ is turned to High level. In the same manner as in the above embodiment, both of the outputs of AND gates 73 and 74 are turned to Low level. The outputs from the terminals Q of the flip-flops FF1 and FF2 also have the signal forms as shown in FIG. 36F and 36G respectively. The output from the OR gate 81 has the form as shown in FIG. 36J. Since the clock signal from the terminal CLOCK is being put into the AND gate 85, the output of the OR gate 76 is, as shown in FIG. 36H, turned to High level three times during the time of from T2 to T3. For the time of T3 to T4, the output is Low level and then it is turned again to High level three times for the time of T4 to T5. This is repeated so long as the switch SW1 is ON. In response to the output of the OR gate 76, the transistor 77 repeats On-OFF. Consequently, the LEDs 71 and 72 repeat three ON-OFFs at regular time intervals as shown in FIG. 36I so long as the switch SW1 is ON. This "three" times of ON-OFF indicates the number of light emission times for photographing to be done.

Figure 38:
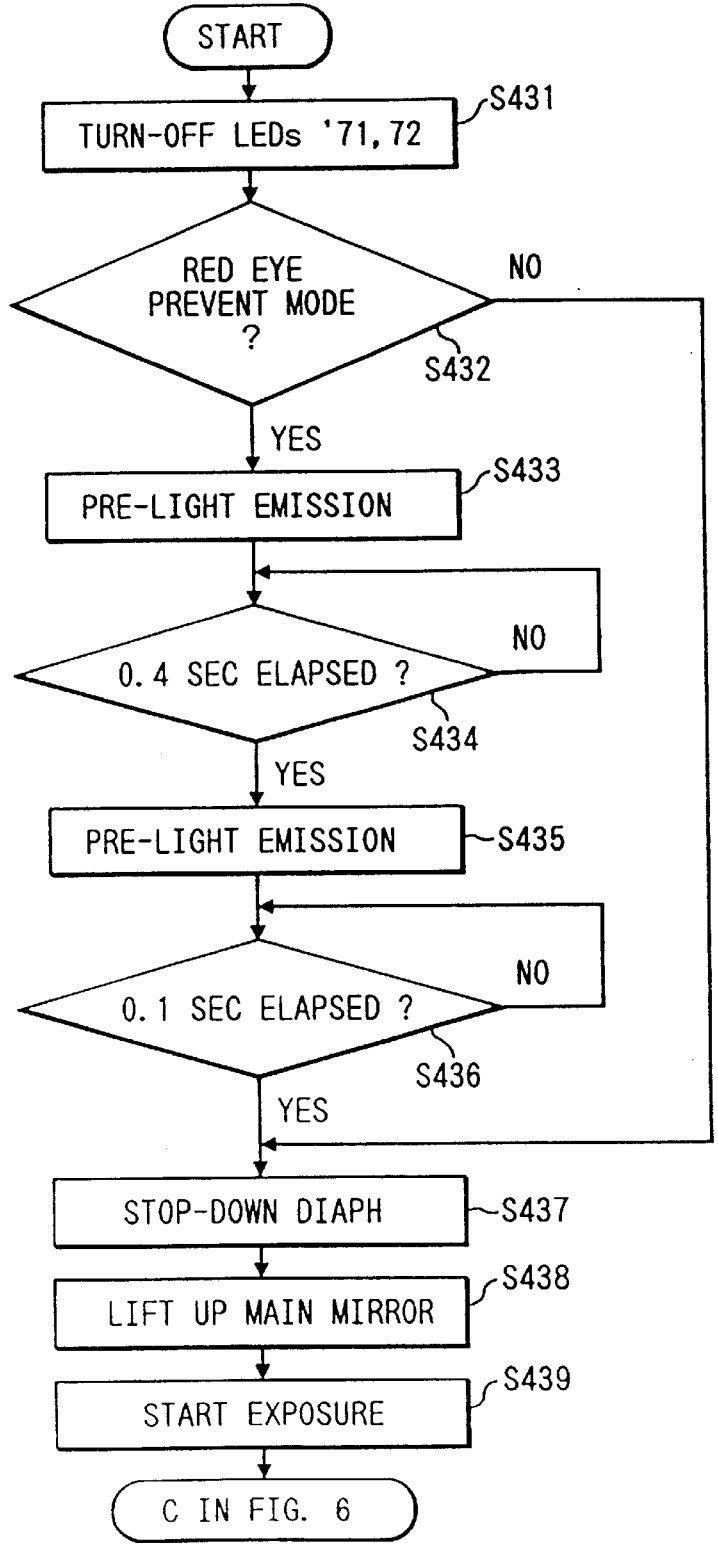
FIG. 38 is a flow chart showing the procedure of the interrupt routine.

By closing the switch SW2 in this state of operation, the interrupt routine shown in FIG. 38 is started.

At the first step S431, the LEDs 71 and 72 are turned OFF. At the next step S432, it is checked whether the red eye prevent mode has been set or not. When it is YES, the procedure is advanced to step S433 where an operation signal is applied to the pre-light emission device 11 to flash the xenon tube Xe2. This is a first pre-light emission. By the flash light from the xenon tube Xe2, the pupils of the object person's eyes will be closed.

At the step S434, it is checked whether 0.4 seconds have elapsed from the first pre-light emission. When it is YES, the procedure is advanced to step S435 where an operation signal is applied to the pre-light emission device 11 to have the xenon tube Xe2 flash. This is a second pre-light emission. Receiving the flash light from the xenon tube Xe2, the object person's pupil will surely be closed even when it has not been closed by the first pre-light emission. After that, the steps S437 to S439 are carried out and the procedure is advanced to step S27 in FIG. 6.

According to the procedure described above, LEDs 71 and 72 make a display to the effect that the light emission will be done three times by the photographer's depression of the release button to the first stroke for flash light photographing with red eye prevent pre-light emission. Thus, when the release button is depressed to the second stroke, two pre-light emissions are done and thereafter an exposure is performed with a main light emission.

In this manner, previous to an exposure, the object person is informed of the fact that the light emission is to be done three times. Thus, the same effect as described above can be obtained.

Figure 39:
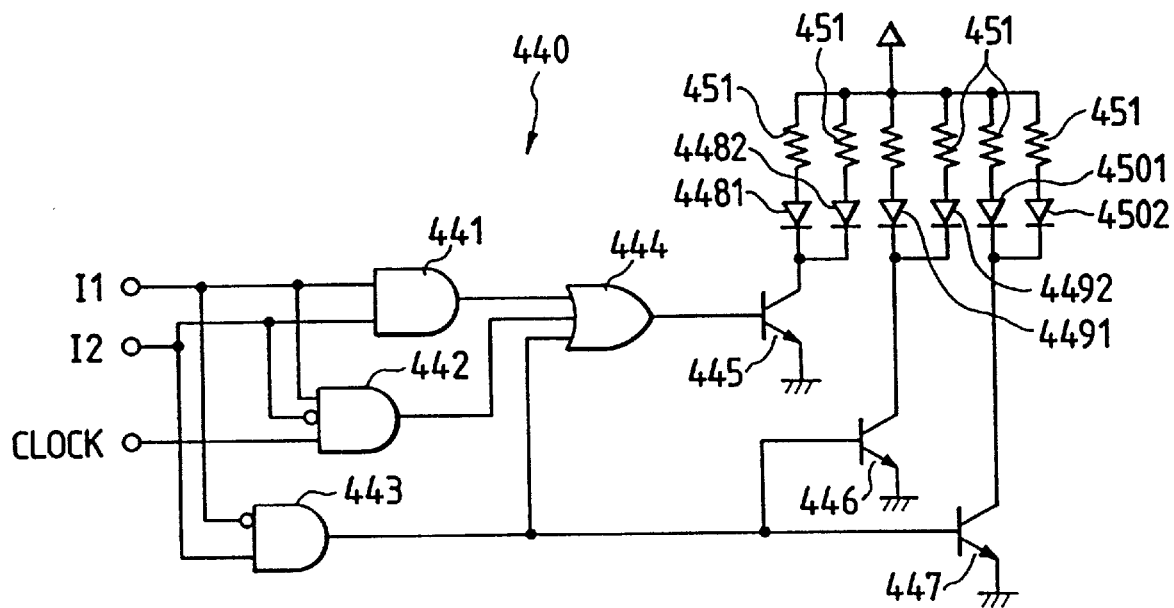
FIG. 39 is a circuit diagram of the display driver in another modification.
Figure 40:
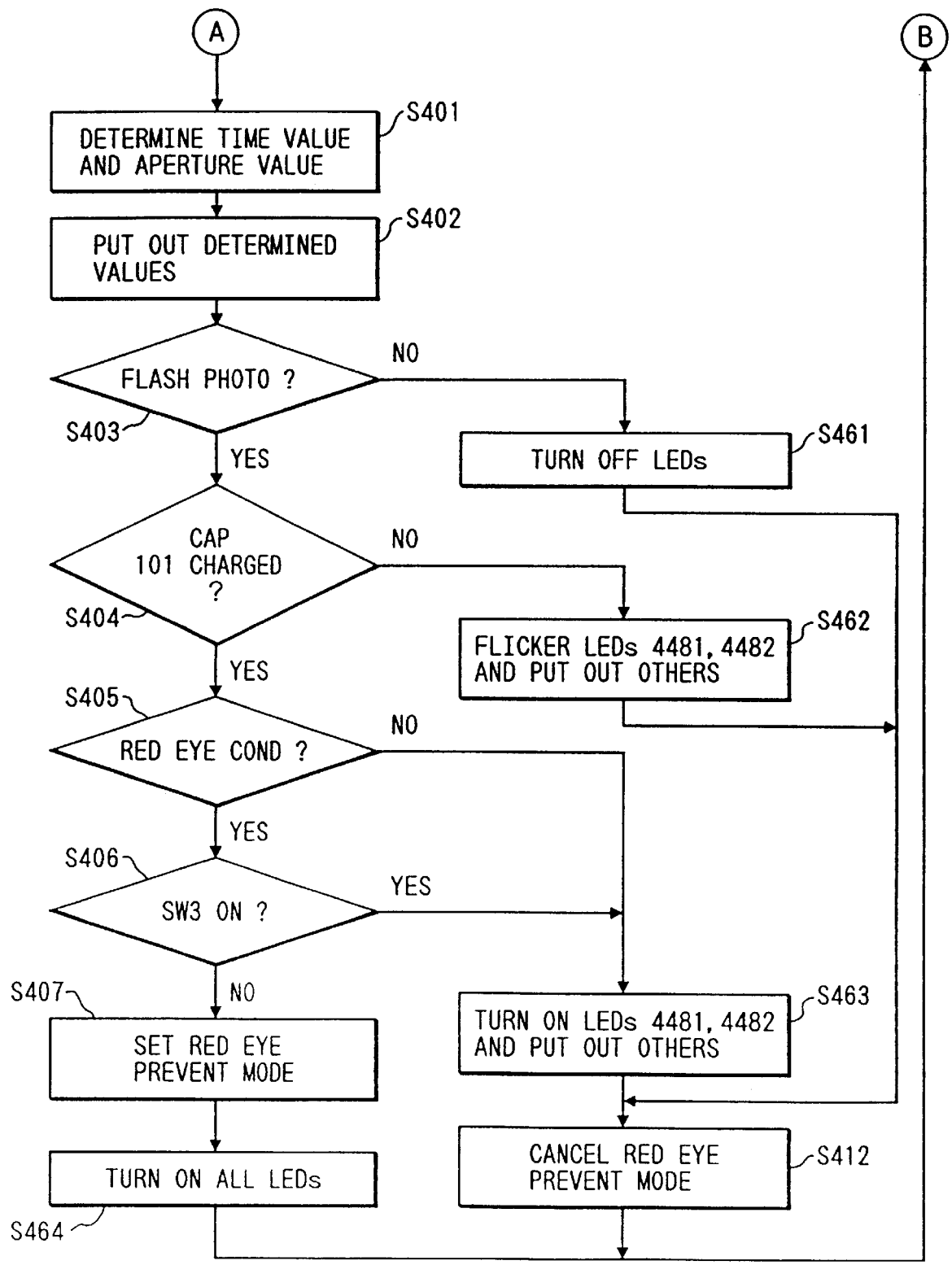
FIG. 40 is a flow chart showing the procedure of the main routine.

FIGS. 39 and 40 show another modification of the embodiment.

Referring to FIG. 39, the terminals $I_1$ and $I_2$ of the display driver 440 are connected to the input terminals of AND gates 441, 442 and 443. The terminal CLOCK is connected to the input terminal of the AND gate 442. The output terminals of the AND gates 441, 442 and 443 are connected to the input terminals of the OR gate 444 respectively. Also, the output terminal of the AND gate 443 is connected to transistors 446 and 447. The output terminal of the OR gate 444 is connected to transistor 445. The emitters of the transistors 445, 446 and 447 are grounded and their collectors are connected to a power supply through LEDs 4481, 4482, 4491, 4492, 4501 and 4502 and resistors 451. In this modification, the LEDs 4481, 4491 and 4501 are provided on the front side of the camera (at the position which the object person can recognize). LEDs 4482, 4492 and 4502 are within the view-finder of the camera. In this modification also the pre-light emission previous to a main light emission is carried out twice.

Steps in FIG. 40 correspond to those in FIG. 37 with the exception of steps S461 to S464.

In the flow chart shown in FIG. 40, when the step S403 is NO, all of the LEDs are turned OFF at step S461. When the step S404 is NO, the procedure is advanced to step S462 where the terminal $I_1$ is turned to High level and $I_2$ to Low level. Thereby, the output of AND gate 442 is turned to High level and the outputs of AND gates 441 and 443 are turned to Low level. As a result, only one transistor 445 is intermittently conducting. The LEDs 4481 and 4482 flicker. The remaining LEDs 4491, 4492, 4501 and 4502 are all OFF. Both of the object person and the photographer recognize that only one LED is flickering, which is a signal informing that the charging has not been completed yet.

Further, when the judgement is NO at step S405 or S406, the procedure is advanced to step S463 where both of the terminals $I_1$ and $I_2$ are turned to High level As a result, only the output of AND gate 441 is turned to High level and only the transistor 445 continues to be conductive. Consequently, LEDs 4481 and 4482 are ON. Both of the object person and the photographer recognize that only one LED is lit, which is a signal informing that no pre-light emission is to be done and the charging has been completed.

When it is verified that the switch SW3 is ON at the step S406, the procedure is advanced to the step S464 through step S407. At the step S464, the terminal $I_1$ is turned to Low level and the terminal $I_2$ is turned to High level. As a result, only the output of AND gate 443 is turned to High level, and the transistors 445, 446 and 447 are all conducting. Consequently, all of the LEDs are turned ON. Both of the object person and the photographer recognize that three LEDs are lit, informing that the light emission will be done three times. Thereafter, as previously described, the program shown in FIG. 38 is executed when the switch SW2 is closed.

Figure 41A:
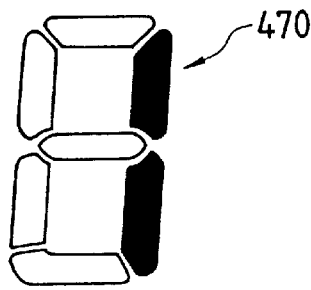
FIGS. 41A and 41B show examples of display by means of 7-segment LED display elements.
Figure 41B:
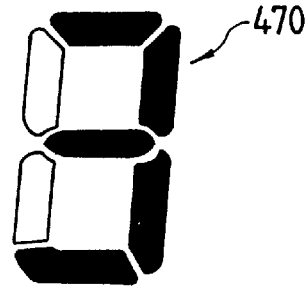

Although, in the above embodiment, the number of emission times has been displayed by light-on an LED, it is to be understood that the number of emission times may be displayed also by flickering of LED. Further, the manner of an display as described above in connection with the modification shown in FIG. 39 may be replaced by a digital display using a 7-segment LED as shown in FIGS. 41A and 41B.

In this modification, 7-segment LEDs 470 are provided, one on the front side of the camera (at the position which the object person can recognize) and one within the view-finder of the camera. The number of light-emission times is displayed digitally by a numerical character formed by the 7-segment LED 470 as illustrated by FIGS. 41A and 41B.

Figure 42:
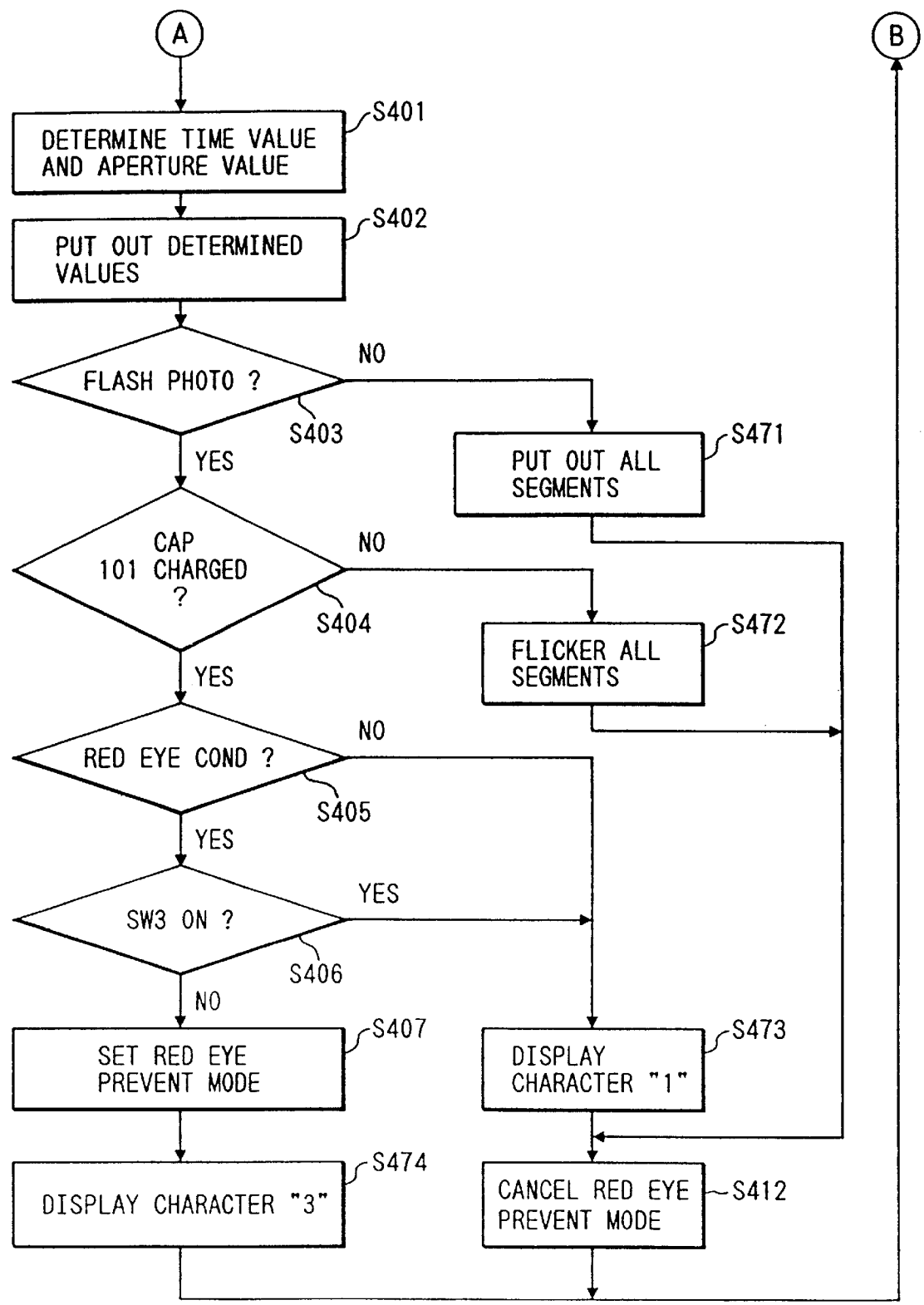
FIG. 42 is a flow chart showing the procedure of the main routine.

In this embodiment, the procedure of the process is controlled in accordance with the flow chart shown in FIG. 42.

At the step S403, discrimination is made as to whether the photographing is to be done with flash light. When it is not, all the segments of LEDs 476 are turned off at step S471 to inform that no flash light photographing is to be done.

Further, when it is verified at step S404 that the charging of the capacitor has not been completed yet, all of the segments are caused to flicker at step S472 to indicate the incomplete charging. When it is verified at step S405 that the red eye condition is present or at step S406 that the switch SW3 is ON, the procedure is advanced to the step S473 where only two segments are lighted or caused to flicker to display a character "1" as shown in FIG. 41A. The displayed number "1" indicates that the number of light emission times is one and the charging has been completed. Further, if the switch SW3 is not ON (step S406), the procedure is advanced to the step S474 through step S407. At the step S474, five segments of LED are lighted or caused to flicker to display a character "3" as illustrated in FIG. 41B. The displayed numerical character "3" indicates that the number of light emission times is three (two pre-emissions+one main emission).

It is to be understood that in the fourth embodiment described above, various modifications and changes are possible. For example, although the pre-emission previous to a main emission has been done twice in the above embodiment, the number of the pre-emission times may be increased to three or more. Further, it may be so modified that the number of the pre-light emission times is variable depending on the object distance D. In this case, the manner of display by LEDs also must be changed so that the real number of light emission times can be displayed.

As a further modification, acoustic means may be used for informing the number of emission times. For example, the speaker 15 shown in FIG. 1 may be used for this purpose.

Further, although the total number of times of pre-emission and main emission has been displayed in the above embodiment, it may be so modified to display the number of pre-emission times only.

What is claimed is:

1. A camera comprising:
   a flash device which emits illumination light to illuminate an object;
   a pre-illumination device which emits pre-illumination light to the object plural times, prior to a main emission of said flash device;
   an image recording device which operates to effect recording of an image of the object;
   a first counter;
   a second counter; and
   a control device, electrically connected to said pre-illumination device and said image recording device, which controls an interval of the plural emissions from said pre-illumination device by said first counter, and which controls operation of said image recording device by said second counter.

2. A camera according to claim 1, wherein said control device controls a time from when a last one of the plural emissions is completed to when operation of said image recording device is started, by said second counter.

3. A camera according to claim 2, wherein said image recording device includes a stop, a mirror and a shutter, and wherein said stop is operated first after the last pre-illumination of said plural times of pre-illumination, and then the mirror is raised and said shutter is driven.

4. A camera according to claim 1, wherein a predetermined time counted by said first counter is longer than a predetermined time counted by said second counter.

5. A camera according to claim 1, wherein said image recording device includes at least one of a stop, a mirror and a shutter.

6. A method of controlling a camera having a flash device which emits illumination light to illuminate an object, a pre-illumination device which emits pre-illumination light to the object plural times, prior to emission of illumination light by said flash device, and an image recording device which operates to effect recording of an image of the object, wherein an interval of the plural emissions from said pre-illumination device is controlled in accordance with a first period and said operation of said image recording device is controlled in accordance with a second period.

7. A method according to claim 6, wherein said second period determines the time between completion of a last one of said plural emissions and starting of said operation of said image recording device.

8. A method according to claim 6, wherein said first period is longer than said second period.

9. A camera comprising:
   a flash device which emits illumination light to illuminate an object;
   a pre-illumination device which emits pre-illumination light to the object plural times, prior to a main emission of said flash device, in order to reduce red-eye effect;
   an image recording device which operates to effect recording of an image of the object;
   a first counter;
   a second counter; and
   a control device, electrically connected to said pre-illumination device and said image recording device, which controls an interval of the plural emissions from said pre-illumination device by said first counter, and which controls operation of said image recording device by said second counter.

* * * * *

UNITED STATES PATENT AND TRADEMARK OFFICE
CERTIFICATE OF CORRECTION

PATENT NO.    : 5,950,023
DATED         : September 7, 1999
INVENTOR(S)   : Hara et al.

It is certified that error appears in the above-identified patent and that said Letters Patent is hereby corrected as shown below:

Title page,
Item [30], Foreign Application Priority Data should read:
Mar. 16, 1988 [JP] Japan ..........................63-64031
Mar. 16, 1988 [JP] Japan ..........................63-64032
Mar. 25, 1988 [JP] Japan ..........................63-72236
Mar. 25, 1988 [JP] Japan ..........................63-72237
Mar. 25, 1988 [JP] Japan ..........................63-72238
Apr. 11, 1988 [JP] Japan ..........................63-88757
Apr. 12, 1988 [JP] Japan ..........................63-49820[U]
Apr. 15, 1988 [JP] Japan ..........................63-50771[U]
Dec.  6, 1988 [JP] Japan ..........................63-309258

Signed and Sealed this

Twelfth Day of March, 2002

Attest:

Attesting Officer

JAMES E. ROGAN
Director of the United States Patent and Trademark Office